(12) United States Patent
Gotou

(10) Patent No.: US 6,291,961 B1
(45) Date of Patent: Sep. 18, 2001

(54) DISK DRIVE APPARATUS AND MOTOR

(75) Inventor: Makoto Gotou, Nishinomiya (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/767,898

(22) Filed: Jan. 24, 2001

Related U.S. Application Data

(63) Continuation of application No. 09/386,596, filed on Aug. 31, 1999, now Pat. No. 6,204,621.

(30) Foreign Application Priority Data

Sep. 2, 1998 (JP) ................................................. 10-265704

(51) Int. Cl.[7] .................................................. G05B 11/28
(52) U.S. Cl. ......................... 318/599; 318/254; 318/138; 318/439; 318/560
(58) Field of Search ................................ 318/560, 254, 318/138, 439, 599

(56) References Cited

U.S. PATENT DOCUMENTS

| | | | |
|---|---|---|---|
| 4,633,150 | * 12/1986 | Inaji et al. | 318/254 |
| 5,210,474 | * 5/1993 | Oswald | 318/254 |
| 5,442,266 | * 8/1995 | Morehouse et al. | 318/272 |
| 5,523,660 | * 6/1996 | Fujii | 318/254 |
| 5,585,701 | * 12/1996 | Kaida et al. | 318/254 |
| 5,610,486 | * 3/1997 | Li | 318/254 |
| 5,656,897 | * 8/1997 | Calaborante et al. | 318/254 |
| 5,798,623 | * 8/1998 | El-Sadi | 318/254 |

FOREIGN PATENT DOCUMENTS

| | | |
|---|---|---|
| 39 40 569 A1 | 6/1991 | (DE) . |
| 0 858 152 A2 | 8/1998 | (EP) . |
| 0 880 223 A1 | 11/1998 | (EP) . |
| 0 896 423 A2 | 2/1999 | (EP) . |

* cited by examiner

Primary Examiner—Robert E. Nappi
Assistant Examiner—Rita Leykin
(74) Attorney, Agent, or Firm—Akin, Gump, Strauss, Hauer & Feld, L.L.P.

(57) ABSTRACT

A disk drive apparatus comprises a movable member having a field part for driving a disk. A current path is formed from a DC power supply into one winding of a Q-phase winding of the movable member by a first FET power transistor of a first power amplifier and a second FET power transistor of a second power amplifier. The first power amplifier amplifies an input current into a conduction control terminal side using the first FET power transistor. The second power amplifier amplifies the input current into the conduction control terminal side using the second FET power transistor. A switching control part simultaneously controls Q conduction control terminal sides of the first power amplifying means in an on and an off state and causes the first FET power transistor of the first power amplifying means to perform an on and off high-frequency switching.

38 Claims, 35 Drawing Sheets

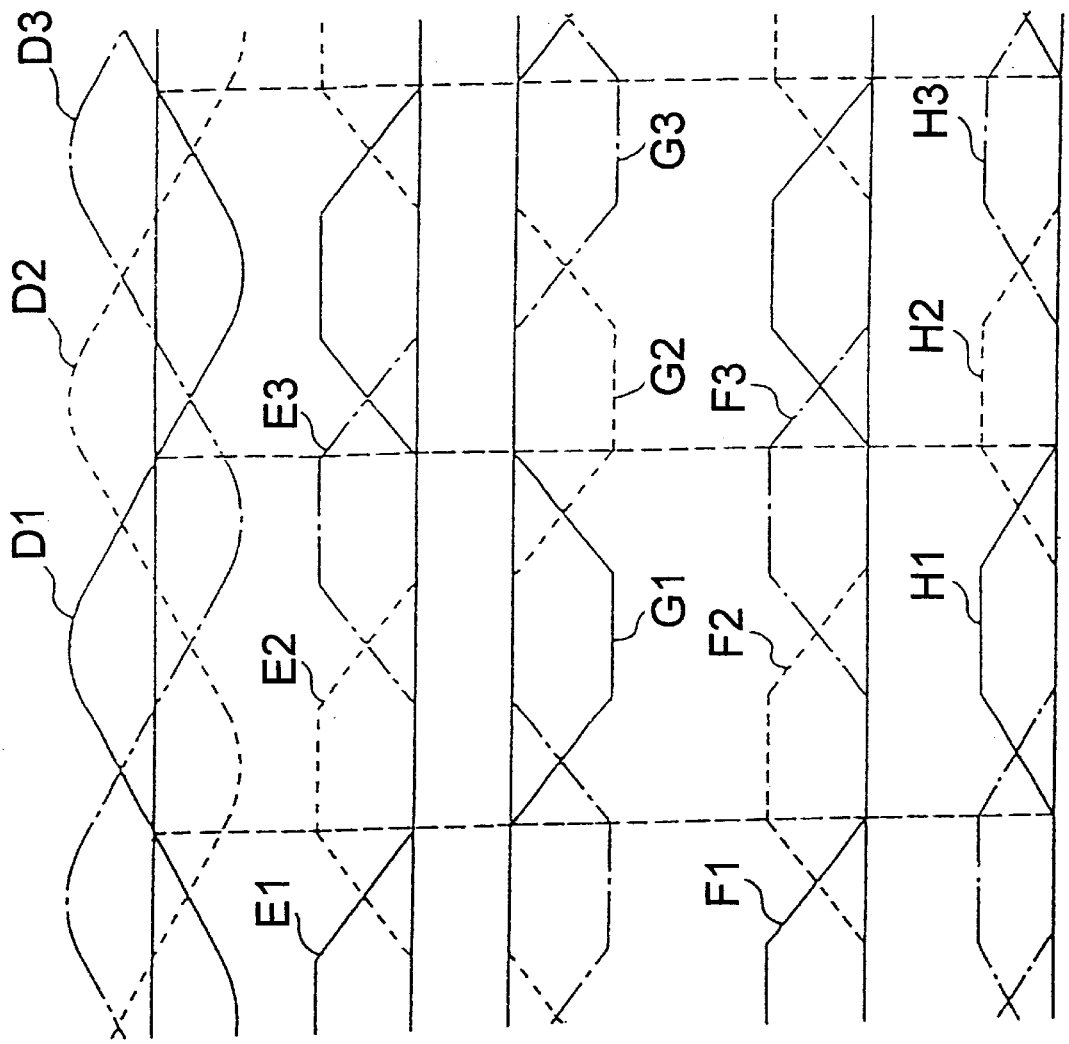

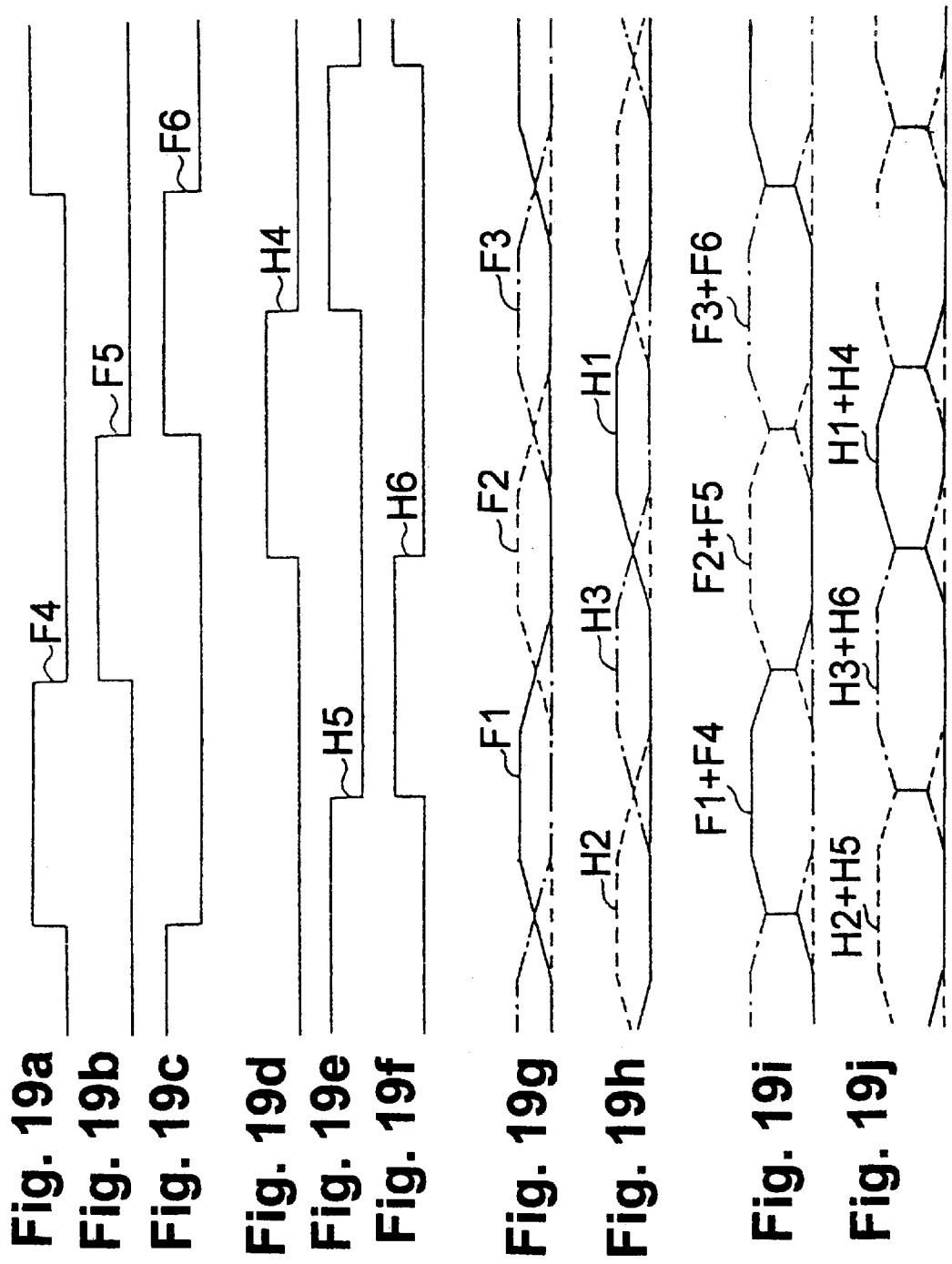

DISK DRIVE APPARATUS AND MOTOR

CROSS-REFERENCE TO RELATED APPLICATION

This application is a continuation of application, Ser. No. 09/386,596 filed Aug. 31, 1999, now U.S. Pat. No. 6,204,621 entitled "DISK DRIVE APPARATUS AND MOTOR".

BACKGROUND OF THE INVENTION

1. Field of the Invention

The present invention relates to a disk drive apparatus for reproducing or recording from/on a rotating disk, and also to a motor usable at least in the disk drive apparatus.

2. Description of the Related Art

In recent years, a disk drive apparatus such as an optical disk drive apparatus (DVD, CD, and so on) and a magnetic disk drive apparatus (HDD, FDD, and so on) includes a motor that electronically alters current paths to windings by using plural transistors.

FIG. 40 shows such a prior art motor usable in the disk drive apparatus, the operation of which will be described concisely here.

A rotor 2011 has a field part formed by a permanent magnet. According to the rotation of the rotor 2011, a position detecting block 2041 generates two pairs of three-phase voltage signals K1, K2, K3 and K4, K5, K6. A first distributing block 2042 generates three-phase lower conduction control signals L1, L2 and L3 corresponding to the voltage signals K1, K2 and K3, and controls the conduction of lower NPN-type power transistors 2021, 2022 and 2023. A second distributing block 2043 generates three-phase upper conduction control signals M1, M2 and M3 corresponding to the voltage signals K4, K5 and K6, and controls the conduction of upper PNP-type power transistors 2025, 2026 an 2027. Consequently, three-phase drive voltages are supplied to three-phase windings 2012, 2013 and 2014.

There are various problems in the above-mentioned prior art.

In the prior art configuration, the emitter-collector voltages of the NPN-type power transistors 2021, 2022 and 2023 and the PNP-type power transistors 2025, 2026 and 2027 are controlled in analogue fashion, thereby supplying drive currents of necessary amplitude to the windings 2012, 2013 and 2014. Consequently, the residual voltage drop across the power transistor in activated period becomes large, and the product of this residual voltage drop and the conducted current of the power transistor causes a large power loss. Since the drive currents to the windings have been large, the sum power loss has been extremely large. As a result, the disk drive apparatus including the motor produces a large power consumption and thus has a very low power efficiency.

In order to reduce the manufacturing cost, it is effective to integrate transistors, resistors, and the like on a single chip as an IC. However, a power loss and a heat generation of the power transistors are too large to integrate power transistors with other transistors and resisters into an IC. Especially, since the drive currents to the windings are large, the IC is likely to confront with a thermal breakdown caused by the heat generation from those power transistors. If a radiating plate is provided to the IC in order to prevent such a thermal breakdown, then the cost and the size will be increased greatly.

In recent years, there is a strong demand for a disk drive apparatus to reduce its vibration and an acoustic noise of the rotating disk in order to carry out a higher density reproducing and/or recording from/on such disks. In the prior art configuration, when a power transistor is changed over abruptly, a spike voltage is generated in a winding, thereby pulsating the drive currents. Therefore, the generated force is pulsated and a large vibration of the disk occurs, thereby producing a large acoustic noise from the disk.

In optical disk drive apparatus such as DVD-ROM and CD-ROM and magnetic disk drive apparatus such as HDD and FDD, the vibration of the disk produces a jitter of the rotational speed of the disk so that a bit error rate of the signal reproduced from the disk would become worse. The acoustic noise of the disk will interfere and disturb enjoyment of an audio-visual movie reproduced from the disk, because the acoustic noise is an audible noise. Further, in a disk drive apparatus using a recordable disk, a recording and/or reproducing mechanism of the disk drive apparatus is strongly demanded to reduce its power consumption because the recordable disk is easily affected to degrade the recording characteristics by heat or high temperature due to high power consumption.

It has been strongly desired to develop a disk drive apparatus and/or a motor in which each of or all of these problems are solved.

It is therefore an object of the present invention to solve the above-mentioned problems, respectively or concurrently and provide a disk drive apparatus and/or a motor that has the configuration suitable for reducing the vibration, the acoustic noise, and the power consumption.

SUMMARY OF THE INVENTION

Briefly stated, the present invention comprises a disk drive apparatus. The disk drive apparatus includes a head for at least one of reproducing an information signal from a disk and recording an information signal on a disk; processing means for at least one of processing an output signal from said head and outputting a reproduced information signal, and processing an input signal and outputting a recording signal into said head; a movable member, having a field part, for driving said disk; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said disk; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, one of Q of said first FET power transistors conducting in a half-on state while another of Q of said first FET power transistors conducts in a full-on state in a portion of a period when two of said Q first power amplifying means alter current paths to said Q-phase windings from said voltage supplying means.

A further aspect of the present invention is a disk drive apparatus comprising: a head for at least one of reproducing an information signal from a disk and recording an information signal on a disk; processing means for at least one of processing an output signal from said head and outputting a reproduced information signal, and processing an input signal and outputting a recording signal into said head; a movable member, having a field part, for driving said disk; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said disk; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for producing a switching control signal in response to a comparison result of said current detected signal with an output signal from said commanding means and switching said at least one FET power transistor in response to said switching control signal, at least two power amplifying means among said Q first power amplifying means and said Q second amplifying means altering current paths to said Q-phase windings from said voltage supplying means without a ON-OFF switching of said at least two power amplifying means.

Another aspect of the present invention is a disk drive apparatus comprising: a head for at least one of reproducing an information signal from a disk and recording an information signal on a disk; processing means for at least one of processing an output signal from said head and outputting a reproduced information signal, and processing an input signal and outputting a recording signal into said head; a movable member, having a field part, for driving said disk; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said disk; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, at least one of said Q first power amplifying means including means for amplifying a current signal from said first distribution control means applied to a conduction control terminal side of said at least one of said Q first power amplifying means with said first FET power transistor.

Still another aspect of the present invention is a disk drive apparatus comprising: a head for at least one of reproducing an information signal from a disk and recording an information signal on a disk; processing means for at least one of processing an output signal from said head and outputting a reproduced information signal, and processing an input signal and outputting a recording signal into said head; a movable member, having a field part, for driving said disk; Q phase windings, Q being an integer of three or more; voltage supplying means, including first and second output terminals, for supplying a DC voltage; Q first power amplifying means, each one of said Q first power amplifying means including a first power transistor for forming a current path between the first output terminal side of said voltage supplying means and one of said Q-phase windings; Q second power amplifying means, each one of said Q second power amplifying means including a second power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said disk; and switching operation means for causing at least one power transistor among Q of said first power transistors and Q of said second power transistors to perform high-frequency switching corresponding to the command signal from said commanding means, said switching operation means including: current detecting means for providing a current detected signal in response to a supply current supplied to said Q-phase windings from said voltage supplying means, and switching control means for producing a switching control signal in response to a comparison result of said current detected signal with an output signal from said commanding means and switching one or two of said first power transistors simultaneously in response to said switching control signal.

A further aspect of the present invention is a motor comprising: a movable member, having a field part; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, one of Q of said first FET power transistors conducting in a half-on state while another of Q of said first FET power transistors conducts in a full-on state in a portion of a period when two of said Q first power amplifying means alter current paths to said Q-phase windings from said voltage supplying means.

Still a further aspect of the present invention is a motor comprising: a movable member, having a field part; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for producing a switching control signal in response to a comparison result of said current detected signal with an output signal from said commanding means and switching said at least one FET power transistor in response to said switching control signal, at least two power amplifying means among said Q first power amplifying means and said Q second amplifying means altering current paths to said Q-phase windings from said voltage supplying means without a ON-OFF switching of said at least two power amplifying means.

Another aspect of the present invention is a motor comprising: a movable member, having a field part; Q phase windings, Q being an integer of three or more; voltage supplying means, including first and second output terminals, for supplying a DC voltage; Q first power amplifying means, each one of said Q first power amplifying means including a first FET power transistor for forming a current path between the first output terminal side of said voltage supplying means and one of said Q-phase windings; Q second power amplifying means, each one of said Q second power amplifying means including a second FET power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including: current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, at least one of said Q first power amplifying means including means for amplifying a current signal from said first distribution control means applied to a conduction control terminal side of said at least one of said Q first power amplifying means with said first FET power transistor.

An additional aspect of the present invention is motor comprising: a movable member, having a field part; Q phase windings, Q being an integer of three or more; voltage supplying means, including first and second output terminals, for supplying a DC voltage; Q first power amplifying means, each one of said Q first power amplifying means including a first power transistor for forming a current path between the first output terminal side of said voltage supplying means and one of said Q-phase windings; Q second power amplifying means, each one of said Q second power amplifying means including a second power transistor for forming a current path between the second output terminal side of said voltage supplying means and one of said Q-phase windings; altering signal producing means for producing altering signals; first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period; second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period; commanding means for outputting a command signal corresponding to a rotational speed of said movable member; and switching operation means for causing at least one power transistor among Q of said first power transistors and Q of said second power transistors to perform high-frequency switching corresponding to the command signal from said commanding means, said switching operation means including: current detecting means for providing a current detected signal in response to a supply current supplied to said Q-phase windings from said voltage supplying means, and switching control means for producing a switching control signal in response to a comparison result of said current detected signal with an output signal from said commanding means and switching one or two of said first power transistors simultaneously in response to said switching control signal.

BRIEF DESCRIPTION OF THE DRAWINGS

FIG. 10 is a waveform showing the altering current signals, the first distributed current signals, the second distributed current signals, the first amplified current signals, and the second amplified current signals.

FIG. 19 is a waveform chart showing the first auxiliary current signals, the second auxiliary current signals, the first amplified current signals, the second amplified current signals, the first mixed current signals and the second mixed current signals.

DETAILED DESCRIPTION OF THE INVENTION

Several preferred embodiments of the present invention will be described in detail below with reference to the accompanying drawings shown in FIG. 1 to FIG. 39.

<<Embodiment 1>>

Figure 1:
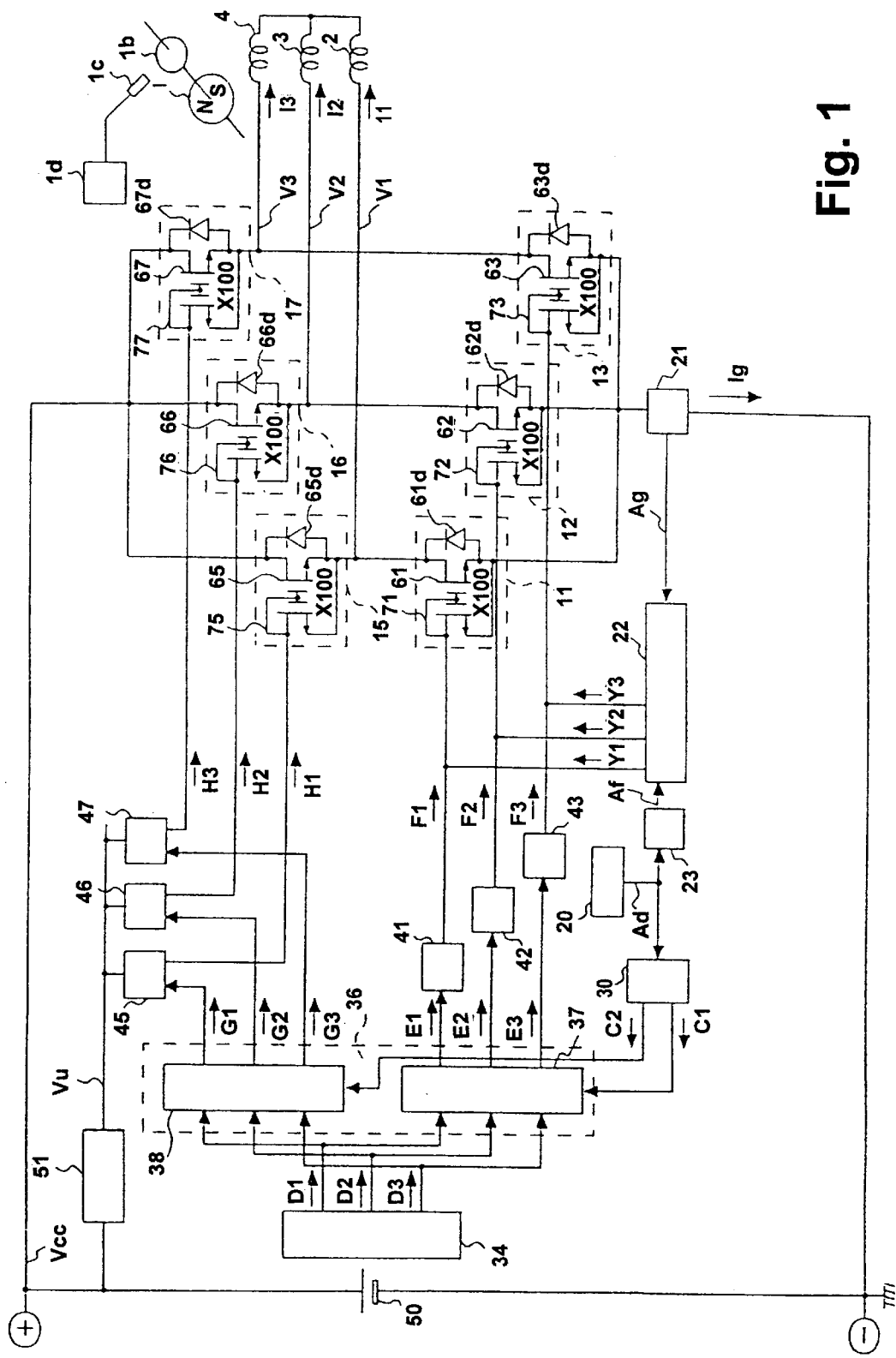
FIG. 1 is a diagram showing the configuration of the embodiment 1 of the present invention.

FIGS. 1 to 9 illustrate a configuration of the disk drive apparatus and the motor in the embodiment 1 of the present invention. FIG. 1 shows a comprehensive configuration of the disk drive apparatus and the motor. A movable member 1 is, for example, a rotor provided with a field part that generates magnetic fluxes of plural poles of a permanent magnet. In this embodiment, the field part of the movable member 1 is indicated with a double-pole magnetized permanent magnet. Modified embodiments of the present invention may be constructed with a multi-pole magnet or with many magnetic pole pieces. Three-phase windings 2, 3, and 4 are disposed on a stator, each displaced from the others by electrically 120 degree. The three-phase windings 2, 3, and 4 generate three-phase fluxes by three-phase drive current signals I1, I2 and I3. The motor generates a force by the interaction between the field part of the movable member 1 and the drive current signals, and gives the generated force to the movable member 1. A disk 1b is mounted to the movable member 1 and rotated together with the movable member 1.

In the case of reproducing a signal of the disk 1b, a digital signal of the disk 1b is reproduced by a head 1c such as an optical head for an optical disk or a magnetic head for a magnetic disk. A signal processing part 1d reproduces an information signal such as an audio-visual signal from an output signal of the head 1c.

In the case of recording a signal to the disk 1b, a digital signal is recorded to the disk 1b by the head 1c such as an optical head for an optical disk or a magnetic head for a magnetic disk. The signal processing part 1d produces a recording signal from an information signal such as an audio-visual signal and supplies the head 1c with the recording signal.

FIG. 38(a) shows an example of a disk drive apparatus for reproducing a signal from the disk 1b. Since the disk 1b is fixed to a rotational axis 1a of the movable member 1, the movable member 1 as the rotor rotates the disk 1b coaxially. The disk 1b has a digital information signal recorded on the disk face in a high density. The head 1c reproduces the information signal from the disk 1b and outputs a reproduced signal Pf. The signal processing part 1d produces digitally a reproduced information signal Pg from the reproduced signal Pf. Further, the signal processing part 1d produces a head position signal Pt corresponding to the radial position of the head 1c from the reproduced signal Pf of the disk 1b. Besides, the stator and the windings are abbreviated in the figure.

FIG. 38(b) shows an example of a disk drive apparatus recording a signal to the disk 1b. Since the disk 1b is fixed to a rotational axis 1a of the movable member 1, the movable member 1 as the rotor rotates the disk 1b coaxially. The disk 1b is recordable so as to record a digital information signal on the disk face in a high density. The signal processing part 1d digitally produces a recording information signal Rf from an inputted information signal Rg. The head 1c records the recording information signal Rf to the disk 1b and forms a new recorded information on the disk 1b. The disk drive apparatus simultaneously reproduces a track information signal of the disk 1b representing the radial position of the head 1c at some intervals or continuously, and the signal processing part 1d produces the head position signal Pt corresponding to the radial position of the head 1c from the track information signal of the disk 1b. A recordable disk such as DVD-RAM(Digital Versatile Disk-Random Access Memory), DVD-R(DVD-Recordable), CD-R(Compact Disk-Recordable), or CD-RW (CD-Rewritable) has a wobbling signal as the track information signal of the disk so as to reproduce the radial position of the head from the wobbling signal in recording the recording information signal.

The head 1c is a reproducing head, a recording/reproducing head, or recording head according to a type of the disk drive apparatus. The disk drive apparatus of a reproducing only type uses the reproducing head, and the disk drive apparatus of a recording/reproducing type uses the recording/reproducing head or the recording head.

A DC power source part 50 in FIG. 1, as a voltage supplying part, has a negative terminal side (−) and a positive terminal side (+). The negative terminal side is connected to the ground potential, and the DC power source part 50 supplies a DC voltage Vcc at the positive terminal side. The current output terminal sides of three first power amplifying parts 11, 12 and 13 are connected to the negative terminal side of the DC power source part 50 commonly via a current detecting part 21. The first power amplifying part 11 includes a first NMOS-FET power transistor 61 and a first power diode 61d connected in parallel and reversely to the first NMOS-FET power transistor 61. The NMOS-FET transistor means an FET transistor with N-channel MOS structure. The current output terminal side of the first NMOS-FET power transistor 61 is connected to the negative terminal side of the DC power source part 50 via the current detecting part 21, and the current input terminal thereof is connected to the power supplying terminal of the winding 2. The current input terminal side of the first power diode 61d is connected to the current output terminal side of the first NMOS-FET power transistor 61, and the current output side thereof is connected to the current input terminal side of the first NMOS-FET power transistor 61. The first power amplifying part 11 forms a first FET power current-mirror circuit having the first NMOS-FET power transistor 61 and an NMOS-FET transistor 71, for amplifying an input current signal to the conduction control terminal side thereof. In this embodiment, the FET power current-mirror circuit means an FET current-mirror circuit and has an FET power transistor as an output power transistor.

The ratio of cell sizes of the NMOS-FET power transistor 61 to the NMOS-FET transistor 71 is set to 100 times and the current amplifying ratio of the first power current-mirror circuit is set to 100 times when the FET power transistor 61 is operating in the half-on state in its active operation region. An FET transistor can operate in three states; full-on state, half-on state, and off state. In the full-on state, the FET transistor performs short-circuit between the current input and output terminals. In the half-on state, the FET transistor can amplify an input signal in its active operation region. In the full-on state or in the half-on state, the FET transistor is activated or active. The FET power transistor 61 is configured, for example, by an FET transistor with double-diffused N-channel MOS structure, and a parasitic diode device is connected reversely from the current output terminal side to the current input terminal side of the FET power transistor 61 equivalently. This parasitic diode device is used as the first power diode 61d.

In the same way, the first power amplifying part 12 includes a first NMOS-FET power transistor 62 and a first power diode 62d connected in parallel and reversely to the first NMOS-FET power transistor 62. The current output terminal side of the first NMOS-FET power transistor 62 is connected to the negative terminal side of the DC power source part 50 via the current detecting part 21 and the current input terminal side thereof is connected to the power supplying terminal of the winding 3. The current input terminal side of the first power diode 62d is connected to the current output terminal side of the first NMOS-FET power transistor 62 and the current output terminal side thereof is connected to the current input terminal side of the first NMOS-FET power transistor 62. The first power amplifying part 12 forms a first FET power current-mirror circuit having the first NMOS-FET power transistor 62 and the NMOS-FET transistor 72 and amplifies an input current signal to the conduction control terminal side thereof (ratio of cell areas of two NMOS FETs: 100 times). The first NMOS-FET power transistor 62 is configured, for example, by an FET transistor with double-diffused N-channel MOS structure and a parasitic diode device of the first NMOS-FET power transistor 62 is used as a first power diode 62d.

In the same way, the first power amplifying part 13 includes a first NMOS-FET power transistor 63 and a first power diode 63d connected in parallel and reversely to the first NMOS-FET power transistor 63. The current output terminal side of the first NMOS-FET power transistor 63 is connected to the negative terminal side of the DC power source part 50 via the current detecting part 21, and the current input terminal side thereof is connected to the power supplying terminal of the winding 4. The current input terminal side of the first power diode 63d is connected to the current output terminal side of the first NMOS-FET power transistor 63 and the current output terminal side thereof is connected to the current input terminal side of the first NMOS-FET power transistor 63. The first power amplifying part 13 forms a first FET power current-mirror circuit having the first NMOS-FET power transistor 63, and the NMOS-FET transistor 73 and amplifies an input current signal to the conduction control terminal side thereof (ratio of cell areas of two NMOS FETs: 100 times). The first NMOS-FET power transistor 63 is configured, for example, by an FET transistor with double-diffused N-channel MOS structure and a parasitic diode device of the first NMOS-FET power transistor 63 is used as a first power diode 63d.

Each of the first power current-mirror circuits of the first power amplifying parts 11, 12 and 13 amplifies an input current signal to each conduction control terminal side thereof. The control pulse signals Y1, Y2 and Y3 of the switching control part 22 control ON/OFF of the first NMOS-FET power transistors 61, 62 and 63, thereby carrying out high frequency switching operations. The first power amplifying parts 11, 12 and 13 supply drive voltage signals V1, V2 and V3 in high-frequency switching to the power supplying terminal sides of the three-phase windings 2, 3 and 4, so that negative current parts of the drive current signals I1, I2 and I3 are supplied to these windings 2, 3 and 4. This operation will be described in detail later.

The current input terminal sides of three second power amplifying parts 15, 16 and 17 are connected to the positive terminal side of the DC power source part 50 commonly. The second power amplifying part 15 includes a second NMOS-FET power transistor 65 and a second power diode 65d connected in parallel and reversely to the second NMOS-FET power transistor 65. The current input terminal side of the second NMOS-FET power transistor 65 is connected to the positive terminal side of the DC power source part 50 and the current output terminal side thereof is connected to the power supplying terminal of the winding 2. The current input terminal side of the second power diode 65*d* is connected to the current output terminal side of the second NMOS-FET power transistor 65 and the current output terminal side thereof is connected to the current input terminal side of the second NMOS-FET power transistor 65. The second power amplifying part 15 forms a second FET power current-mirror circuit having the second NMOS-FET power transistor 65 and the NMOS-FET transistor 75 and amplifies an input current signal to the conduction control terminal side thereof. The ratio of cell sizes of the second NMOS-FET power transistor 65 to the NMOS-FET transistor 75 is set to 100 times, and the current amplifying ratio of the second power current-mirror circuit is set to 101 times when the second NMOS-FET power transistor 65 is operating in the half-on state in its active operation region. The second NMOS-FET power transistor 65 is configured, for example, by an FET transistor with double-diffused N-channel MOS structure and a parasitic diode device is connected reversely from the current output terminal side to the current input terminal side of the second NMOS-FET power transistor 65 equivalently. This parasitic diode device is used as a second power diode 65*d*.

In the same way, the second power amplifying part 16 includes a second NMOS-FET power transistor 66 and a second power diode 66*d* connected in parallel and reversely to the second NMOS-FET power transistor 66. The current input terminal side of the second NMOS-FET power transistor 66 is connected to the positive terminal side of the DC power source part 50 and the current output terminal side thereof is connected to the power supplying terminal of the winding 3. The current input terminal side of the second power diode 66*d* is connected to the current output terminal side of the second NMOS-FET power transistor 66 and the current output terminal side thereof is connected to the current input terminal side of the second NMOS-FET power transistor 66. The second power amplifying part 16 forms a second FET power current-mirror circuit having the second NMOS-FET power transistor 66 and the NMOS-FET transistor 76 and amplifies an input current signal to the conduction control terminal side thereof (ratio of cell areas of two NMOS-FETS: 100 times). The second NMOS-FET power transistor 66 is configured, for example, by an FET transistor with double-diffused N-channel MOS structure and a parasitic diode device of the second NMOS-FET power transistor 66 is used as a second power diode 66*d*.

In the same way, the second power amplifying part 17 includes a second NMOS-FET power transistor 67 and a second power diode 67*d* connected in parallel and reversely to the second NMOS-FET power transistor 67. The current input terminal side of the second NMOS-FET power transistor 67 is connected to the positive terminal side of the DC power source part 50 and the current output terminal side thereof is connected to the power supplying terminal of the winding 4. The current input terminal side of the second power diode 67*d* is connected to the current output terminal side of the second NMOS-FET power transistor 67 and the current output terminal side thereof is connected to the current input terminal side of the second NMOS-FET power transistor 67. The second power amplifying part 17 forms a second FET power current-mirror circuit having the second NMOS-FET power transistor 67 and the NMOS-FET transistor 77 and amplifies an input current signal to the conduction control terminal side thereof (ratio of cell area of two NMOS-FETs: 100 times). The second NMOS-FET power transistor 67 is configured, for example, by an FET transistor with double-diffused N-channel MOS structure and a parasitic diode device of the second NMOS-FET power transistor 67 is used as a second power diode 67*d*.

Each of the second power current-mirror circuits of the second power amplifying parts 15, 16 and 17 amplifies an input current signal to each conduction control terminal side thereof, so that positive current parts of the drive current signals I1, I2 and I3 are supplied to the three-phase windings 2, 3 and 4. This operation will be described in detail later.

The first power amplifying parts 11, 12 and 13 are connected in parallel and alter current paths, each between each of power supplying terminals of the windings and the negative terminal side of the DC power source part 50. At the same time, the second power amplifying parts 15, 16 and 17 are connected in parallel and alter current paths, each between each of power supplying terminals of the windings and the positive terminal side of the DC power source part 50.

Figure 39:
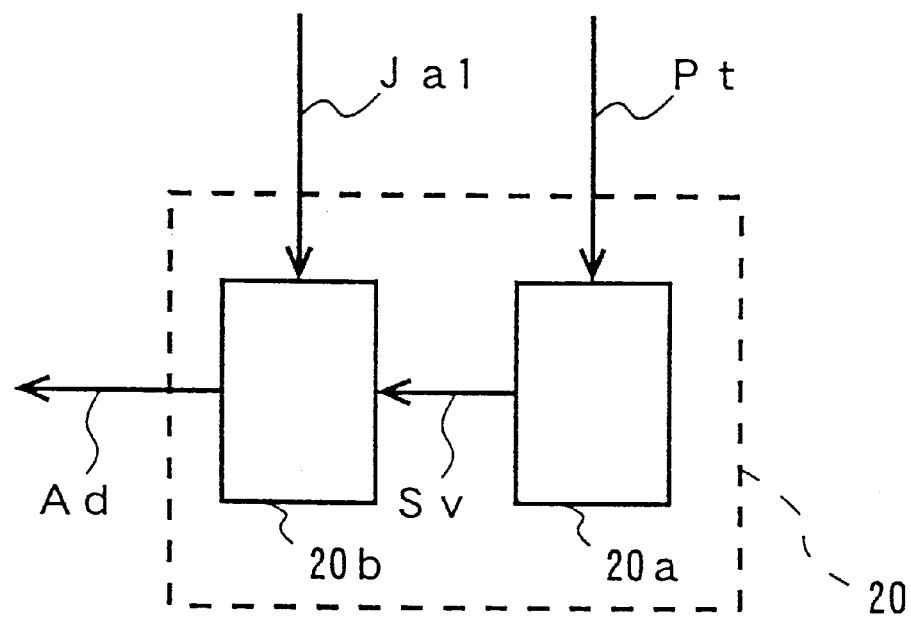
FIG. 39 is a block diagram showing a configuration of the command signal producing part 20 in the embodiment of the present invention.
Figure 40:
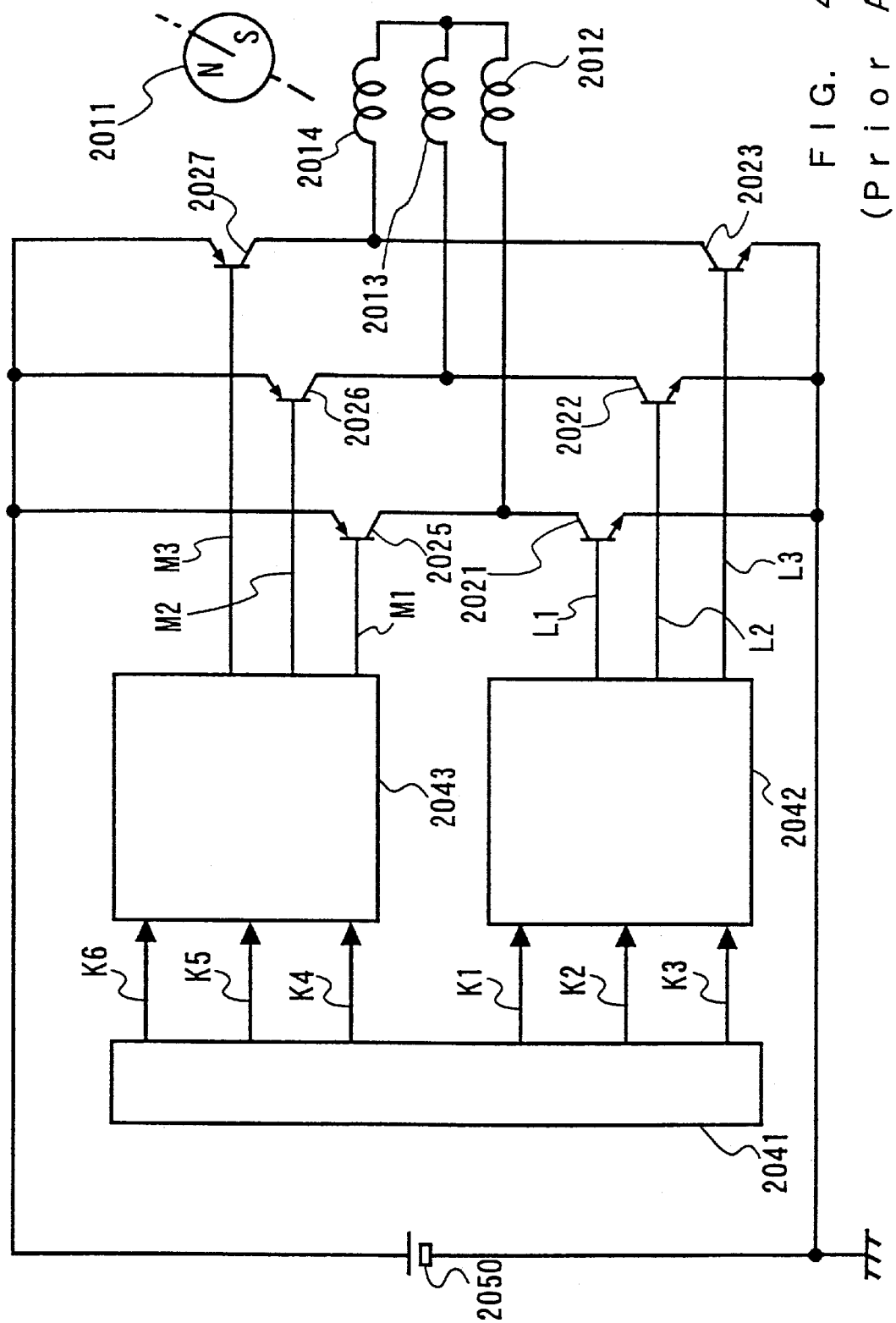
FIG. 40 is a diagram showing a configuration of a prior art motor.

A command signal producing part 20 in FIG. 1 is configured, for example, by a speed control block that detects and controls the rotational speed of the movable member 1 or the disk 1*b* to an aimed speed, and supplies a command signal Ad to both a supply signal producing part 30 and a command modifying part 23. FIG. 39 shows a configuration of the command signal producing part 20, which includes a speed command part 20*a* and a speed control part 20*b*. The speed command part 20*a* produces a speed command signal Sv from the head position signal Pt of the signal processing part 1*d*, and changes the speed command signal Sv stepwise or continuously corresponding to the radial position of the head 1*c*. The speed control part 20*b* detects the rotational speed of the disk 1*b* or the movable member 1, for example, by the frequency or the period of the altering signal Ja1 from an altering signal producing part 34. The speed control part 20*b* outputs the command signal Ad responding with a difference between the detected rotational speed of the disk 1*b* and the speed command signal Sv. The command signal Ad changes both drive current signals and drive voltage signals to the windings 2, 3 and 4, thereby commanding the supply power to these windings. Therefore, the speed command part 20*a* and the speed control part 20*b* control the rotational speed of the disk 1*b* responding with the speed command signal Sv. The rotational speed of the disk 1*b* becomes slow stepwise or continuously in inversely proportional to the radial position of the head 1*c*. As a result of this, the disk drive apparatus has an advantage that a bit rate of the reproducing signal becomes constant or almost constant irrespective of the radial position of the head 1*c* in reproducing the disk 1*b*, or that a density of the recording signal on the disk 1*b* becomes constant or almost constant irrespective of the radial position of the head 1*c* in recording the disk 1*b*.

Figure 3:
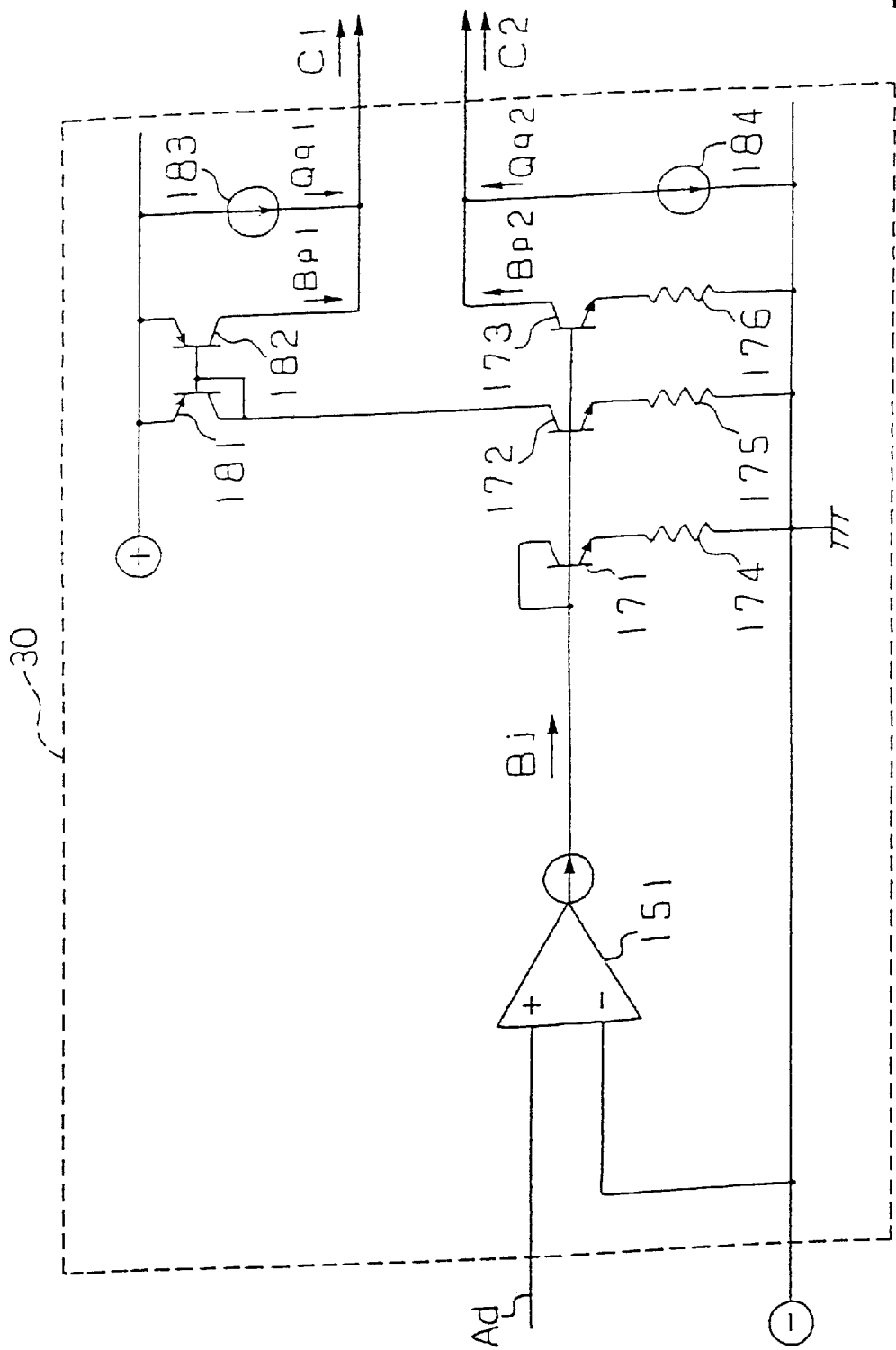
FIG. 3 is a circuit diagram of a supply signal producing part 30 in the embodiment 1.

The supply signal producing part 30 in FIG. 1 outputs the first supply current signal C1 and the second supply current signal C2, both corresponding to the command signal Ad. FIG. 3 shows a configuration of the supply signal producing part 30. A voltage-current converting circuit 151 outputs a converted current signal Bj proportional to the command signal Ad. The converted current signal Bj from a voltage-current converting circuit 151 is supplied to a current-mirror circuit composed of transistors 171 to 173 and resistors 174 to 176, thereby generating two current signals proportional to the converted current signal Bj at the collector sides of the transistors 172 and 173. The collector current signal of the transistor 172 is output via a current-mirror circuit consisting of the transistors 181 and 182. The collector current signal Bp1 of the transistor 12 is added to the first specified current signal Qq1 of a constant current source 183, thereby outputting the added current as the first supply current signal C1. Then, C1=Bp1+Qq1. The collector current signal Bp2 of the transistor 173 is added to the second specified current signal Qq2 of a constant current source 184, thereby outputting the added current as the second supply current signal C2. Then, C2=Bp2+Qq2. Consequently, both the first supply current signal C1 and the second supply current signal C2 are proportional to or approximately proportional to the command signal Ad. In addition, each of the first supply current signal C1 and the second supply current signal C2 includes a specified bias current of Qq1 or Qq2 of each of the constant current sources 183 and 184. The current values Qq1 and Qq2 of the constant current sources 183 and 184 are set as needed, and can be zero.

Figure 2:
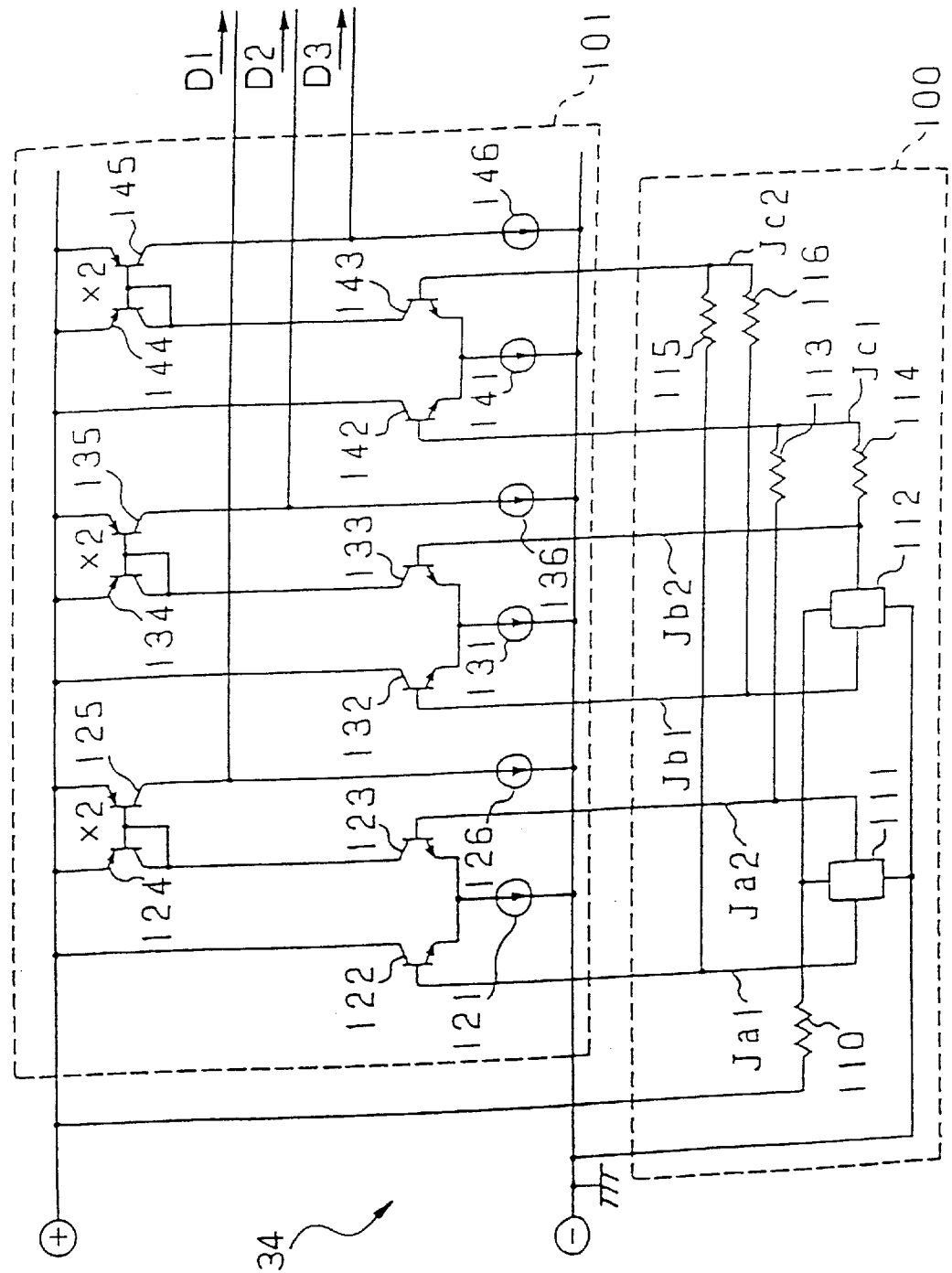
FIG. 2 is a circuit diagram of an altering signal producing part 34 in the embodiment 1.

The altering signal producing part 34 shown in FIG. 1 outputs three-phase altering current signals D1, D2 and D3, which vary smoothly. FIG. 2 shows a configuration of the altering signal producing part 34. In this embodiment, the altering signal producing part 34 is configured by a position detecting block 100 and an altering signal block 101.

The position detecting block 100 includes position detecting elements 111 and 112, each consisting of a magnetic-to-electric converting element (for example, a Hall element) to detect magnetic fluxes generated from the movable member 1. There is an electrical phase difference of 120 degrees between the position detecting elements 111 and 112. The position detecting elements 111 and 112 output two-phase position signals Ja1 and Jb1, as well as Ja2 and Jb2, each varying smoothly and in sinusoidal form according to the movement of the movable member 1. In this embodiment, Ja1 and Ja2 are inverted in phase with respect to each other (a phase difference of 180 degrees between them electrically), and Jb1 and Jb2 are also inverted in phase with respect to each other. Phase inverted signals are not counted in the number of new phases. The position signals Ja2 and Jb2 are compounded by resistors 113 and 114 to produce a third position signal Jc1, and the position signals Ja1 and Jb1 are compounded by the resistors 115 and 116 to produce a third phase position signal Jc2. Consequently, the position detecting part 100 obtains three-phase position signals Ja1, Jb1, and Jc1 (Ja2, Jb2 and Jc2), each having a phase difference of 120 degrees from others electrically and varying in sinusoidal form. Three position detecting elements can also be used to generate three-phase position signals.

The altering signal block 101 generates sinusoidal altering current signals D1, D2 and D3, varying smoothly corresponding to three-phase position signals. The transistors 122 and 123 distribute the current of the constant current source 121 to the collector sides thereof according to the differential voltage between the first phase position signals Ja1 and Ja2. The collector current of the transistor 123 is amplified to be doubled by a current-mirror circuit formed from the transistors 124 and 125, and output from the collector of the transistor 125. The collector current of the transistor 125 is compared with the current of the constant current source 126, and then the differential current between them is output as the first phase altering current signal D1. Consequently, the altering current signal D1 varies smoothly according to the position signal Ja1, so that the current signal D1 flows out (as a positive current part) in a 180 degree active electrical angle section and flows in (as a negative current part) in the next 180 degree active electrical angle section. In the same way, the altering current signal D2 varies smoothly according to the position signal Jb1, so that the current signal D2 flows out (as a positive current) in a 180 degree active electrical angle section and flows in (as a negative current part) in the next 180 degree active electrical angle section. In the same way, the altering current signal D3 varies smoothly according to the position signal Jc1, so that the current signal D3 flows out (as a positive current part) in a 180 degree active electrical angle section and flows in (as a negative current part) in the next 180 degree active electrical angle section. Consequently, the altering current signals D1, D2 and D3 become sinusoidal three-phase current signals, each having a specified phase difference from others. FIG. 10(a) illustrates the waveforms of the altering current signals D1, D2 and D3. The horizontal axis in FIG. 10 indicates the rotational position of the movable member 1.

The distributed signal producing part 36 shown in FIG. 1 includes a first distributor 37 and a second distributor 38. The first distributor 37 distributes the first supply current signal C1 of the supply signal producing part 30 corresponding to the three-phase altering current signals D1, D2 and D3 of the altering signal producing part 34, thereby producing three-phase first distributed current signals E1, E2 and E3, each varying smoothly. The second distributor 38 distributes the second supply current signal C2 of the supply signal producing part 30 corresponding to the three-phase altering current signals D1, D2 and D3 of the altering signal producing part 34, thereby producing three-phase second distributed current signals G1, G2 and G3, each varying smoothly.

Figure 4:
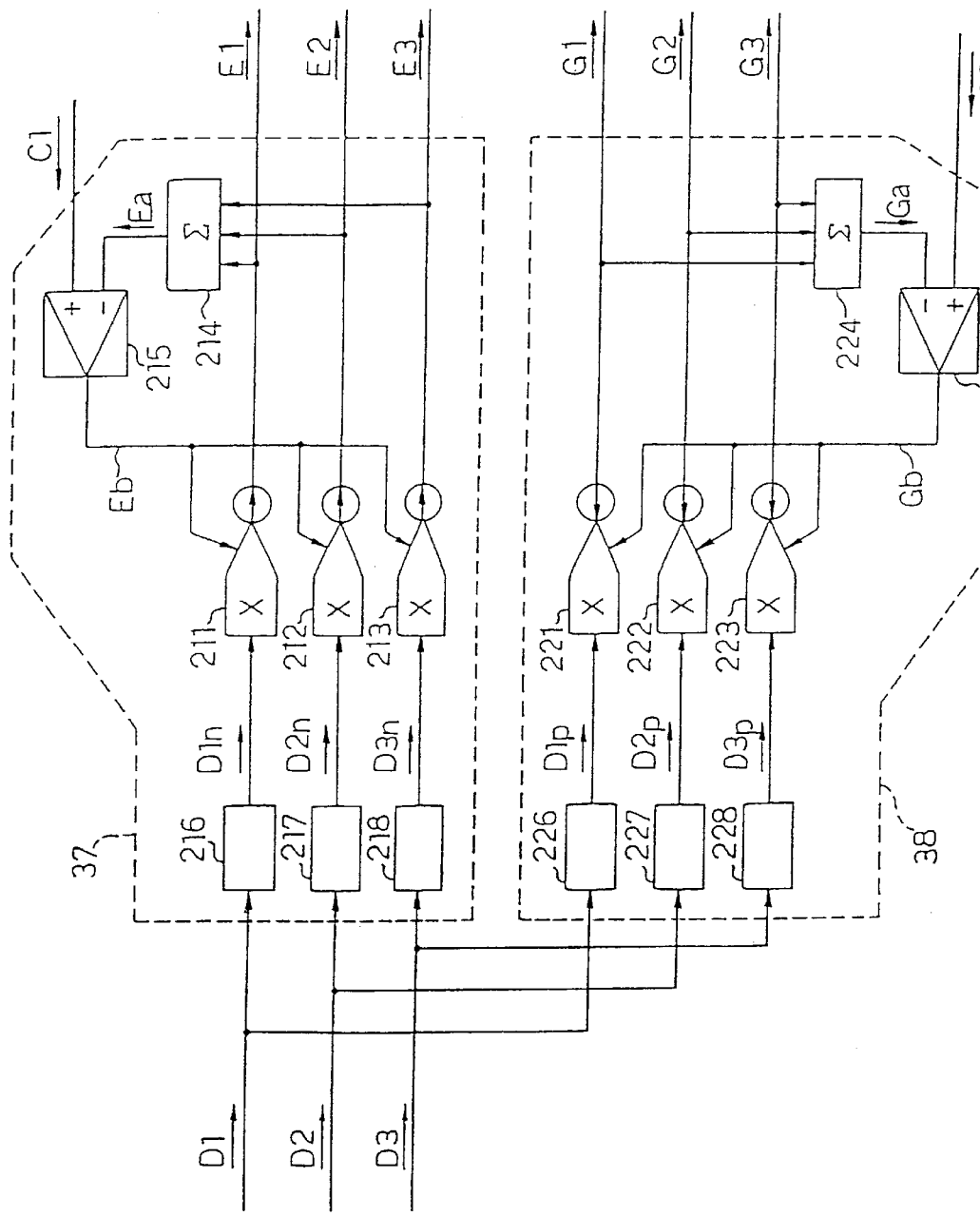
FIG. 4 is a circuit diagram of a distributed signal producing part 36 in the embodiment 1.

FIG. 4 shows a configuration of the distributed signal producing part 36. The first separating circuit 216 of the first distributor 37 outputs a first separated signal D1n corresponding to or responding with the negative current part of the altering current signal D1 from the altering signal producing part 34. The first separating circuit 217 outputs a first separated signal D2n corresponding to or responding with the negative current part of the altering current signal D2 from the altering signal producing part 34. The first separating circuit 218 outputs a first separated signal D3n corresponding to or responding with the negative current part of the altering current signal D3 from the altering signal producing part 34. Consequently, the first separating circuits 216, 217 and 218 of the first distributor 37 obtain three-phase first separated signals D1n, D2n and D3n corresponding to or responding with the negative current parts of the three-phase altering current signals D1, D2 and D3.

The first multiplying circuit 211 of the first distributor 37 multiplies the first separated signal D1n of the first separating circuit 216 by a first feedback signal Eb of the first feedback circuit 215 so as to output a first distributed current signal E1 proportional to the result of the multiplication. In the same way, the first multiplying circuit 212 multiplies a first separated signal D2n of the first separating circuit 217 by a first feedback signal Eb of the first feedback circuit 215 so as to output the first distributed current signal E2 proportional to the result of the multiplication. In the same way, the first multiplying circuit 213 multiplies a first separated signal D3n of the first separating circuit 218 by a first feedback signal Eb of the first feedback circuit 215 so as to output the first distributed current signal E3 proportional to the result of the multiplication.

The first composing circuit 214 adds up the values of the first distributed current signals E1, E2 and E3 and outputs a first composed signal Ea corresponding to the total value. The first feedback circuit 215 obtains the first feedback signal Eb corresponding to a difference between the first composed signal Ea of the first composing circuit 214 and the first supply current signal C1 of the supply signal producing part 30. Consequently, the first multiplying circuits 211, 212 and 213, the first composing circuit 214 and the first feedback circuit 215 are combined to form a feedback loop, so that the first composed signal Ea takes a value corresponding to the first supply current signal C1. Since the first composed signal Ea corresponds to a total value of the three-phase first distributed current signals E1, E2 and E3, the three-phase first distributed current signals E1, E2 and E3 are proportional to the three-phase first separated signals D1n, D2n and D3n. As a result, the three-phase first distributed current signals E1, E2 and E3 of the first distributor 37 become three-phase current signals which are obtained by distributing the first supply current signal C1 of the supply signal producing part 30 corresponding to the negative current parts of the three-phase altering current signals D1, D2 and D3 of the altering signal producing part 34 substantially. In other words, the amplitudes of the three-phase first distributed current signals E1, E2 and E3 are changed in proportion to the first supply current signal C1. FIG. 10(b) illustrates waveforms of the three-phase first distributed current signals E1, E2 and E3. The first distributor 37 distributes the first supply current signal C1 to one phase or two phases alternately according to the rotation of the movable member 1, thereby outputting the three-phase first distributed current signals E1, E2 and E3, each having a phase difference of 120 degrees electrically from others. The three-phase first distributed current signals E1, E2 and E3 are positive current signals (flow out current signals).

The second separating circuit 226 of the second distributor 38 outputs a second separated signal D1p corresponding to or responding with the positive current part of the altering current signal D1 from the altering signal producing part 34. The second separating circuit 227 outputs a second separated signal D2p corresponding to or responding with the positive current part of the altering current signal D2 from the altering signal producing part 34. The second separating circuit 228 outputs a second separated signal D3p corresponding to or responding with the positive current part of the altering current signal D3 from the altering signal producing part 34. Consequently, the second separating circuits 226, 227 and 228 of the second distributor 38 obtain second three-phase separated signals D1p, D2p and D3p corresponding to or responding with the positive current parts of the three-phase altering current signals D1, D2 and D3.

The second multiplying circuit 221 of the second distributor 38 multiplies a second separated signal D1p of the second separating circuit 226 by a second feedback signal Gb of the second feedback circuit 225 so as to output a second distributed current signal G1 proportional to the result of the multiplication. In the same way, the second multiplying circuit 222 multiplies a second separated signal D2p of the second separating circuit 227 by a second feedback signal Gb of the second feedback circuit 225 so as to output a second distributed current signal G2 proportional to the result of the multiplication. In the same way, the second multiplying circuit 223 multiplies a second separated signal D3p of the second separating circuit 228 by a second feedback signal Gb of the second feedback circuit 225 so as to output a second distributed current signal G3 proportional to the result of the multiplication.

The second composing circuit 224 adds up the values of the three-phase second distributed current signals G1, G2 and G3 and outputs the second composed signal Gb corresponding to the total value. The second feedback circuit 225 obtains the second feedback signal Gb corresponding to a difference between the second composed signal Gb of the second composing circuit 224 and the second supply current signal C2 of the supply signal producing part 30. Consequently, the second multiplying circuits 221, 222 and 223, the second composing circuit 224 and the second feedback circuit 225 are combined to form a feedback loop, so that the second composed signal Gb takes a value corresponding to the second supply current signal C2. Since the second composed signal Gb corresponds to a total value of the three-phase second distributed current signals G1, G2 and G3, the three-phase second distributed current signals G1, G2 and G3 are proportional to the three-phase second separated signals D1p, D2p and D3p. As a result, the three-phase second distributed current signals G1, G2 and G3 of the second distributor 38 become three-phase current signals which are obtained by distributing the second supply current signal C2 of the supply signal producing part 30 corresponding to the altering current signals D1, D2 and D3 from the altering signal producing part 34 substantially. In other words, the amplitudes of the three-phase second distributed current signals G1, G2 and G3 are changed in proportion to the second supply current signal C2. FIG. 10(c) illustrates waveforms of the three-phase second distributed current signals G1, G2 and G3. The second distributor 38 distributes the second supply current signal C2 to one phase or two phases alternately according to the rotation of the movable member 1, thereby outputting the three-phase second distributed current signals G1, G2 and G3, each having a phase difference of 120 degrees electrically from others. The second three-phase distributed current signals G1, G2 and G3 are negative current signals (flow in current signals).

There is a phase difference of 180 degrees between the first distributed current signal E1 and the second distributed current signal G1, and the signals E1 and G1 are varied smoothly and complementarily (necessarily, either of E1 or G1 is zero). In the same way, there is a phase difference of 180 degrees between the first distributed current signal E2 and the second distributed current signal G2, and the signals E2 and G2 are varied smoothly and complementarily (necessarily, either of E2 or G2 is zero). In the same way, there is a phase difference of 180 degrees between the first distributed current signal E3 and the second distributed current signal G3, and the signals E3 and G3 are varied smoothly and complementarily (necessarily, either of E3 or G3 is zero).

The first distributed current signals E1, E2 and E3 of the first distributor 37 shown in FIG. 1 are entered to the first current amplifying parts 41, 42 and 43, respectively. The first current amplifying parts 41, 42 and 43 amplify the first distributed current signals E1, E2 and E3 by a predetermined factor, thereby producing first amplified current signals F1, F2 and F3, respectively.

Figure 5:
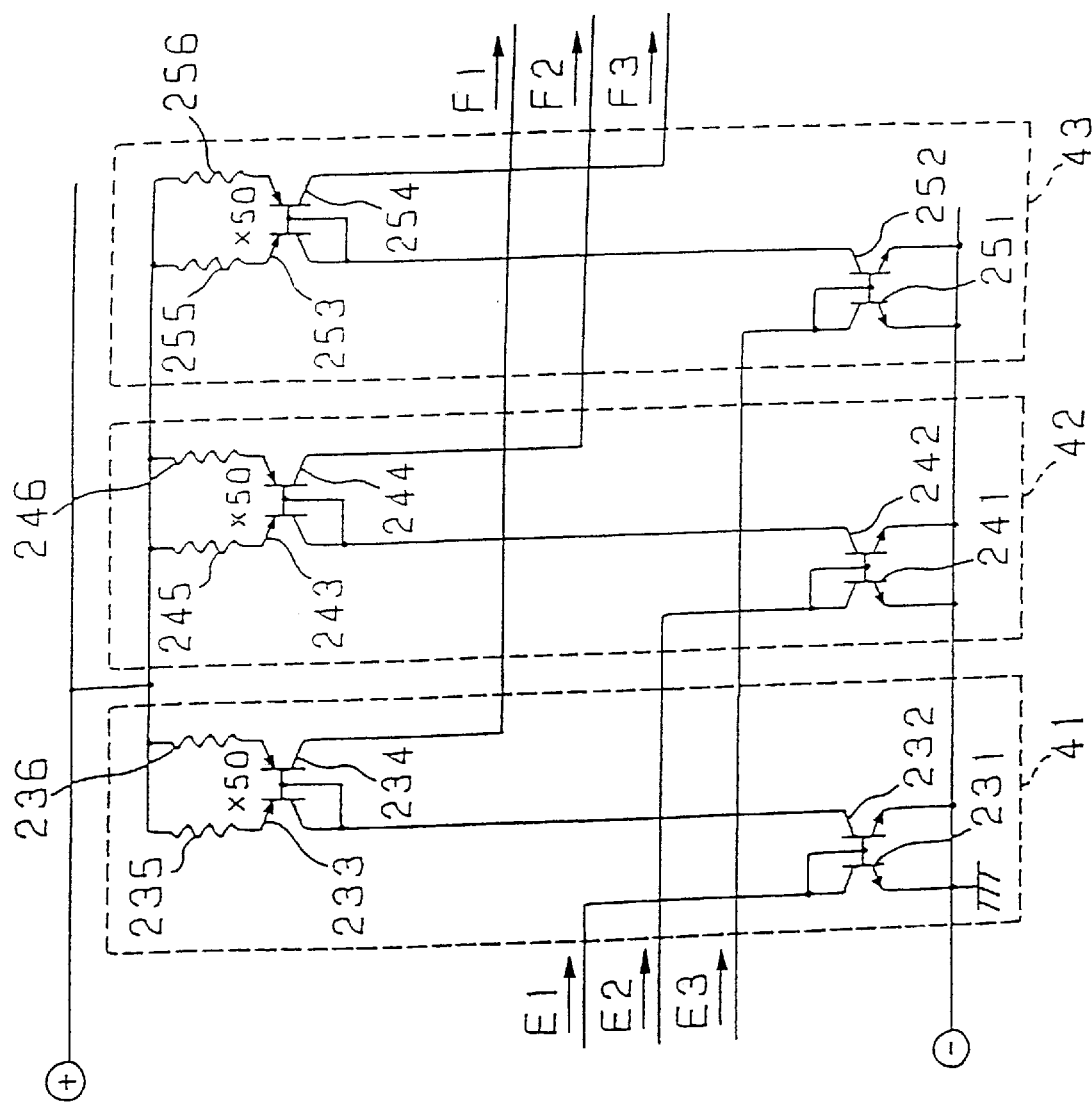
FIG. 5 is a circuit diagram of first current amplifying parts 41, 42 and 43 in the embodiment 1.

FIG. 5 shows a configuration of the first current amplifying parts 41, 42 and 43. The first current amplifying part 41 is configured by a first amplifying part current-mirror circuit which includes the first-stage current-mirror circuit consisting of transistors 231 and 232 and the next-stage current-mirror circuit consisting of transistors 233 and 234 and resistors 235 and 236. The emitter areas of both transistors 231 and 232 are set equally and the current amplifying factor of the first-stage current-mirror circuit is set to one. The emitter area ratio of the transistor 233 to the transistor 234 is set to 50 times and the resistance ratio of the resistor 236 to the resistor 235 is set to 50 times, so as to amplify a current signal by a predetermined factor of 50 times in the next-stage current-mirror circuit. In the same way, the first current amplifying part 42 is configured by a first amplifying part current-mirror circuit consisting of transistors 241, 242, 243 and 244, and resistors 245 and 246 to amplify a current signal by a predetermined factor of 50 times. In the same way, the first current amplifying part 43 is configured by a first amplifying part current-mirror circuit consisting of transistors 251, 252, 253 and 254, and resistors 255 and 256 to amplify a current signal by a predetermined factor of 50 times. Consequently, the first current amplifying parts 41, 42 and 43 amplify the three-phase first distributed current signals E1, E2 and E3 by a predetermined factor of 50 times, respectively, thereby producing the three-phase first amplified current signals F1, F2 and F3.

The second distributed current signals G1, G2 and G3 of the second distributor 38 shown in FIG. 1 are entered to the second current amplifying parts 45, 46 and 47, respectively. The second current amplifying parts 45, 46 and 47 amplify the second distributed current signals G1, G2 and G3 by a predetermined factor, thereby producing second amplified current signals H1, H2 and H3. A high-voltage outputting part 51 charges upconverting capacitors according to a high frequency pulse signal, and produces a high level potential Vu which is higher than the positive terminal side potential Vcc of the DC power source part 50. The second amplified current signals H1, H2 and H3 are supplied to the conduction control terminal sides of the second FET power current-mirror circuits of the second power amplifying parts 15, 16 and 17 from the high level point Vu of the high-voltage outputting part 51. Thus, the output transistors of the second current amplifying parts 45, 46 and 47 are prevented from saturation and the second NMOS-FET power transistors 65, 66 and 67 are conducted enough.

Figure 6:
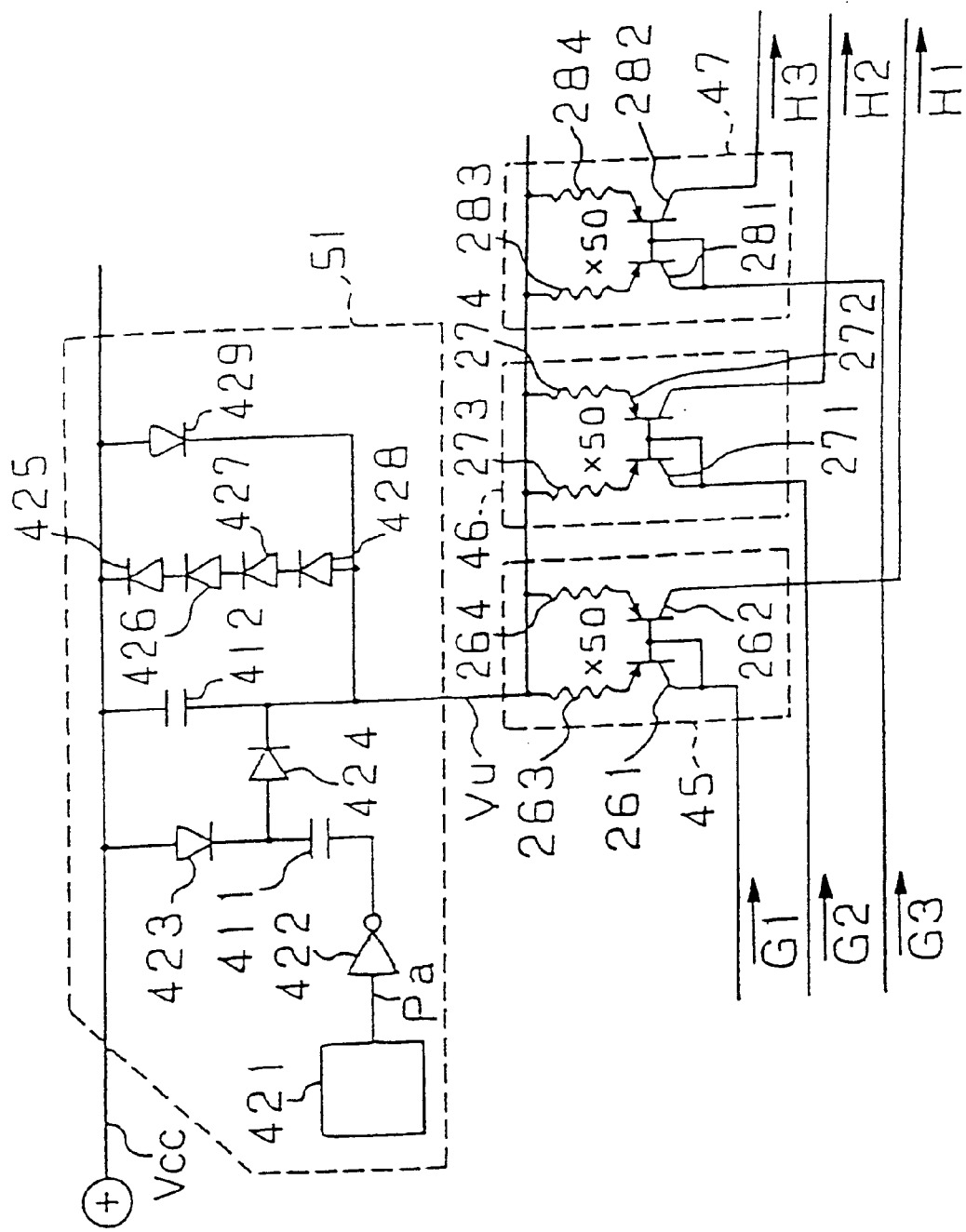
FIG. 6 is a circuit diagram of second current amplifying parts 45, 46 and 47, and a high-voltage outputting part 51 in the embodiment 1.

FIG. 6 shows a configuration of the second current amplifying parts 45, 46 and 47, as well as the high-voltage outputting part 51. The second current amplifying part 45 is configured by a second amplifying part current-mirror circuit consisting of transistors 261 and 262, and resistors 263 and 264. The emitter area ratio of the transistor 261 to the transistor 262 is set to 50 times and the resistance ratio of the resistor 264 to the resistor 263 is set to 50 times, so that the second current amplifying part 45 amplifies the current signal G1 by 50 times. In the same way, the second current amplifying part 46 is configured by a second amplifying part current-mirror circuit consisting of transistors 271 and 272, and resistors 273 and 274 to amplify the current signal G2 by 50 times. In the same way, the second current amplifying part 47 is configured by a second amplifying part current-mirror circuit consisting of transistors 281 and 282, and resistors 283 and 284 to amplify the current signal G3 by 50 times. Consequently, the second current amplifying parts 45, 46 and 47 amplify the three-phase second distributed current signals G1, G2 and G3, respectively, thereby outputting the three-phase second amplified current signals H1, H2 and H3.

The high-voltage outputting part 51 has a pulse generating circuit 421 that outputs a pulse signal Pa of about 100 kHz, a first upconverting capacitor 411, a second upconverting capacitor 412, a first voltage limit circuit consisting of diodes 425 to 428 and a second voltage limit circuit consisting of a diode 429. The level of an inverter 422 is changed digitally by the pulse signal Pa of the pulse generating circuit 421. When the level of the inverter 422 is "L" (Low, or at, for example, the negative terminal side potential of the DC power source part 50), the first upconverting capacitor 411 is charged via the diode 423. When the inverter 422 changes to "H" (High, or to, for example, the positive terminal side potential of the DC power source part 50), the electric charge stored in the first upconverting capacitor 411 is transferred to the second upconverting capacitor 412 via the diode 424. Thus, the second upconverting capacitor 412 is charged. Consequently, the high level potential Vu is output at a terminal of the second upconverting capacitor 412. The potential Vu is higher than the positive terminal side potential Vcc of the DC power source part 50. The high level potential Vu is coupled to the second current amplifying parts 45, 46 and 47.

If the second upconverting capacitor 412 is continued to be charged, the high level potential Vu rises too high, so that transistors and diodes in an integrated circuit may have a voltage breakdown. In order to avoid such a problem, therefore, a first voltage limit circuit consisting of diodes 425 to 428 is provided to limit the high level potential Vu within a specified value. If no voltage breakdown is expected, the first voltage limit circuit is omissible.

The second amplified current signals H1, H2 and H3 operate so as to discharge the charge stored in the second upconverting capacitor 412. If a large current operation is continued long, for example, when starting the motor, the second upconverting capacitor 412 is discharged much, so that the potential Vu drops significantly sometimes. In order to avoid such a problem, therefore, a second voltage limit circuit consisting of a diode 429 is provided to prevent the high level potential Vu from dropping excessively. The second voltage limit circuit does not function in the normal speed controlled state in which the current level is small. If the potential Vu fluctuates only slightly, the second voltage limit circuit is omissible.

Figure 7:
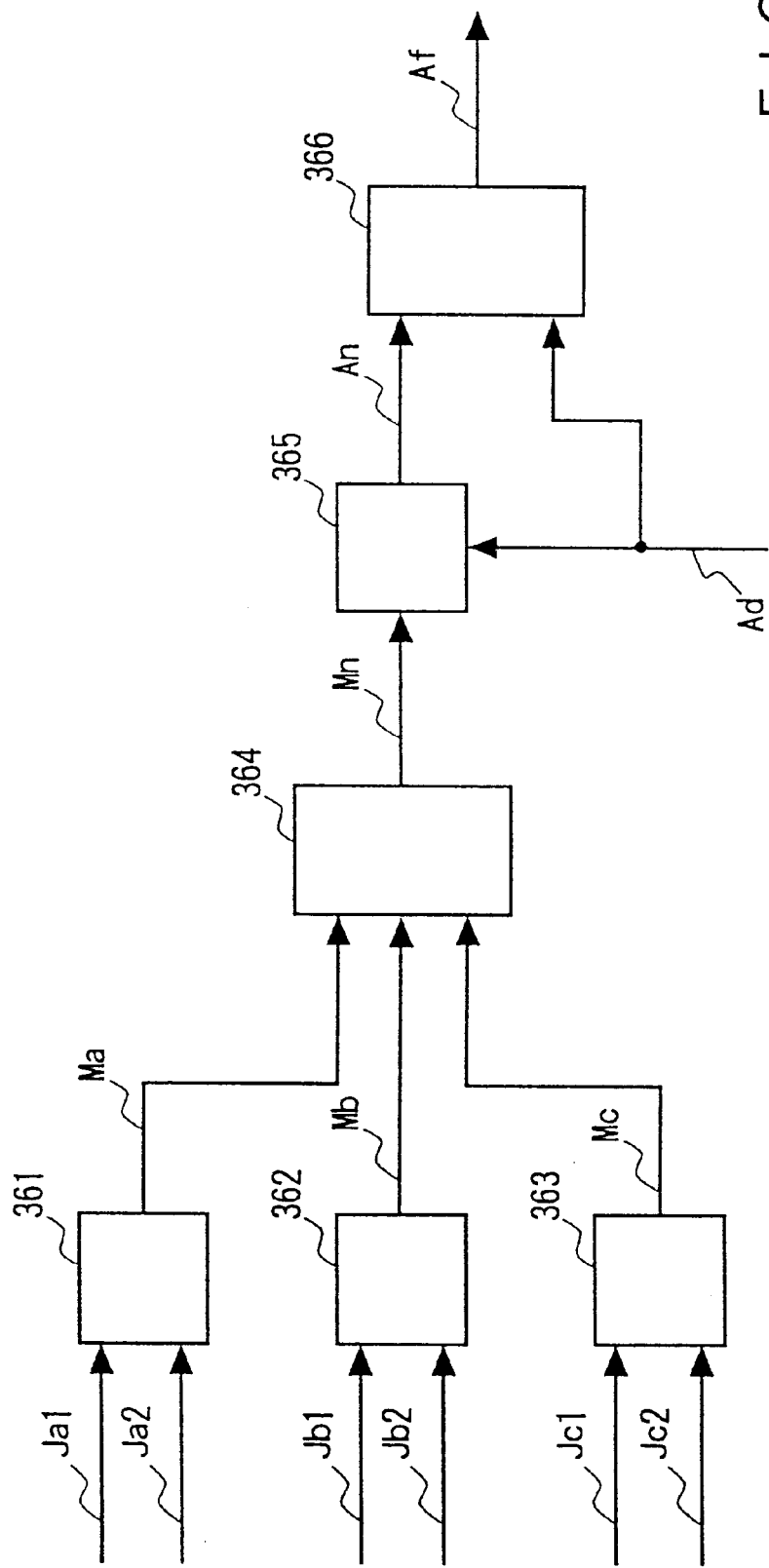
FIG. 7 is a circuit diagram of a command modifying part 23 in the embodiment 1.

The command modifying part 23 shown in FIG. 1 has an input of the command signal Ad of the command signal producing part 20 and outputs a modified command signal Af from the command signal Ag corresponding to output signals of the altering signal producing part 34. FIG. 7 shows a circuit diagram of the command modifying part 23. An absolute circuit 361 outputs an absolute signal Ma responding with the absolute value of the position signal Ja1 from the altering signal producing part 34. An absolute circuit 362 outputs an absolute signal Mb responding with the absolute value of the position signal Jb1 from the altering signal producing part 34. An absolute circuit 363 outputs an absolute signal Mc responding with the absolute value of the position signal Jc1 from the altering signal producing part 34. A minimum detecting circuit 364 obtains a minimum signal Mn corresponding to the minimum value among the three-phase absolute signal Ma, Mb, and Mc. A multiplying circuit 365 produces a command product signal An corresponding to the product value of the minimum signal Mn and the command signal Ad. A mixing circuit 366 obtaines the modified command signal Af by adding or subtracting the command signal Ad and the command product signal An.

Figures 11A, 11B, 11C, 11D:
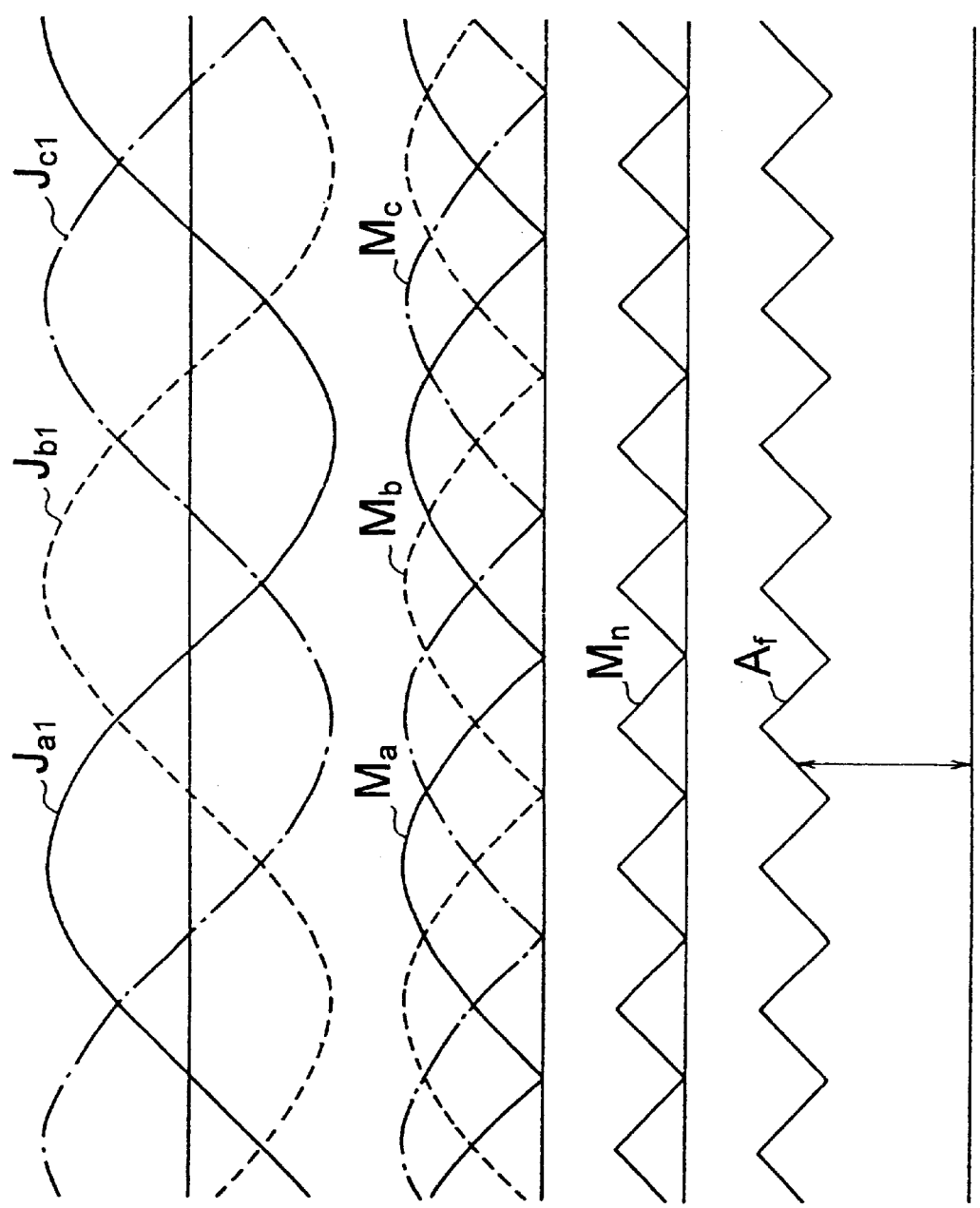
FIG. 11 is a waveform chart for explaining the operation of the command modifying part 23 in the embodiment 1.
Figure 12:
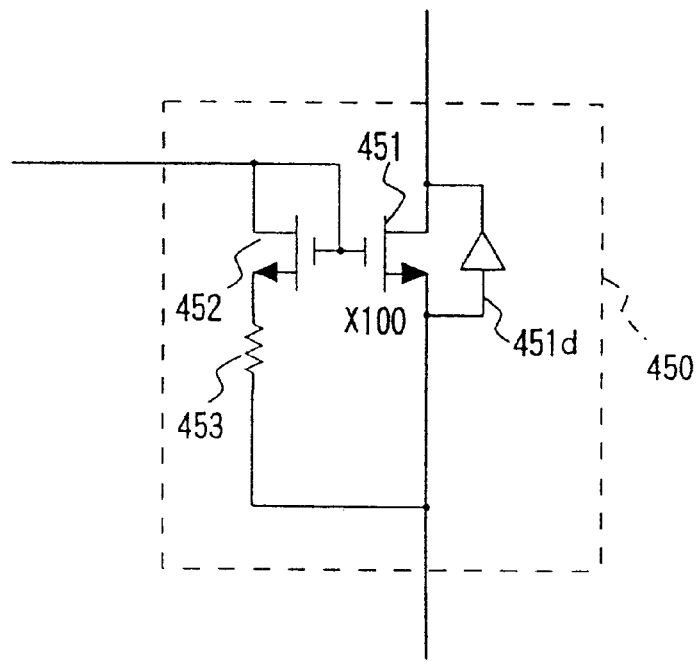
FIG. 12 is a circuit diagram showing another configuration of the power amplifying part in the embodiment of the present invention.

Therefore, the modified command signal Af includes a part of high component, responding with the command product signal An, which has an amplitude proportional or substantially proportional to the command signal Ad and changes corresponding to the output signals Ja1, Jb1, and Jc1 of the altering signal producing part 34. That is, the part of high component is a higher harmonic signal of 6th or higher degree which is synchronized with the position signal Ja1 or the altering signal D1 of the altering signal producing part 34. Besides, the ratio of the part of high component in the modified command signal Af is adequately determined by mixing the command signal Ad and the command product signal An in the mixing circuit 366. FIG. 11 shows signals relating to the operation of the command modifying part 23. The output signals Ja1, Jb1, and Jc1 of the altering signal producing part 34 are shown in FIG. 11(*a*), the three-phase absolute signals Ma, Mb, and Mc are shown in FIG. 11(b), the minimum signal Mn is shown in FIG. 11(*c*), and the modified command signal Af of the command modifying part 23 is shown in FIG. 11(*d*) in the case of the command signal Ad being constant. Besides, the horizontal axis corresponds to a rotational position of the moving member 1.

The current detecting part 21 shown in FIG. 1 detects a conducted current signal Ig supplied from the DC power source part 50 and outputs a current detected signal Ag corresponding to the conducted current signal Ig. The switching control part 22 compares the modified command signal Af with the current detected signal Ag and turns on/off the control pulse signals Y1, Y2 and Y3 according to the comparison result, thereby causing the first NMOS-FET power transistors 61, 62 and 63 of the first power amplifying parts 11, 12 and 13 to perform high frequency switching operations. The switching control part 22, the current detecting part 21, and the command modifying part 23 together form a switching operation block.

Figure 8:
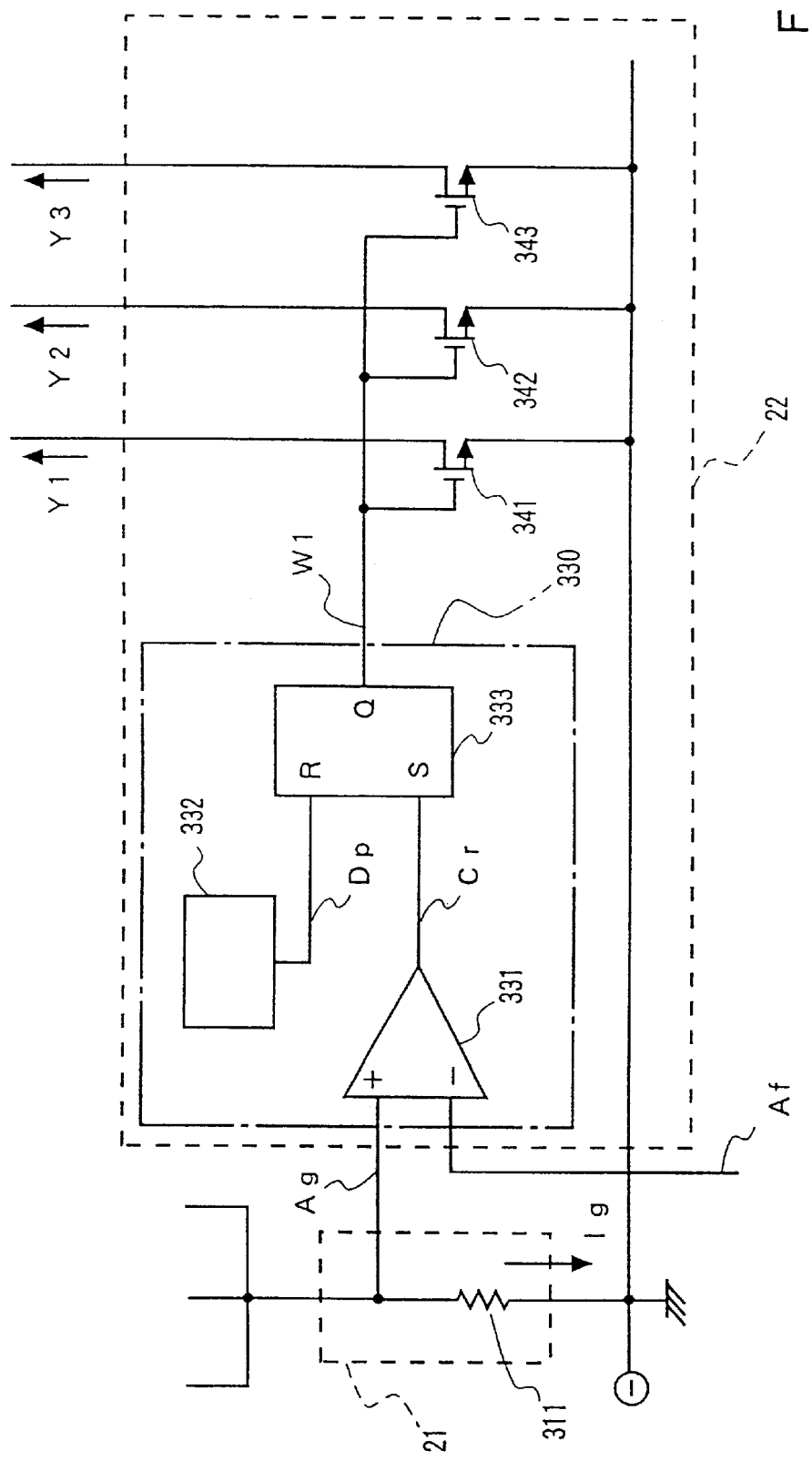
FIG. 8 is a circuit diagram of a switching control part 22 and a current detecting part 21 in the embodiment 1.

FIG. 8 shows a configuration of the current detecting part 21 and the switching control part 22. The current detecting part 21 is configured by a current detecting resistor 311 inserted in a current supply path of the DC power source part 50, and the conducted current signal Ig from the DC power source part 50 to the windings 2, 3 and 4 is detected by a voltage drop of the resistor 311, thereby outputting the current detected signal Ag.

The switching control part 22 includes a switching pulse circuit 330 that obtains a switching control signal W1. A comparing circuit 331 of the switching pulse circuit 330 compares the current detected signal Ag with the modified command signal Af, and obtains a compared output signal Cr. A trigger generating circuit 332 outputs a high frequency trigger pulse signal Dp of about 100 kHz so as to trigger a state holding circuit 333 repetitively at short intervals. The state holding circuit 333 changes the state of the switching control signal W1 to "Lb" (low potential state) at a rising edge of the trigger pulse signal Dp and to "Hb" (high potential state) at a rising edge of the compared output signal Cr. When the state of the switching control signal W1 turns to "Lb", the control transistors 341, 342 and 343 are turned off simultaneously or concurrently, so that the control pulse signals Y1, Y2 and Y3 are turned off (non-conducted state). At this time, the first power amplifying parts 11, 12 and 13 amplify the first amplified current signals F1, F2 and F3, thereby forming current paths for supplying negative current parts of the drive current signals to the windings 2, 3 and 4. When the state of the switching control signal W1 turns to "Hb", the control transistors 341, 342 and 343 are turned on simultaneously or concurrently, so that the control pulse signals Y1, Y2 and Y3 are turned on (conducted state). As a result, the input current signals to the conduction control terminal sides of the first power amplifying parts 11, 12 and 13 are bypassed. Thus, the first NMOS-FET power transistors 61, 62 and 63 of the first power amplifying parts 11, 12 and 13 are all turned off simultaneously or concurrently. Therefore, the first power amplifying parts 11, 12 and 13 are controlled at a high-frequency switching operation by a single pulse signal of the switching control signal W1. The drive voltage signals V1, V2 and V3 become pulsive corresponding to the switching control signal W1, and the conducted supply current signal Ig corresponding to the composed supply current signal of the drive current signals I1, I2 and I3 is controlled by the switching control signal W1, thereby controlling the drive current signals I1, I2 and I3 to the windings 2, 3 and 4 corresponding to the modified command signal Af. Hereunder, this operation will be described more in detail.

When the level of the switching control signal W1 of the state holding circuit 333 is changed to "Lb" at a rising edge of the trigger pulse signal Dp, the first NMOS-FET power transistors of the first power amplifying parts 11, 12 and 13 are conducted according to the first amplified current signals F1, F2 and F3, which corresponds to the first distributed current signals E1, E2 and E3 selected and distributed by the first distributor 37. For example, when only the first distributed current signal E1 and then the first amplified current signal F1 are selected, the first NMOS-FET power transistor 61 of the first power amplifying part 11 is turned on. For supplying the negative current part of the drive current signal I1 to the winding 2 sufficiently, the first NMOS-FET power transistor 61 becomes in the full-on state. In the full-on state of an FET transistor, the voltage drop between the current input and output terminal sides of the transistor becomes very small due to a small ON resistance. The negative part of the drive current signal I1 to the winding 2 is increasing gradually due to an inductance of the winding 2. Consequently, the composed supply current signal Ig and the current detected signal Ag of the current detecting part 21 are also increasing. And, at a moment the value of the current detected signal Ag exceeds the value of the modified command signal Af, the compared output signal Cr of the comparing circuit 331 generates a rising edge, and thereby the switching control signal W1 of the state holding circuit 333 turns to "Hb". Then, the control transistors 341, 342 and 343 become turned on, and the conduction control terminal sides of the first power amplifying parts 11, 12 and 13 are connected to the negative terminal side of the DC power source part 50, thereby causing all of the first NMOS-FET power transistors 61, 62 and 63 to become turned off simultaneously or concurrently. Therefore, the conducted current signal Ig becomes zero. The off state of an FET transistor means a state in which no current flows through the transistor from the input terminal side to the output terminal side. At this time, the inductance of the winding 2 increases the drive voltage VI pulsively or abruptly, thereby forming a current path passing through the second power diode 65d of the second power amplifying part 15. As a result, the negative current part of the drive current signal I1 to the winding 2 flows continuously. The negative current value of the drive current signal I1 to the winding 2 is reducing gradually. Then, in a short time, the next rising edge of the trigger pulse signal Dp appears, thus, enabling the switching operation to be repeated as described above. Therefore, the trigger pulse signal Dp makes the first power amplifying parts to perform high frequency switching operation, respectively. Since this switching operation is performed at about 100 kHz, switching ripples of the drive current signals are very small.

The conducted current signal Ig of the DC power source part 50, which is equal to the composed supply current of the negative (or positive) parts of the three-phase drive currents I1, I2 and I3 to the three-phase windings 2, 3 and 4, is controlled pulsively or abruptly to the value responding with the modified command signal Af, thereby controlling continuously the drive current signals to the windings 2, 3 and 4. The conducted current of the activated first NMOS-FET power transistor never exceeds the value of the conducted current signal Ig of the DC power source part 50. Consequently, it is possible to cause the activated first power transistor of the first power amplifying part to perform an on-state switching operation surely by supplying the first amplified current signal responding with the command signal Ad to the conduction control terminal side of the activated first power amplifying part.

In correspondence with the movement of the movable member 1, the first distributor 37 distributes the first supply current signal C1 co one or two of the first distributed current signals alternately and smoothly, and the current paths to the windings are altered smoothly. For example, assume that the first distributed current signals E1 and E2, as well as the first amplified current signals F1 and F2 are supplied. When the switching control signal W1 of the state holding circuit 333 is changed to "Lb" at a rising edge of the trigger pulse signal Dp, the first NMOS-FET power transistor 61 of the first power amplifying part 11 and the first NMOS-FET power transistor 62 of the first power amplifying part 12 are turned active simultaneously. At this time, the first NMOS-FET power transistor 61 is active (full-on or half-on state) owing to the first amplified current signal F1, thereby forming a current path for supplying the negative current part of the drive current signal I1 to the winding 2. The first NMOS-FET power transistor 62 is active (full-on or half-on state) owing to the first amplified current signal F2, thereby forming a current path for supplying the negative current part of the drive current signal I2 of the winding 3. At this time, at least one of the first NMOS-FET power transistors 61 and 62 is in the full-on state, and at most one of the first NMOS-FET power transistors 61 and 62 is in the half-on state. When a power transistor is operating in the half-on state, the FET power current-mirror circuit in a power amplifying part amplifies the input current signal to the conduction control terminal side by a specified amplifying factor. The conducted current signal Ig of the DC power source part 50 becomes equal to the composed supply current obtained by summing the negative current parts of the drive current signals I1, I2 and I3 to the windings 2, 3 and 4. The inductances of the windings increase the conducted current signal Ig gradually. When the current detected signal Ag exceeds the modified command signal Af, the compared output signal Cr generates a rising edge, and thereby the switching control signal W1 is changed to "Hb". The control transistors 341, 342 and 343 are thus turned on. Consequently, the conduction control terminal sides of the first power amplifying parts 11, 12 and 13 are connected to the negative terminal side of the DC power source part 50 concurrently, thereby the first NMOS-FET power transistors 61, 62 and 63 are turned off simultaneously. Therefore, the conducted current signal Ig becomes zero. The inductance of the winding 2 increases the drive voltage signal V1 pulsively or abruptly, thereby forming a current path passing through the second power diode 65d of the second power amplifying part 15 so as to flow continuously the negative current part of the drive current signal I1 to the winding 2. The negative current of the drive current signal I1 to the winding 2 is decreasing gradually. Also the inductance of the winding 3 increases the drive voltage signal V2 pulsively or abruptly, thereby forming a current path passing through the second power diode 66d of the second power amplifying part 16 so as to flow continuously the negative current part of the drive current signal I2 to the winding 3. The negative current of the drive current signal I2 to the winding 3 decreasing gradually. Soon the next rising edge of the trigger pulse signal Dp appears, thus enabling the switching operation to be repeated as described above. In accordance with the movement of the movable member 1, the first distributed current signals E1 and E2, as well as the first amplified current signals F1 and F2 can be varied, thereby changing the negative current parts of the drive current signals I1 and I2 to the windings 2 and 3 smoothly. In the same way, current paths to the windings are altered smoothly. Since amplitudes of the three-phase first amplified current signals are varied in proportion to or approximately in proportion to the command signal Ad in this embodiment, the current paths can be altered smoothly even when the command signal Ad is changed.

The second NMOS-FET power transistors of the second power amplifying parts 15, 16 and 17 are activated responding with the second amplified current signals H1, H2 and H3, which corresponds to the second distributed current signals G1, G2 and G3 selected and distributed by the second distributor 38. For example, when only the second distributed current signal G2 and then the second amplified current signal H2 are selected, the second NMOS-FET power transistor 66 of the second power amplifying part 16 is turned on. For supplying the positive current part of the drive current signal I2 to the winding 3 sufficiently, the second NMOS-FET power transistor 66 becomes in the full-on state. Since the conducted current signal Ig of the DC power source part 50 and the composed supply current signal to the windings are controlled corresponding to the modified command signal Af as described above, the positive current part of the drive current signal I2 to the winding 3 is also controlled corresponding to the modified command signal Af. Therefore, it is possible to cause the activated second power transistor of the second power amplifying part to perform in the full-on state surely by supplying the second amplified current signal according to the command signal Ad to the conduction control terminal side of the second power amplifying part.

In correspondence with the movement of the movable member 1, the second distributor 38 distributes the second supply current signal C2 to one or two of the second distributed current signals alternately and smoothly and the current paths to the windings are altered smoothly. For example, assume that the second distributed current signals G2 and G3, as well as the second amplified current signals H2 and H3 are supplied. At this time, the second NMOS-FET power transistor 66 of the second power amplifying part 16 and the second NMOS-FET power transistor 67 of the second power amplifying part 17 are activated. The second NMOS-FET power transistor 66 is active (full-on or half-on state) according to the second amplified current H2, thereby forming a current path for supplying the positive current part of the drive current signal I2 to the winding 3. The second NMOS-FET power transistor 67 is active (full-on or half-on state) responding with the second amplified current signal H3, thereby forming a current path for supplying the positive current part of the drive current signal I3 to the winding 4. At this time, at least one of the second NMOS-FET power transistors 66 and 67 is in the full-on state, and at most one of the second NMOS-FET power transistors 66 and 67 is in the half-on state. When a power transistor is operating in the half-on state, the FET power current-mirror circuit in a power amplifying part amplifies the input current signal to the conduction control terminal side by a specified amplifying factor. The second distributed current signals G2 and G3, as well as the second amplified current signals H2 and H3 vary responding with the movement of the movable member 1, thereby changing the positive current parts of the drive current signals I2 and I3 to the windings 3 and 4 smoothly. In the same way, current paths to the windings are altered smoothly. Since amplitudes of the three-phase second amplified current signals are varied in proportion or approximately in proportion to the command signal Ad in this embodiment, the current paths can be altered smoothly even when the command signal Ad is changed.

Figure 9:
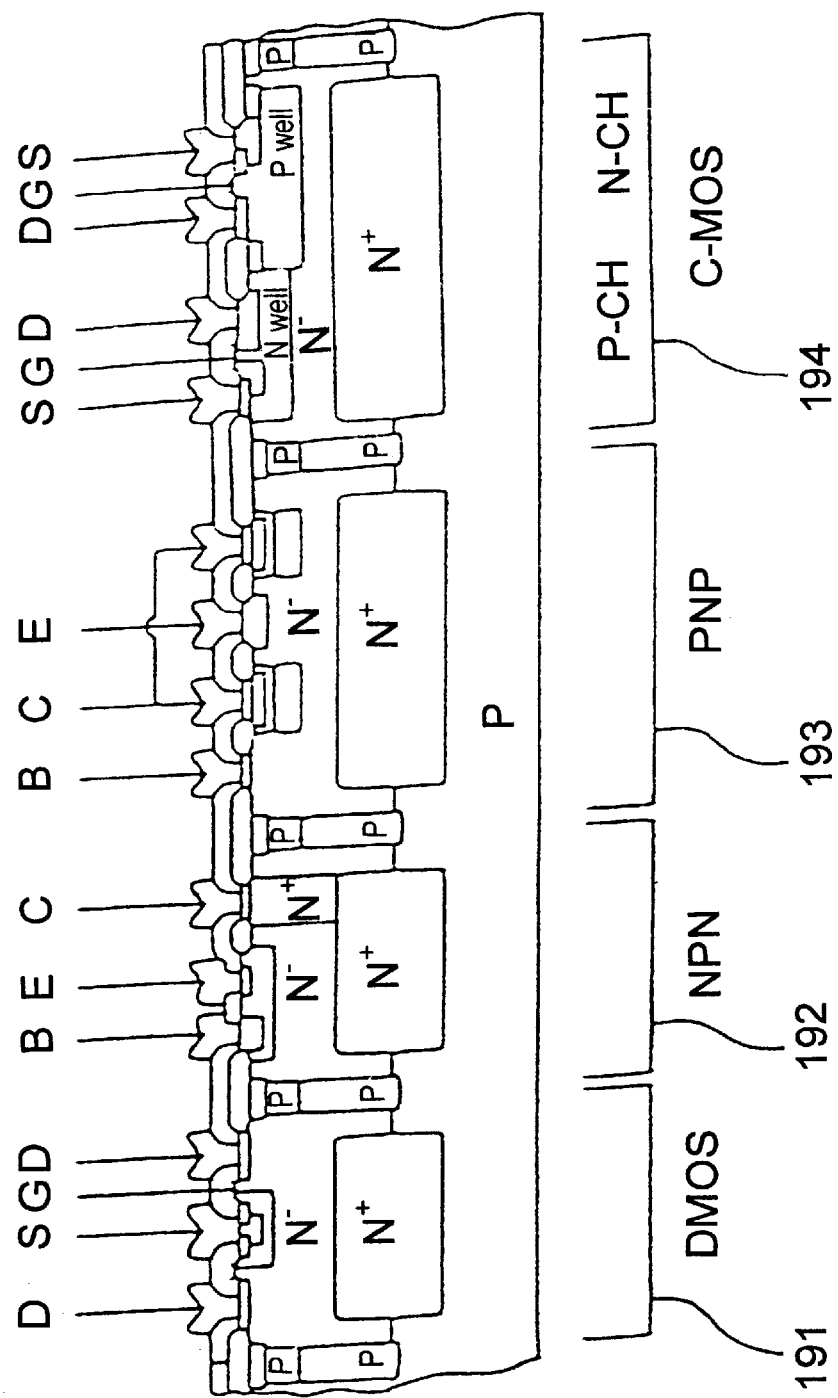
FIG. 9 is a cross sectional view of a portion of an integrated circuit in the embodiment 1.

The first NMOS-FET power transistors 61, 62 and 63 of the first power amplifying parts 11, 12 and 13 shown in FIG. 1, as well as the second NMOS-FET power transistors 65, 66 and 67 of the second power amplifying parts 15, 16 and 17 are junction-isolated so as to be integrated on a single chip silicon substrate together with semiconductor elements of transistors, resistors, etc. used for the command signal producing part 20, the current detecting part 21, the switching control part 22, the supply signal producing part 30, the altering signal producing part 34, the distributed signal producing part 36, the first current amplifying parts 41, 42 and 43, the second current amplifying parts 45, 46 and 47, and the high-voltage outputting part 51. FIG. 9 shows an example of a structure of such an integrated circuit. Various transistors are formed by diffusing required N+ layers, N− layers, P+ layers, P− layers, etc. into a P type silicon substrate. A numeral 191 indicates a double-diffused NMOS-FET transistor, which is used as a first NMOS-FET power transistor or a second NMOS-FET power transistor. The parasitic diode device of this double-diffused NMOS-FET transistor is used as a first power diode or a second power diode. A numeral 192 indicates a bipolar transistor of NPN type, which is used as a signal amplifying transistor. A numeral 193 indicates a bipolar transistor of PNP type, which is used as a signal amplifying transistor. A numeral 194 indicates CMOS FET transistors of the P-channel and the N-channel, which are used to process logic signals. Each transistor is junction-isolated from the others by P layers whose potential are identical to the potential of a silicon substrate connected to the ground potential (0V). A junction-isolated IC can integrate many power transistor devices and signal transistors high-densely on a small single chip substrate by using a low cost manufacturing process. In other words, the IC can be manufactured at a low cost. A specific mask layout is a design item, and so, detailed explanation for the layout is omitted here.

Next, the operation of the motor shown in FIG. 1 will be described. The altering signal producing part 34 generates three-phase altering current signals D1, D2 and D3 varying smoothly and supplies these signals to the first and second distributors 37 and 38 of the distributed signal producing part 36. The first distributor 37 outputs three-phase first distributed current signals E1, E2 and E3, proportional to the first supply current signal C1, responding with the three-phase first separated signals D1n, D2n and D3n. The first current amplifying parts 41, 42 and 43 output the first amplified current signals F1, F2 and F3 by amplifying the first distributed current signals E1, E2 and E3, respectively, thereby supplying the first amplified current signals F1, F2 and F3 to the conduction control terminal sides of the first power amplifying parts 11, 12 and 13. The first NMOS-FET power transistors 61, 62 and 63 of the first power amplifying parts 11, 12 and 13 perform high frequency on/off switching by the control pulse signals Y1, Y2 and Y3 corresponding to the switching control signal W1 from the switching control part 22. When the switching control signal W1 is of the "Lb" level, the first power amplifying parts 11, 12 and 13 amplify the first amplified current signals F1, F2 and F3, thereby forming current paths for supplying negative current parts of the drive current signals I1, I2 and I3 to the three-phase windings 2, 3 and 4. When the switching control signal W1 is turned in the "Hb" level, the first NMOS-FET power transistors 61, 62 and 63 of the first power amplifying parts 11, 12 and 13 are all turned off simultaneously. At this time, the current paths for supplying negative current parts of the drive current signals I1, I2 and I3 to the three-phase windings 2, 3 and 4 are formed by one or two of the second power diodes 65d, 66d and 67d of the second power amplifying parts 15, 16 and 17. Consequently, the drive current signals to the windings can be varied smoothly even while the first power amplifying parts 11, 12 and 13 are performing high frequency switching operations. Consequently, the first power amplifying parts 11, 12 and 13 can smoothly alter the current paths to the windings.

The current detecting part 21 detects the conducted current signal Ig of the DC power source part 50 and outputs the current detected signal Ag corresponding to the conducted current signal Ig. The switch control part 22 compares the modified command signal Af from the command modifying part 23 with the current detected signal Ag of the current detecting part 21, thereby changing the switching control signal W1 according to the comparison result, and causing the first NMOS-FET power transistors 61, 62 and 63 of the first power amplifying parts 11, 12 and 13 (and the first power current-mirror circuit) to turn off simultaneously according to the change of the switching control signal W1. Consequently, one or two FET power transistors of the first NMOS-FET power transistors 61, 62 and 63 of the first power amplifying parts 11, 12 and 13 perform high frequency on/off switching according to the single pulse signal W1, thereby controlling the conducted current signal Ig of the DC power source part 50 so that the composed supply current of the drive current signals to the windings is controlled in accordance with the modified command signal Af. The supply signal producing part 30, the first distributor 37, and the first current amplifying parts 41, 42 and 43 together form a first distribution control block, which controls the conduction periods of the first NMOS-FET power transistors 61, 62 and 63 of the first power amplifying parts 11, 12 and 13. The switching control part 22, the current detecting part 21, and the command modifying part 23 together form the switching operation block, which controls the switching operations of the first NMOS-FET power transistors 61, 62 and 63 of the first power amplifying parts 11, 12 and 13.

On the other hand, the second distributor 38 outputs the second three-phase distributed current signals G1, G2 and G3, proportional to the second supply current signal C2, according to the second three-phase separated signals D1p, D2p and D3p. The second current amplifying parts 45, 46 and 47 output the second amplified current signals H1, H2 and H3 by amplifying the second distributed current signals G1, G2 and G3, respectively, thereby supplying the second amplified current signals H1, H2 and H3 to the conduction control terminal sides of the second power amplifying parts 15, 16 and 17. The second power amplifying parts 15, 16 and 17 amplify the second amplified signals H1, H2 and H3, respectively, thereby supplying positive current parts of the drive current signals I1, I2 and I3 to the three-phase windings 2, 3 and 4, even when the first power amplifying parts 11, 12 and 13 perform high frequency on/off switching. Consequently, the second power amplifying parts 15, 16 and 17 can smoothly alter the current paths to the windings. The supply signal producing part 30, the second distributor 38, and the second current amplifying parts 45, 46 and 47 together form a second distribution control block, which controls the conduction periods of the second NMOS-FET power transistors 65, 66 and 67 of the second power amplifying parts 15, 16 and 17.

The first power amplifying parts 11, 12 and 13 amplify the three-phase first amplified current signals F1, F2 and F3, varying smoothly in rising and/or falling slopes, supplied to their conduction control terminal sides, and perform on/off switching at their conduction control terminal sides by the control pulse signals Y1, Y2 and Y3 of the switching control part 22. Consequently, it becomes possible to alter smoothly the negative current parts of the drive current signals I1, I2 and I3 to the windings 2, 3 and 4, while the first NMOS-FET power transistors 61, 62 and 63 perform high frequency on/off switching operation corresponding to the single switching control signal W1.

The second power amplifying parts 15, 16 and 17 amplifies the three-phase second amplified current signals H1, H2 and H3, varying smoothly in rising and/or falling slopes, supplied to their conduction control terminal sides of the second power amplifying parts 15, 16 and 17. Consequently, it becomes possible to alter smoothly the positive current parts of the drive current signals I1, I2 and I3 to the windings 2, 3 and 4.

Consequently, the first power amplifying parts 11, 12 and 13, as well as the second amplifying parts 15, 16 and 17 can smoothly alter the waveforms of the drive current signals I1, I2 and I3 to the windings 2, 3 and 4. The ripple of the generated force can thus be reduced remarkably in size, thereby realizing a high performance motor and a high performance disk drive apparatus with reduced vibration and acoustic noise as well as reduced power loss.

Furthermore, the command modifying part 23 in the switching operation block produces the modified command signal Af which has an amplitude proportional to the command signal Ad and contains the part of high component varying corresponding to output signals of the altering signal producing part 34 or the movement of the moving member 1. The switching control part 22 controls the peak value of the conducting current signal Ig of the DC power source part 50 corresponding to the modified command signal Af. Thus, each of the three-phase drive currents I1, I2 and I3 to the three-phase windings 2, 3 and 4 has a part of high component contained in the modified command signal Af, and becomes a smooth sinusoidal current with reduced distortion. The ripple in the generated force produced by the three-phase sinusoidal drive currents can be further reduced remarkably, thereby reducing the vibration and acoustic noise of the moving member 1 and the disk 1b. Especially, since the peak value of the conducted current signal Ig of the DC power source part 50 or the composed supply current to the three-phase windings 2, 3 and 4 is controlled so that a part of it is varied corresponding to the altering operation of the current paths to the windings 2, 3 and 4, an excellent disk drive apparatus including an excellent motor is realized with much reduced vibration and acoustic noise of the disk as well as reduced power loss.

Furthermore, the three-phase first amplified current signals are changed in proportion to or approximately in proportion to the command signal Ad so as to supply three-phase input current signals properly to the conduction control terminal sides of the first power amplifying parts. Consequently, even when the drive current signals to the windings are changed corresponding to the command signals Ad, the drive current signals can be altered smoothly. The current paths to the windings can thus always be altered smoothly.

Furthermore, the three-phase second amplified current signals are changed in proportion to or approximately in proportion to the command signal Ad so as to supply three-phase input current signals properly to the conduction control terminal sides of the second power amplifying parts. Consequently, even when the drive current signals to the windings are changed corresponding to the command signal Ad, the drive current signals can be altered smoothly. The current paths to the windings can thus always altered smoothly.

Furthermore, according to the operations of the first distributor 37 and the second distributor 38, the first distributed signal and the second distributed current signal in the same phase are flown complementarily. Thus, the first NMOS-FET power transistor of the first power amplifying part and the second NMOS-FET power transistor of the second power amplifying part in the same phase also function complementarily. Consequently, the first power amplifying part and the second power amplifying part in the same phase supply the bi-directional drive current signal varying smoothly, and do not make a short-circuit current through them.

As described above, the embodiment smoothly alters current paths to the windings with the first and second power amplifying parts switching at a high frequency. The ripple of the generated force to rotate the moving member 1 and the disk 1b can be reduced remarkably, thereby reducing the vibration and acoustic noise of the disk 1b remarkably. The power losses of the first and second power amplifying parts can be reduced remarkably, thereby reducing the power consumption and the heat remarkably. Therefore, the reproducing mechanism of the disk drive apparatus generates much reduced vibration and acoustic noise and much reduced power consumption, and it does not disturb to reproduce an information signal such as an audio-visual movie and a data file from the disk 1b. Since the vibration of the disk 1b is reduced, a jitter of the reproduced signal from the disk 1b becomes small, thereby reducing a bit error rate of the reproduced signal. Since the acoustic noise of the disk 1b at a rotational speed is reduced, an unpleasant noise becomes small, thereby not disturbing to enjoy the audio-visual movie. Since the power consumption is reduced, the disk 1b can be rotated at a relatively high speed, thereby increasing the data rate of the reproduced signal from the disk 1b. Further, though a recordable disk doesn't work well sometimes in a high ambient temperature, the disk drive apparatus can record/reproduce a signal on/from the recordable disk, because of the reduced power consumption of the embodiment. Therefore, an excellent disk drive apparatus with reduced vibration and acoustic noise as well as reduced power consumption can be realized according to the invention.

Further, the embodiment changes the rotational speed of the disk continuously or stepwise in inversely proportional to the radial position of the head, which is called as CLV (Constant Line Velocity) or ZCLV (Zone Constant Line Velocity).

As a result of this, the disk drive apparatus according to the invention has another advantage that a bit rate of the reproducing signal becomes constant or almost constant irrespective of the radial position of the head in reproducing from the disk, or that a density of the recording signal on the disk becomes constant or almost constant irrespective of the radial position of the head in recording to the disk.

Furthermore, since the disk drive apparatus can rapidly accelerate or decelerate the rotational speed of the disk without making a large disk vibration, a large acoustic noise, and a large power dissipation, the disk drive apparatus has further advantage that it can significantly reduce the search time in changing the radial position of the head.

Furthermore, the embodiment has a motor configuration suitable for reducing vibration and acoustic noise as well as power consumption, and the motor can be used not only in the disk drive apparatus but also in many other apparatus.

In this embodiment, the first NMOS-FET power transistors of the first power amplifying parts are turned on/off at a high frequency. Thus, the power loss in the first power amplifying parts becomes small. And, since the second NMOS-FET power transistors of the second power amplifying parts are turned on in supplying a large current, the power loss in the second power amplifying part becomes small. Consequently, this embodiment can provide a motor with excellent power efficiency. In addition, since the first and second amplified current signals are changed responding with the command signal Ad, the power loss caused by input current signals to the conduction control terminal sides of the first and second power amplifying parts also becomes small.

Furthermore, in this embodiment, the three-phase first amplified current signals F1, F2 and F3 (as the first three-phase current signals) are supplied to the conduction control terminal sides of three first power amplifying parts. And, the first three-phase current signals F1, F2 and F3 are varied smoothly in rising and falling slopes. Consequently, the negative current parts of the drive current signals I1, I2 and I3 to the windings 2, 3 and 4 are altered smoothly while one or two of the second NMOS-FET power transistors 61, 62 and 63 of the first amplifying parts 11, 12 and 13 are turned on/off at a high frequency.

Similarly, the three-phase second amplified current signals H1, H2 and H3 (as the second three-phase current signals) are supplied to the conduction control terminal sides of three second power amplifying parts. The second three-phase current signals H1, H2 and H3 are varied smoothly in rising and falling slopes. Consequently, the positive current parts of the drive current signals I1, I2 and I3 to the windings 2, 3 and 4 are altered smoothly even while one or two of the first NMOS-FET power transistors 65, 66 and 67 of the second amplifying parts 15, 16 and 17 are turned active (full-on or half-on).

It is thus possible to alter current paths smoothly, thereby reducing the ripples in both drive current signals and generated force. As a result, the vibration and the acoustic noise of the motor can be reduced remarkably. Furthermore, since at least slopes of the first and second three-phase current signals are changed corresponding to the command signal Ad, altering operation of the current paths can be achieved smoothly even when the motor load is varied. The current signal supplied to the conduction control terminal side of each power amplifying part can be a current signal varying smoothly or substantially smoothly at least in rising and/or falling slopes. For example, the current signal can be a current signal whose value is varied stepwisely.

Furthermore, the current detecting part 21 obtains the current detected signal Ag corresponding to the conducted current signal Ig from the DC power source part 50 to the windings 2, 3 and 4 in this embodiment. So the current detected signal Ag changes corresponding to the composed supply current of the negative or positive parts of the three-phase drive currents to the three-phase windings. The switching control part 22 compares the modified command signal Af of the command modifying part 23 with the output signal Ag of the current detecting part 21 and causes the first NMOS-FET power transistors 61, 62 and 63 of the three first power amplifying parts 11, 12, and 13 to perform on/off switching operations, pulsively or abruptly in accordance with the comparison result. Consequently, the conducted current signal Ig, or the composed supply current, can be controlled corresponding to the modified command signal Af, and the three-phase drive current signals can be altered smoothly even when the modified command signal Af changes. As a result, the motor of the invention can control the generated torque accurately corresponding to the modified command signal Af or the command signal Ad, and it can reduce vibration remarkably. Furthermore, one or two first power amplifying parts are conducted at the repetitive timing of the trigger pulse signal Dp and three first power amplifying parts are turned off simultaneously by a single pulse signal (switching control signal W1). Consequently, the configuration of the embodiment becomes very simple. In other words, although one or two first power amplifying parts are turned on as the movable member 1 is moved, it is only needed that one or two of the first power amplifying parts 11, 12 and 13 are turned on/off at a high frequency in accordance with a single pulse signal, thereby making the configuration of the embodiment very simple. In addition, since only a single pulse signal is used to decide the timing of high frequency switching, the switching timing control is easy and both current detecting operation and current controlling operation become stable. The switching operation block (the switching control part 22, the current detecting part 21, and the command modifying part 23) controls switching operations of power amplifying parts.

In this embodiment, a circuit configuration is suitable for implementation in integrated circuit form. Since parasitic diodes of power transistors are used as power diodes, these power elements can be integrated on a small chip.

Furthermore, it is possible to integrate semiconductor devices such as transistors and resistors, needed for the command signal producing part 20, the current detecting part 21, the switching control part 22, the command modifying part 23, the supply signal producing part 30, the altering signal producing part 34, the distributed signal producing part 36 (the first distributor 37 and the second distributor 38), three first current amplifying parts 41, 42 and 43, three second current amplifying parts 45, 46 and 47, and the high-voltage outputting part 51, into an IC on a chip together with power transistors.

Furthermore, heat or power loss of the power devices are made small enough to integrate them into an IC, because the first NMOS-FET power transistors are switched on/off at a high frequency and the second NMOS-FET power transistors are turned on. Consequently, even when these power devices are integrated into an IC on a chip, the IC will never suffer a thermal breakdown. In addition, no radiator disk face is needed.

Furthermore, this embodiment can prevent operations of the parasitic transistor devices, each being composed to have a base terminal at a junction-isolated portion. As shown in FIG. 9, the high density IC using a junction-isolation technology can be manufactured at a low cost. However, this IC has a disadvantage that many parasitic transistor devices, each having the base terminal at the junction-isolated portion, are formed, so the junction isolated portion is connected to the negative terminal side (ground potential) of the DC power source part 50. Usually, these parasitic transistors are reversely biased so that their functions are disabled. If the terminal potential of an integrated transistor falls down below the ground potential by more than a forward voltage drop of a diode, however, the parasitic transistor begins functioning, thereby causing the parasitic transistor to flow in a current from a integrated transistor (not a parasitic transistor). When a large current is supplied to a winding having an inductance just like that in a motor, if a parasitic transistor begins functioning, it may disturb the functions of the integrated transistors significantly. Especially, when a power transistor supplying a large drive current signal to a winding is switched on/off at a high frequency, the power transistor changes pulsively or abruptly the winding voltage or the drive voltage signal, and its parasitic transistors are apt to begin functioning, thereby having a great deal of possibility to disturb the normal circuit operation significantly.

In this embodiment, only the first NMOS-FET power transistors are switched pulsively or abruptly so as to supply the drive current signals to the windings. And, since the current output terminal sides of the first NMOS-FET power transistors are connected to the negative terminal side of the DC power source part, the potentials at both current input and output terminal sides of the first NMOS-FET power transistors are not lowered under the ground potential. In addition, although the potential at the current input terminal side of each of the first NMOS-FET power transistors goes over the positive terminal potential of the DC power source part 50, no parasitic transistor disturbing an integrated transistor turns to be functioning. Consequently, even when the first NMOS-FET power transistors are used for high frequency switching, no parasitic transistor disturbs the circuit operation.

Furthermore, the second NMOS-FET power transistors alters their current paths smoothly. Consequently, even when the second NMOS-FET power transistors alters the current paths, the potential of the power supplying terminal to each winding never goes under the negative terminal potential of the DC power source part 50.

Consequently, even when the first and second NMOS-FET power transistors are integrated on a chip together with other transistors, parasitic transistors in the IC are completely prevented to disturb the circuit operation. It is thus possible to integrate the circuit of the embodiment on a single chip substrate without worrying about operations of parasitic transistor devices.

Furthermore, in this embodiment, each of the first power amplifying parts is configured by a first FET power current-mirror circuit and each of the second amplifying parts is configured by a second FET power current-mirror circuit, thereby remarkably reducing the variation of the current amplifying gains among the first and second power amplifying parts 11, 12, 13, 15, 16 and 17 significantly. In addition, the first three-phase current signals F1, F2 and F3 are supplied to the conduction control terminal sides of the three first power amplifying parts 11, 12 and 13. Each of the first three-phase current signals F1, F2 and F3 is varied smoothly or substantially smoothly at least in rising and/or falling slopes. In addition, the second three-phase current signals H1, H2 and H3 are supplied to the conduction control terminal sides of three second power amplifying parts 15, 16 and 17. Each of the second three-phase current signals H1, H2 and H3 are varied smoothly or substantially smoothly at least in rising and/or falling slopes. Three first FET power transistors 61, 62 and 63, as well as three second FET power transistors 65, 66 and 67 are therefore enabled to alter their current paths smoothly while the first FET power transistors 61, 62 and 63 are used for high frequency switching. As a result, ripples of the drive current signals are reduced, and a generated torque with reduced pulsation can be obtained, thereby reducing vibration and acoustic noise significantly. In addition, since the FET power transistors are integrated into an IC, the variation of the current amplifying factors in the circuits has successfully reduced, thereby reducing the variation of the overall gain of the first power amplifying parts and the first distribution control block, as well as the variation of the overall gain of the second amplifying parts and the second distribution control block.

In this embodiment, the switching operation block makes the conducted current signal Ig a pulse current, and controls the peak value of the conducted current signal Ig to the windings 2, 3 and 4 from the DC power source part 50 (or the composed supply current to the windings) in correspondence with the modified command signal Af which has a part of high component responding with output signals of the altering signal producing part 34. The peak value of the conducted current signal Ig varies corresponding to the movement of the movable member 1 or the disk 1b so that the drive current signals I1, I2 and I3 become smooth three-phase sinusoidal currents. Thus, the vibrating force due to the interaction between the drive current signals and the magnetic fluxes of the field part can be reduced remarkably, and an excellent disk drive apparatus can be realized with much reduced vibration and acoustic noise of the disk.

Further, it is possible to produce a high component signal such as the minimum signal Mn in the altering signal producing part and to make the modified command signal Af which contains a part of high component responding with the high component signal from the altering signal producing part. For example, the absolute circuits 361, 362 and 363 as well as the minimum detecting circuit 364 shown in FIG. 7 can be included in the altering signal producing part 34, and then the minimum signal Mn as an output signal of the altering signal producing part 34 is input to the command modifying part 23, so as to make the modified command signal Af corresponding to the output signal of the altering signal producing part 34. Further, it is possible to detect altering operation of current paths to the windings 2, 3 and 4 by the first and second power amplifying parts and to make the modified command signal Af which has a part of high component responding with the altering operation of the current paths. For example, the high component signal such as the minimum signal Mn corresponding to an output signal of the altering signal producing part 34 can be made by directly detecting altering operation of current paths by the first and second amplifying parts, so as to make the modified command signal Af corresponding to the high component signal.

Besides, the embodiment produces smooth three-phase sinusoidal drive current signals so as to reduce the vibration and the acoustic noise of the disk, but the waveforms of the drive current signals are not limited to sinusoidal. In case of using the command signal Ad instead of the modified command signal Af, smooth three-phase trapezoidal drive current signals with rising and falling slopes can be supplied to the windings 2, 3 and 4, thereby reducing the vibration and the acoustic noise of the disk considerably. Therefore, since the embodiment can supply the windings with sinusoidal or trapezoidal drive current signals, an excellent disk drive apparatus with reduced power consumption, reduced disk vibration, and reduced acoustic noise can be realized.

In addition, the first supply current signal C1 and the second supply current signal C2 of the supply signal producing part 30 are changed responding with the command signal Ad, thereby changing the first and second three-phase current signals corresponding to the command signal Ad. The altering operation of the current paths to the windings can thus be achieved smoothly while at least one of the three first NMOS-FET power transistors is operated in high frequency switching between full-on and off. In addition, the altering operation of the current paths to the windings can thus be achieved smoothly while at least one of the three second NMOS-FET power transistors is turned on fully without fail. Each of the first three-phase current signals has a proper slope to be varied smoothly or substantially smoothly and is supplied to the conduction control terminal side of each of the first power amplifying parts. Each of the second three-phase current signals has a proper slope to be varied smoothly or substantially smoothly and is supplied to the conduction control terminal side of each of the second amplifying parts. The first and second three-phase current signals are changed responding with the command signal Ad, which commands a supply power to the windings so as to make the composed supply current large in a starting period and that small in a speed controlled period. As a result, the current paths to the windings are altered smoothly and the generated torque has a reduced pulsation. So, vibration and acoustic noise of the embodiment can be reduced significantly even when the command signal Ad is changed. Since it is very important to widen the active electrical angle or active electrical angle width of each of the three-phase first current signals F1, F2 and F3 more than 120 electrical degrees so as to alter current paths smoothly, the active electrical angle width of 150 degrees or more will be effective considerably and the active electrical angle width of 180 degrees or about 180 degrees should be most preferably.

That is, it is very important to widen the active electrical angle or active electrical angle width of each of the first power amplifying parts 11, 12 and 13 more than (360/3) electrical degrees so as to alter current paths smoothly, thereby providing an altering period in which two of the three first power amplifying parts 11, 12 and 13 are activated. It is most preferable that the active electrical angle is equal or almost equal to 180 degree, but it is effective that the active electrical angle is not less than (360/3+10) degree.

Since it is very important to widen the active electrical angle width of each of the three-phase second current signals H1, H2 and H3 more than 120 electrical degrees so as to alter current paths smoothly, the active electrical angle width of 150 degrees or more will be effective considerably and the active electrical angle width of 180 degrees or about 180 degrees should be most preferably. That is, it is very important to widen the active electrical angle or active electrical angle width of each of the second power amplifying parts 15, 16 and 17 more than (360/3) electrical degrees so as to alter current paths smoothly, thereby providing an altering period in which two of the three second power amplifying parts 15, 16 and 17 are activated. It is most preferable that the active electrical angle is equal or almost equal to 180 degree, but it is effective that the active electrical angle is not less than (360/3+10) degree.

Besides, it is possible to change the first supply current signal C1 and/or the second supply current signal C2 of the supply signal producing part 30 responding with the modified command signal Af so that the first three-phase current signals and/or the second three-phase current signals should be changed responding with the modified command signal Af.

Furthermore, the first three-phase current signal F1 and the second three-phase current signal H1 of the first phase has a difference of 180 electrical degrees, and flows complementarily. The first three-phase current signal F2 and the second three-phase current signal H2 of the second phase also has a difference of 180 electrical degrees, and flows complimentarily. The first three-phase current signal F3 and the second three-phase current signal H3 of the third phase also has a difference of 180 electrical degrees, and flows complimentarily. Consequently, the first power amplifying part and the second power amplifying part of the same phase are never conducted concurrently. Thus, no shortcircuit current through them is occurred in the IC, thereby neither current breakdown nor thermal breakdown occurs in any of the power transistors.

Therefore, the embodiment of the invention has a lot of excellent advantages explained above, and an excellent disk drive apparatus with reduced power consumption, reduced disk vibration, and reduced acoustic noise can be realized. But there are many modification which achieve some or all advantages according to the invention. The modified command signal Af can be replaced by the command signal Ad, for example.

In this embodiment, the drive circuit for supplying the drive current signals to the three-phase loads (the windings 2, 3 and 4) is configured of the first power amplifying parts 11, 12 and 13, the second power amplifying parts 15, 16 and 17, the command signal producing part 20, the current detecting part 21, the switching control part 22, the command modifying part 23, the supply signal producing part 30, the altering signal producing part 34, the distributed signal producing part 36 (first and second distributors 37 and. 38), the first current amplifying parts 41, 42 and 43, the second current amplifying parts 45, 46 and 47, and the high-voltage outputting part 51.

The altering signal producing part 34 in this embodiment is configured including the position detecting part 100 having two magnetic-to-electronic converting elements. However, three magnetic-to-electronic converting elements can be used to produce three-phase position signals in the altering signal producing part 34. In addition, the three-phase altering signals can be produced without above-mentioned elements, for example, by detecting the back electromotive forces generated in the windings 2, 3 and 4. In this case, a modified command signal Af corresponding to the movement of the movable member 1 can be obtained by producing a high component signal responding with the altering signals.

The first three-phase current signals F1, F2 and F3 or the second three-phase current signals H1, H2 and H3 can be varied with a time slope substantially in rising and falling slopes. Consequently, the drive current signals I1, I2 and I3 are also altered smoothly with a time slope in rising and falling slopes. In addition, a current value of a drive current signal should preferably be varied continuously. However, there may be provided a time interval in which a drive current signal becomes zero. The vibration of the disk can be reduced by setting the conduction angle width of each of the first NMOS-FET power transistors more than 120 electrical degrees (preferably, 150 degrees or more) and providing a period in which two first NMOS-FET power transistors are made conducted or on state simultaneously or concurrently. The vibration of the disk can also be reduced by setting the conduction angle width of each of the second NMOS-FET power transistors more than 120 electrical degrees (preferably, 150 degrees or more) and providing a period in which two second NMOS-FET power transistors are made conducted or on state simultaneously or concurrently. Most preferably, the conduction angle width of each of the first and second NMOS-FET transistors should be set to 180 degrees or approximately about 180 degrees.

Furthermore, each of the first and second power amplifying parts 11, 12, 13, 15, 16 and 17 is not limited to the configuration shown in FIG. 1 in this embodiment. The configuration is modified freely. For example, instead of each of the first and second power amplifying parts 11, 12, 13, 15, 16 and 17, a power amplifying part 450 shown in FIG. 12 can be used. The power amplifying part 450 includes an FET power current-mirror circuit consisting of an FET power transistor 451, a power diode 451d, and an FET transistor 452, and a resistor 453. This FET power current-mirror circuit is configured so that the control terminal side of the FET power transistor 451 is connected to the control terminal side of the FET transistor 452 (directly or via an element, for example, such as a resistor), one terminal side of the current path terminal pair of the FET transistor 452 is connected to one terminal side of the current path terminal pair of the FET power transistor 451 via a resistor 453, the other terminal side of the current path terminal pair of the FET transistor 452 is connected to the conduction control terminal side of the power amplifying part 450 (directly or via a certain element), and the control terminal side of the FET transistor 452 is connected to the conduction control terminal side of the power amplifying part 452 (directly or via a certain element). This FET power current-mirror circuit has an advantage that it has a considerably large current amplifying ratio larger than the ratio of the cell sizes of the NMOS-FET power transistor 451 and the NMOS-FET transistor 452. Therefore, the power amplifying part 450 has an advantage to reduce the input current to the power amplifying part.

Figure 13:
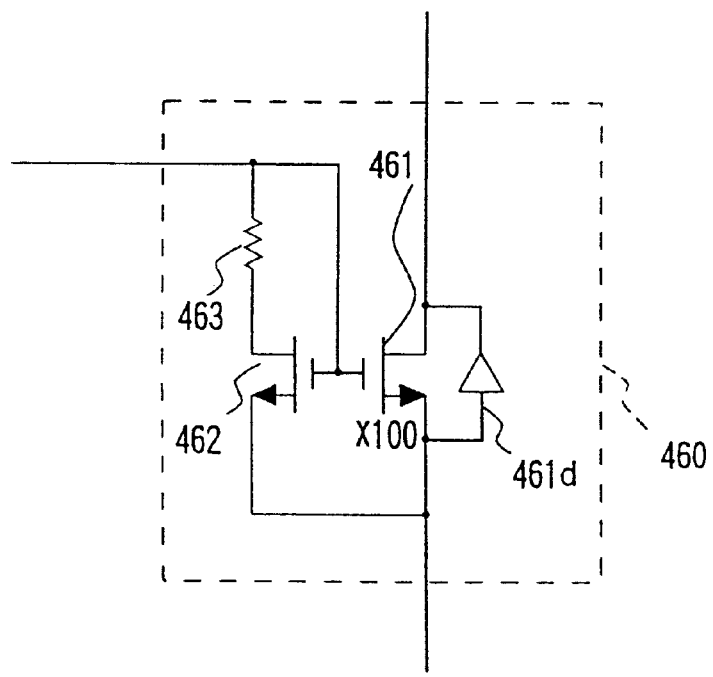
FIG. 13 is a circuit diagram showing another configuration of the power amplifying part in the embodiment of the present invention.
Figure 14:
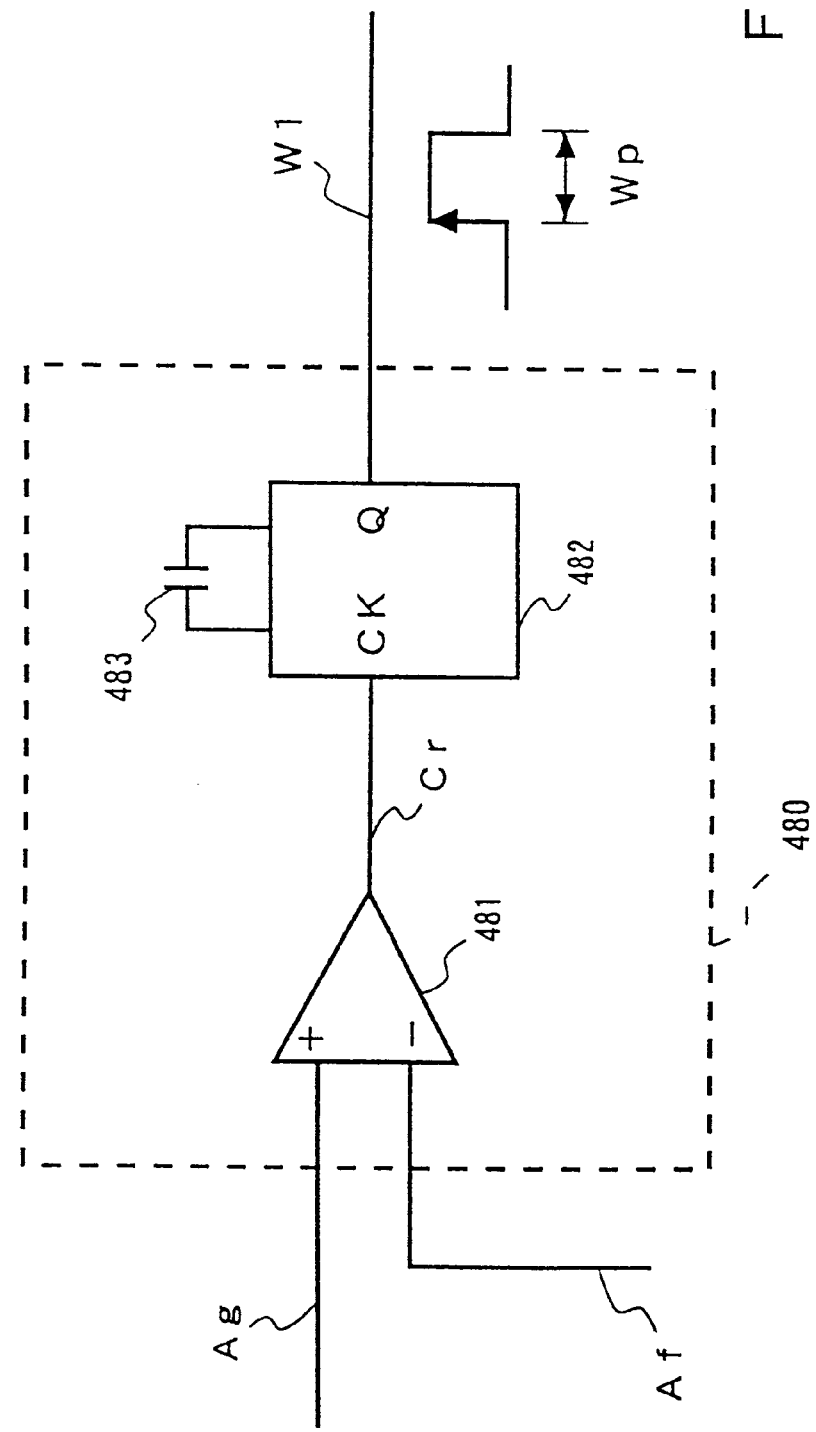
FIG. 14 is a circuit diagram showing another configuration of the switching pulse circuit in the embodiment of the present invention.

For another example, a power amplifying part 460 shown in FIG. 13 can be used instead of each of the first and second power amplifying parts of FIG. 1. The power amplifying part 460 includes an FET power current-mirror circuit consisting of an NMOS-FET power transistor 461, a power diode 461d, an NMOS-FET transistor 462, and a resistor 463. The FET power current-mirror circuit is configured so that the control terminal side of the FET power transistor 461 is connected to the control terminal side of the FET transistor 462 (directly or via a certain element), one terminal side of the current path terminal pair of the FET transistor 462 is connected to the conduction control terminal side of the power amplifying part 460 via the resistor 463, the other terminal side of the current path terminal pair of the FET transistor 462 is connected to the other terminal side of the current path terminal pair of the FET power transistor 461 (directly or via a certain element), and the control terminal side of the FET transistor 462 is connected to the conduction control terminal side of the power amplifying part 460 (directly or via a certain element). This FET power current-mirror circuit has a predetermined current amplifying rate while the input current to the conduction control terminal side is small. When the input current is increased, the current amplifying rate is increased sharply. Consequently, the FET power current-mirror circuit has an advantage that the input current to each power amplifying part can be reduced when a large current is supplied to each of windings, for example, when a motor is started up.

Furthermore, the configuration of the switching pulse circuit 330 of the switching control part 22 shown in FIG. 8 can be modified freely in this embodiment. For example, instead of the switching pulse circuit 330, a switching pulse circuit 480 shown in FIG. 14 can be used. The comparing circuit 481 of the switching pulse circuit 480 outputs a compared output signal Cr obtained by comparing the modified command signal Af with the current detected signal Ag. In other words, the compared output signal Cr enters the "Lb" state when the value of the current detected signal Ag is smaller than the value of the modified command signal Af. The compared output signal Cr enters the "Hb" state when the value of the current detected signal Ag is larger than the value of the modified command signal Af. The timer circuit 482 generates a switching control signal W1 at a rising edge of the compared output signal Cr of the comparing circuit 481 (when the state is changed from "Lb" to "Hb"). The control signal W1 enters the "Hb" state only by a predetermined time interval Wp. This time interval Wp is decided by charge/discharge operation of the capacitor 483.

When the switching control signal W1 is in the "Lb" state, the control pulse signals Y1, Y2 and Y3 are turned off (non-conducted state) and the first power amplifying parts 11, 12 and 13 are turned on (full-on or half-on state) responding with the first amplified current signals F1, F2 and F3. When the switching control signal W1 enters the "Hb" state, the control pulse signals Y1, Y2 and Y3 are turned on (conducted state) and the first NMOS-FET power transistors 61, 62 and 63 of the first power amplifying parts 11, 12 and 13 are turned off simultaneously or concurrently.

Consequently, the switching control signal W1 enters the "Lb" state when the value of the current detected signal Ag is smaller than the value of the modified command signal Af. Thus, the first power amplifying parts are turned on. When the conducted current signal Ig of the DC power source part 50 is increased and the value of the current detected signal Ag becomes larger than the value of the modified command signal Af, the compared output signal Cr enters to the "Hb" state. Then, the timer circuit 482 is triggered at a rising edge of the compared output signal Cr from the comparing circuit 481, so that the switching control signal W1 enters the "Hb" state only within the predetermined time interval Wp. As a result, the first power amplifying parts 11, 12 and 13 are turned off during the predetermined time interval Wb. When the predetermined time interval Wp is over after the first amplifying parts 11, 12 and 13 are turned off, the switching control signal W1 enters the "Lb" state and the first power amplifying parts are turned on again. The first NMOS-FET power transistors 61, 62 and 63 of the first power amplifying parts 11, 12 and 13 perform high frequency on/off switching operations such way. In addition, responding with the movement of the movable member 1, the current paths to the windings 2, 3 and 4 are altered smoothly.

<<Embodiment 2>>

Figure 15:
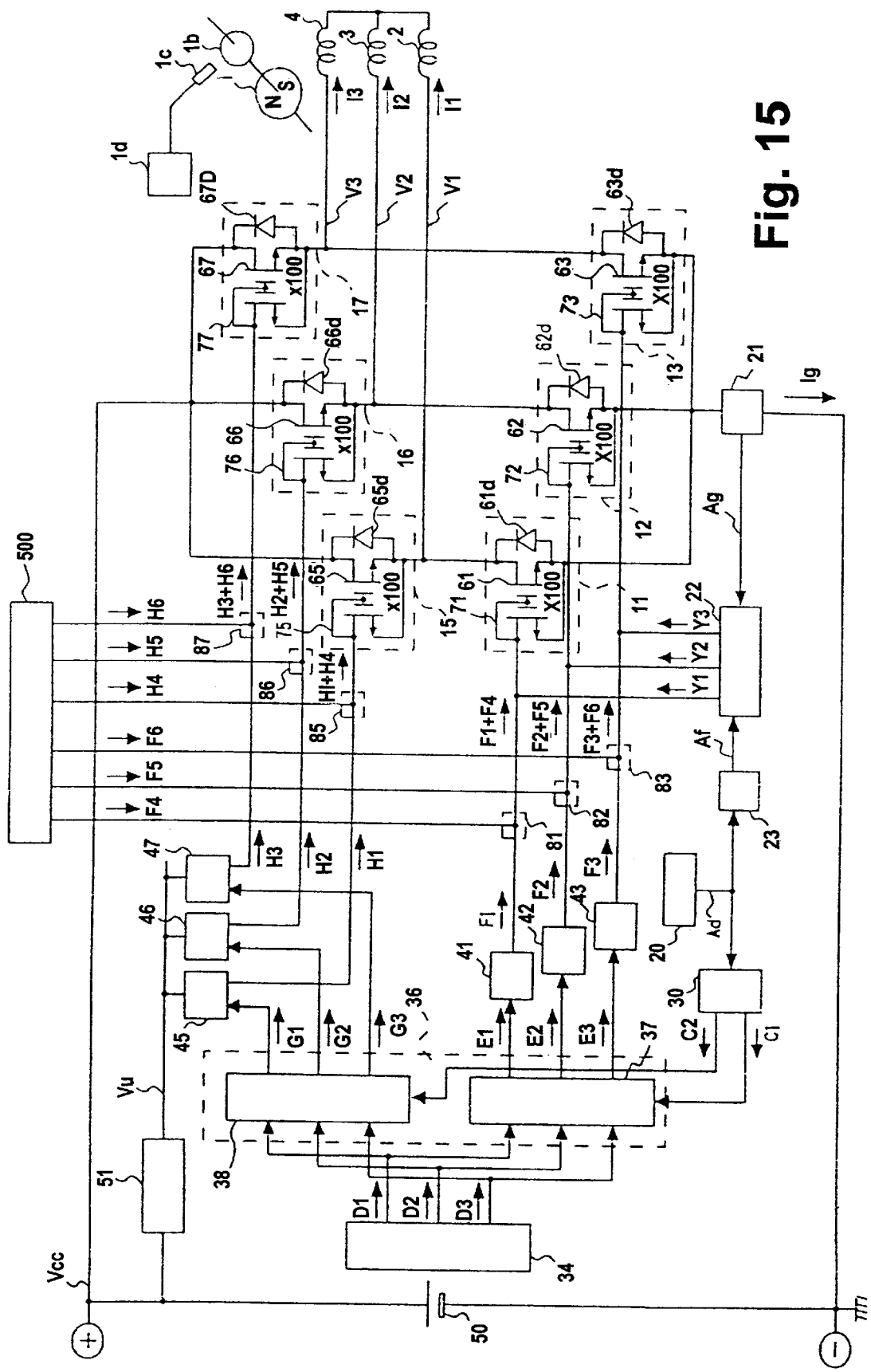
FIG. 15 is a diagram showing the configuration of the embodiment 2 of the present invention.
Figure 16:
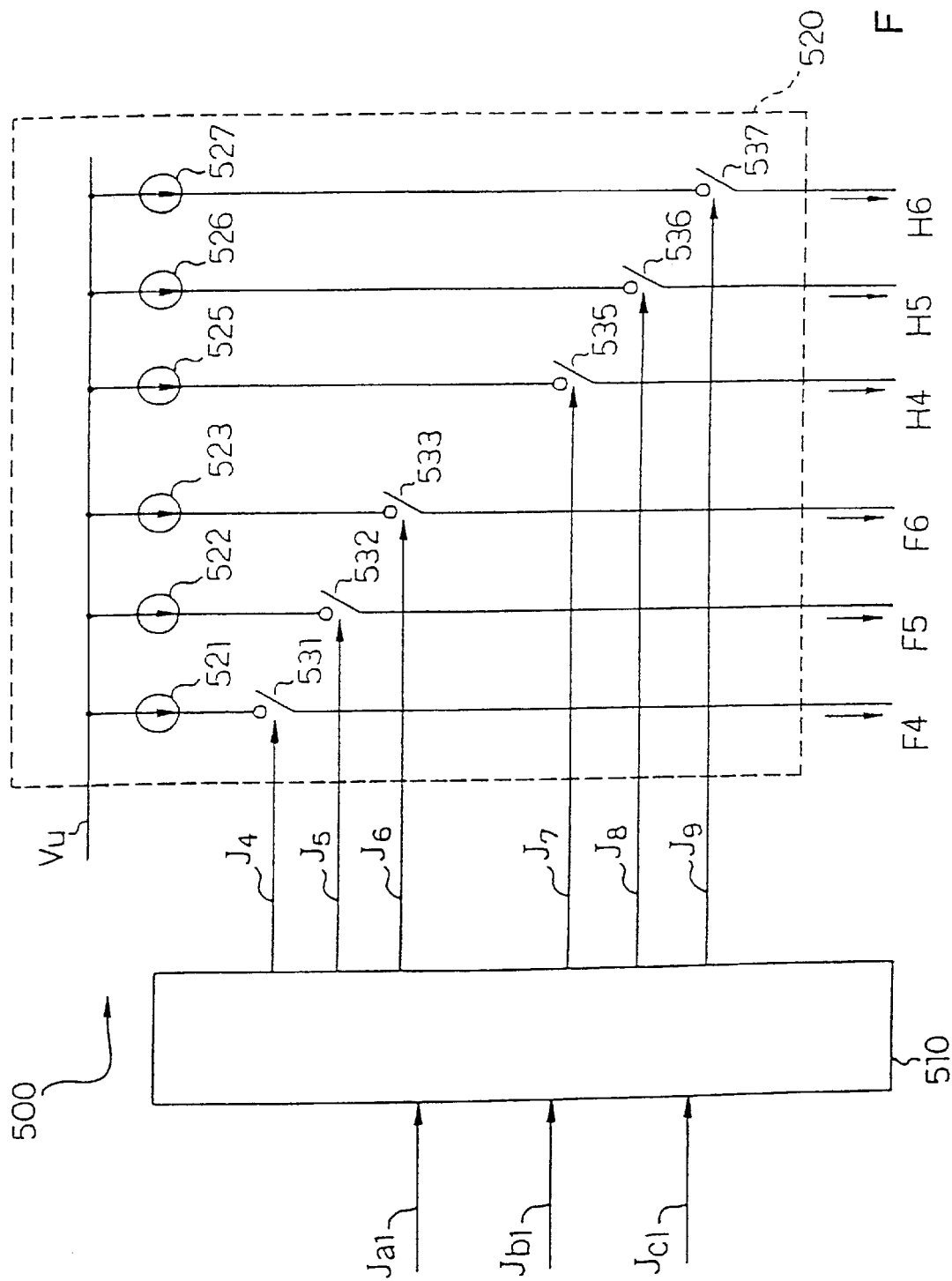
FIG. 16 is a circuit diagram of an auxiliary supply part 500 in the embodiment 2.
Figure 17:
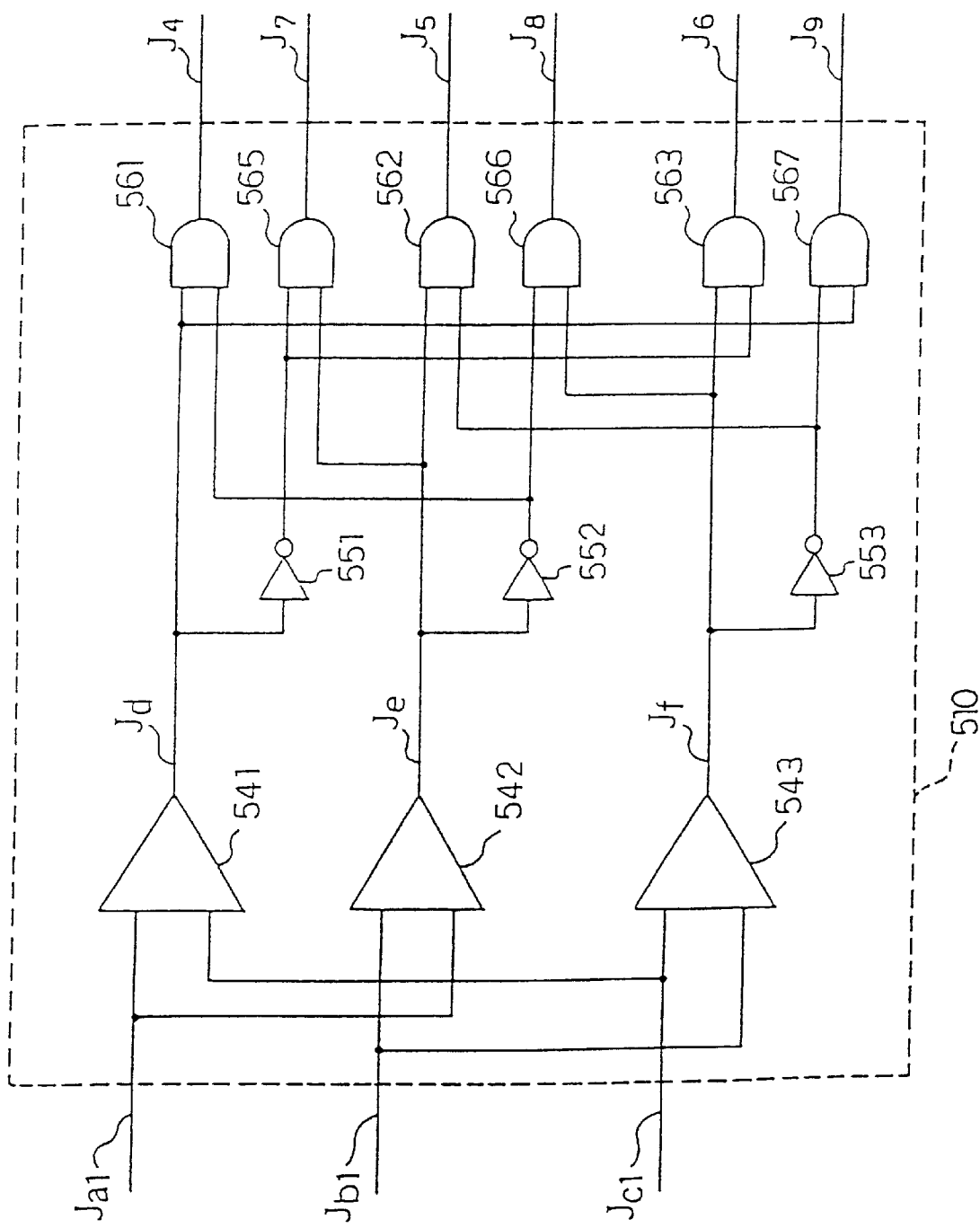
FIG. 17 is a circuit diagram of an auxiliary altering signal producing part 510 in the embodiment 2.
Figure 18A:
FIG. 18 is a waveform chart for explaining the operation of the auxiliary altering signal producing part 510 in the embodiment 2.
Figure 18B:
Figure 18C:
Figure 18D:
Figure 18E:
Figure 18F:
Figure 18G:
Figure 18H:
Figure 18I:

FIGS. 15 to 17 illustrate the disk drive apparatus and the motor in the embodiment 2 of the present invention. FIG. 15 illustrates a configuration of the disk drive apparatus and the motor. In the embodiment 2, an auxiliary supply part 500, first mixing parts 81, 82 and 83 and second mixing parts 85, 86 and 87 are added newly. In the other configuration, components similar to the foregoing embodiment 1 are designated by the same numerals, and detailed explanation thereof is omitted.

The auxiliary supply part 500 in FIG. 15 supplies first three-phase auxiliary current signals F4, F5, and F6, and second three-phase auxiliary current signals H4, H5 and H6 responding with output signals from the altering signal producing part 34. FIG. 16 shows a configuration of the auxiliary supply part 500. The auxiliary supply part 500 is composed of an auxiliary altering signal producing part 510 and an auxiliary current altering part 520. The auxiliary altering signal producing part 510 receives three-phase position signals Ja1, Jb1, and Jc1 from the altering signal producing part 34 and outputs auxiliary altering signals J4 to J9 according to those position signals.

FIG. 17 illustrates a configuration of the auxiliary altering signal producing part 510 as an example. The comparator circuits 541, 542 and 543 of the auxiliary altering signal producing part 510 compare two-phase signals of the three-phase position signals Ja1, Jb1 and Jc1 and outputs three-phase digital signals Jd, Je and Jf, respectively in accordance with the comparison result. FIGS. 18(*a*) to (*c*) illustrate the relationship among the waveforms of the digital signals Jd, Je, and Jf. The horizontal axis in FIG. 18 indicates the rotational position of the movable member 1. These digital signals Jd, Je and Jf are compounded logically in NOT circuits 551, 552 and 553, and AND circuits 561 to 567, thereby generating auxiliary altering signals J4 to J9. FIGS. 18(*d*) to (*i*) illustrate the relationship among the waveforms of the auxiliary altering signals J4 to J9. Each of the digital signals Jd, Je and Jf enters the "Hb" state in 180 electrical degrees or about 180 degrees and enters the "Lb" state in the rest 180 degrees. In addition, each of the digital signals Jd, Je and Jf becomes a three-phase signal having a phase difference of 120 degrees from others. Each of the auxiliary altering signals J4, J5 and J6 enters the "Hb" state in 120 electrical degrees or about 120 degrees and enters the "Lb" state in the rest 240 degrees. Those digital signals J4, J5 and J6 are three-phase signals changing sequentially. Each of the auxiliary altering signals J7, J8 and J9 enters the "Hb" state in 120 electrical degrees or about 120 degrees and enters the "Lb" state in the rest 240 degrees. Those digital signals J7, J8 and J9 are three-phase signals changing sequentially.

In FIG. 16, the auxiliary altering signals J4 to J9 from the auxiliary altering signal producing part 510 are entered to an auxiliary current altering part 520. The auxiliary current altering part 520 includes three first current sources 521, 522 and 523, three second current sources 525, 526 and 527, three first switch circuits 531, 532 and 533, and three second switch circuits 535, 536 and 537. The first current sources 521, 522 and 523, as well as the second current sources 525, 526 and 527 are connected to a terminal side of the high level potential Vu of the high-voltage outputting part 51.

The first switch circuits 531, 532 and 533 are switched on corresponding to the "Hb" states of the auxiliary altering signals J4, J5, and J6 of the auxiliary altering signal producing part 510, respectively. Consequently, the current signals of the first current sources 521, 522 and 523 are output according to the auxiliary altering signals J4, J5 and J6, thereby supplying the three-phase first auxiliary current signals F4, F5 and F6. The second switch circuits 535, 536 and 537 are switched on corresponding to the "Hb" states of the auxiliary altering signals J7, J8 and J9 of the auxiliary altering signal producing part 510, respectively. Consequently, the current signals of the second current sources 525, 526 and 527 are output coresponding to the auxiliary altering signals J7, J8 and J9, thereby supplying the three-phase second auxiliary current signals H4, H5 and H6.

FIGS. 19(a) to (c) illustrate waveforms of the first auxiliary current signals F4, F5 and F6 and FIGS. 19(d) to (f) illustrate waveforms of the second auxiliary current signals H4, H5 and H6. The horizontal axis in FIG. 19 indicates the rotational position of the movable member 1.

The first mixing part 81 shown in FIG. 15 is composed of a node simply. The first mixing part 81 adds up and mixes the first amplified current signal F1 of the first current amplifying part 41 and the first auxiliary current signal F4 so as to output a first mixed current signal F1+F4. The first mixing part 82 is composed of a node simply. The first mixing part 82 adds up and mixes the first amplified current signal F2 of the first current amplifying part 42 and the first auxiliary current signal F5 so as to output a first mixed current signal F2+F5. The first mixing part 83 is composed of a node simply. The first mixing part 83 adds up and mixes the first amplified current signal F3 of the first current amplifying part 43 and the first auxiliary current signal F6 so as to output a first mixed current signal F3+F6.

The second mixing part 85 is simply composed of anode. The second mixing part 85 adds up and mixes the second amplified current signal H1 of the second current amplifying part 45 and the second auxiliary current signal H4 so as to output a second mixed current signal H1+H4. Also, the second mixing part 86 is simply composed of a node. The second mixing part 86 adds up and mixes the second amplified current signal H2 of the second current amplifying part 46 and the second auxiliary current signal H5 so as to output a second mixed current signal H2+H5. Further, the second mixing part 87 is simply composed of a node. The second mixing part 87 adds up and mixes the second amplified current signal H3 of the second current amplifying part 47 and the second auxiliary current signal H6 so as to output a second mixed current signal H3+H6.

FIG. 19(g) illustrates waveforms of the first amplified current signals F1, F2 and F3, and FIG. 19(h) illustrates waveforms of the second amplified current signals H1, H2 and H3. FIG. 19(i) illustrates waveforms of the first mixed current signals F1+F4, F2+F5 and F3+F6, and FIG. 19(j) illustrates waveforms of the second mixed current signals H1+H4, H2+H5 and H3+H6.

The first mixed current signals F1+F4, F2+F5 and F3+F6 are three-phase first current signals, each varying smoothly during about 30 degree active electrical angle in a rising slope from zero and in a falling slope to zero, respectively. In the same way, the second mixed current signals H1+H4, H2+H5 and H3+H6 are three-phase second current signals, each varying smoothly during about 30 electrical degree active electrical angle in a rising slope from zero and in a falling slope to zero, respectively.

The first mixed current signals F1+F4, F2+F5 and F3+F6 are supplied to the conduction control terminal sides of the first power amplifying parts 11, 12 and 13, respectively, thereby controlling the conduction periods of the first NMOS-FET power transistors 61, 62 and 63. The first NMOS-FET power transistors 61, 62 and 63 alter smoothly the current paths to the windings according to the first mixed current signals, while performing high frequency on/off switching under the switching control of the switching control part 22 and the current detecting part 21. In the same way, the second mixed current signals H1+H4, H2+H5 and H3+H6 are supplied to the conduction control terminal sides of the second power amplifying parts 15, 16 and 17, respectively, thereby controlling the conduction periods of the second NMOS-FET power transistors 65, 66 and 67. The second NMOS-FET power transistors 65, 66 and 67 alter smoothly the current paths to the windings corresponding to the second mixed current signals.

The remainder of the configuration and operation is similar as that in the above-mentioned embodiment 1, so detailed explanation thereof will be omitted here.

In this embodiment, each of the three-phase first mixed current signals (as each of the first three-phase current signals) supplied to the conduction control terminal side of each of the first power amplifying parts is varied smoothly at least in rising and falling slopes, thereby altering smoothly the three-phase drive current signals to the windings. At this time, a first auxiliary current signal is included in a first mixed current signal, thereby reducing the on-resistance of a first NMOS-FET power transistor which dominantly supplies the drive current. As a result, the power loss of the first NMOS-FET power transistor is reduced. In addition, the conduction control terminal side of each of the first power amplifying parts is turned on/off by each of control pulse signals Y1, Y2 and Y3 of the switching control part, thereby causing each of the first NMOS-FET power transistors to perform high frequency switching. Therefore, the first NMOS-FET power transistor performs switching surely with the first auxiliary current signal, thereby reducing the power loss remarkably.

In the same way, each of the three-phase second mixed current signals (as each of the second three-phase current signals) supplied to the conduction control terminal side of each of the second power amplifying parts is varied smoothly at least in rising and falling slopes, respectively, thereby altering smoothly the three-phase drive current signals to the windings. At this time, a second auxiliary current signal is included in a second mixed current signal, thereby reducing the on-resistance of a second NMOS-FET power transistor which dominantly supplies the drive current. As a result, the power loss of the second NMOS-FET power transistor is reduced greatly.

Consequently, the power loss of each of the first and second NMOS-FET power transistors can be reduced significantly, thereby improving the power efficiency of the embodiment significantly. In addition, ripples of the drive current signals to the windings can be reduced, thereby reducing both vibration and acoustic noise of the embodiment significantly.

In the case of the above-mentioned embodiment, the active angle of each of the first mixed current signals is set to 180 degrees or about 180 degrees, the active angle of each of the first auxiliary current signals is set to 120 degrees or about 120 degrees, the active angle of the rising slope varying smoothly is set to 30 degrees or about 30 degrees, and the active angle of the falling slope varying smoothly is set to 30 degrees or about 30 degrees. Consequently, the current paths to the windings can be altered smoothly, as well as the power loss caused by the on-resistance of each of the first NMOS-FET power transistors is reduced significantly. In addition, the three-phase first auxiliary current signals F4, F5 and F6 are supplied sequentially so that at least one of the first auxiliary signals is supplied. It is also prevented that two or more first auxiliary current signals are supplied in the same period.

In the same way, the active angle of each of the second mixed current signals is set to 180 degrees or about 180 degrees, the active angle of each of the second auxiliary current signals is set to 120 degrees or about 120 degrees, the active angle of the rising slope varying smoothly is set to 30 degrees or about 30 degrees, and the active angle of the falling slope varying smoothly is set to 30 degrees or about 30 degrees. Consequently, the current paths to the windings can be altered smoothly, as well as the power loss caused by the on-resistance of each of the second NMOS-FET power transistors is reduced significantly. In addition, the three-phase second auxiliary current signals H4, H5 and H6 are supplied sequentially so that at least one of the second auxiliary signals is supplied. It is also prevented that two or more second auxiliary current signals are supplied in the same period.

On the other hand, each of these active angles can be changed as needed. The active angle of each of the first and second mixed current signals may be, for example, 150 degrees. The active electrical angle of each of the first and second auxiliary current signals may also be varied from 120 degrees, although the performance is degraded in such a case.

This embodiment 2 can thus obtain similar advantages as those of the above-mentioned embodiment 1.

<<Embodiment 3>>

Figure 20:
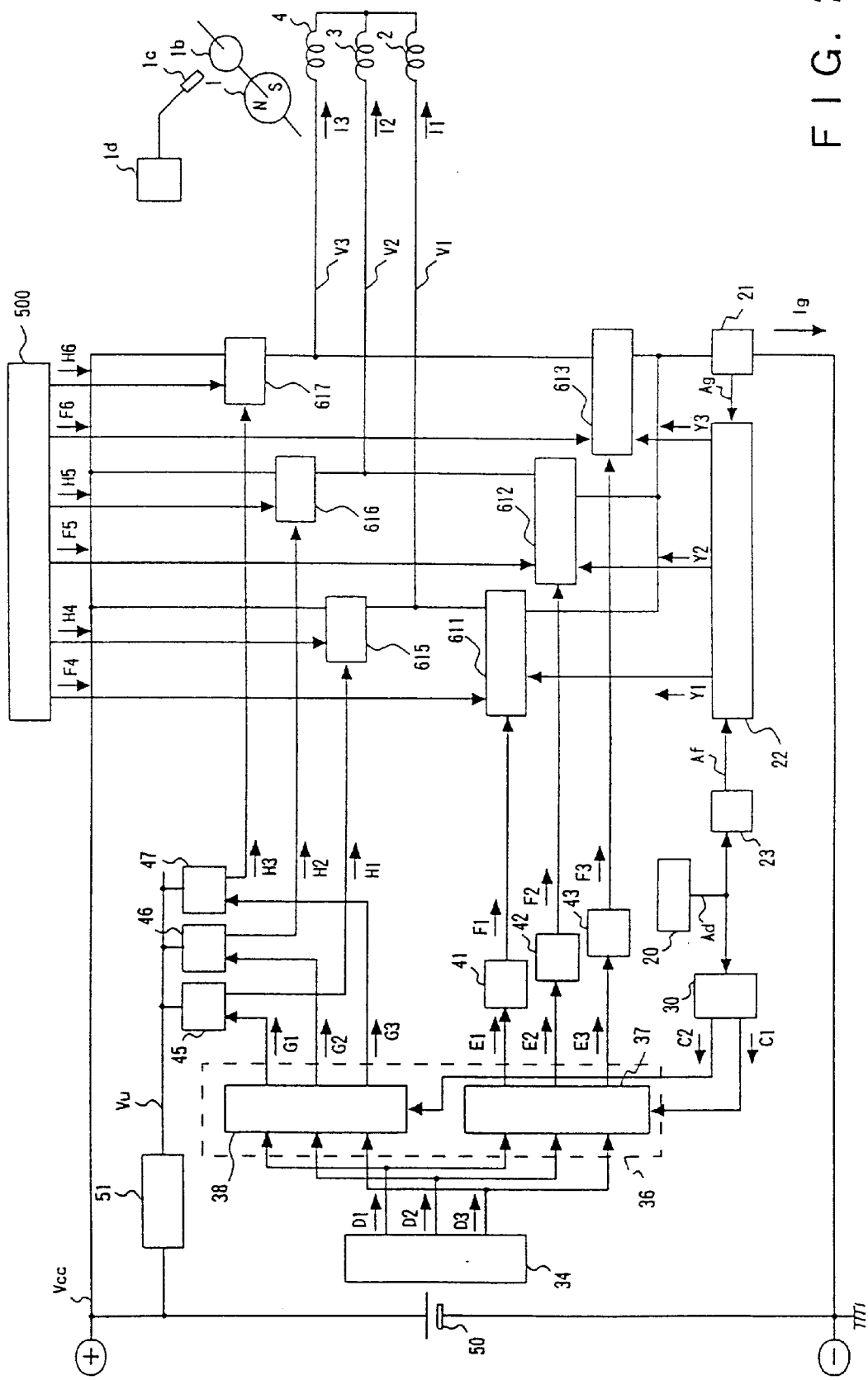
FIG. 20 is a diagram showing the configuration of the embodiment 3 of the present invention.
Figure 21:
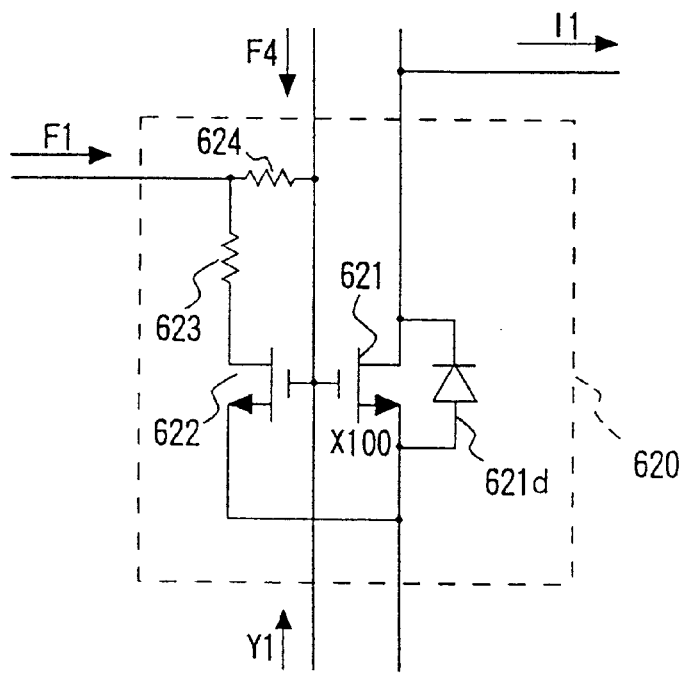
FIG. 21 is a circuit diagram of a power amplifying part in the embodiment 3.

FIGS. 20 and 21 illustrate the disk drive apparatus and the motor in the embodiment 3 of the present invention. FIG. 20 shows a configuration of the disk drive apparatus and the motor. In the embodiment 3, the auxiliary supply part 500 supplies the auxiliary current signals to the conduction control terminal sides of the power amplifying parts. In the other configuration, components similar to the foregoing embodiments 2 and 3 are designated by the same numerals, and detailed explanation thereof is omitted.

In FIG. 20, the first power amplifying part 611 receives the first amplified current signal F1 from the first current amplifying part 41 via the first terminal of its conduction control terminal side, the first auxiliary current signal F4 from the auxiliary supply part 500 via the second terminal of its conduction control terminal side, and the control pulse signal Y1 from the switching control part 22 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 500 via the second terminal of its conduction control terminal side, and the control pulse signal Y2 from the switching control part 22 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 500 via the second terminal of its conduction control terminal side, and the control pulse signal Y3 from the switching control part 22 via the third terminal of its conduction control terminal side, respectively.

On the other hand, the second power amplifying part 615 receives the second amplified current signal H1 from the second current amplifying part 45 via the first terminal of its conduction control terminal side and the second auxiliary current signal H4 from the auxiliary supply part 500 via the second terminal of its conduction control terminal side. In the same way, the second power amplifying part 616 receives the second amplified current signal H2 from the second current amplifying part 46 via the first terminal of its conduction control terminal side and the second auxiliary current signal H5 from the auxiliary supply part 500 via the second terminal of its conduction control terminal side. In the same way, the second power amplifying part 617 receives the second amplified current signal H3 from the second current amplifying part 47 via the first terminal of its conduction control terminal side and the second auxiliary current signal H6 from the auxiliary supply part 500 via the second terminal of its conduction control terminal side.

FIG. 21 illustrates the power amplifying part 620 which is equivalent to the configuration of each of the first and second power amplifying parts 611, 612, 613, 615, 616 and 617. In this embodiment, the power amplifying part 620 is used as the first power amplifying part 611. The power amplifying part 620 includes an FET power current-mirror circuit consisting of an NMOS-FET power transistor 621, a power diode 621d, an NMOS-FET transistor 622 and resistors 623 and 624. The current input terminal side of the power diode 621d is connected to the current output terminal side of the NMOS-FET power transistor 621 and the current output terminal side thereof is connected to the current input terminal side of the NMOS-FET power transistor 621.

A resistor 623 is connected between the first terminal of the conduction control terminal side of the power amplifying part 620 and one terminal of the current path terminal pair of the NMOS-FET transistor 622. A resistor 624 is connected between the first and second terminals of the conduction control terminal side thereof. The third terminal of the conduction control terminal side thereof is connected to the control terminal side of the NMOS-FET power transistor 621. Consequently, the FET power current-mirror circuit of the power amplifying part 620 has a predetermined current amplifying rate while the first amplified current signal F1 supplied to the first terminal of the conduction control terminal side is small. When the value of the first amplified current signal F1 is increased, the current amplifying rate is increased sharply. In addition, the first auxiliary current signal F4 supplied to the second terminal of the conduction control terminal side is used to reduce the on-resistance of the NMOS-FET power transistor 621. In addition, the NMOS-FET power transistor 621 and the FET power current-mirror circuit of the power amplifying part 620 perform high frequency on/off switching by the control pulse signal Y1 supplied to the third terminal of the conduction control terminal side.

The NMOS-FET power transistor 621 is configured, for example, by an FET transistor with double diffused N-channel MOS structure and a parasitic diode device of the NMOS-FET power transistor 621 is used as a power diode 621*d*. The resistor 623 or/and 624 of the power amplifying part 620 may be omissible with no operation problem. The first amplified current signal F1 and the first auxiliary current signal F4 are composed or compounded in the power amplifying part 620 and the compounded signal is supplied to the NMOS-FET power transistor 621 and the power current-mirror circuit.

The first power amplifying part 612 or 613 has the same configuration as shown in FIG. 21. The second power amplifying part 615, 616, or 617 has the same configuration except avoiding connection to the third terminal of the conduction control terminal side.

The remainder of the configuration and operation is similar as that in the above-mentioned embodiment 2 or 1. Thus, detailed explanation thereof will be omitted here.

In this embodiment, the three-phase first amplified current signal (as the first three-phase current signal) to be supplied to the first terminal of the conduction control terminal side of each of the first power amplifying parts is varied smoothly at least in rising and falling slopes, thereby altering smoothly the three-phase drive current signals to the windings. In addition, a first auxiliary current signal is supplied to the second terminal of the conduction control terminal side of each of the first power amplifying parts, thereby reducing the on-resistance of each of the first NMOS-FET power transistors which dominantly supplies the largest drive current. In addition, a control pulse signal of the switching control part is supplied to the third terminal of the conduction control terminal side of each of the first power amplifying parts so that each of the first NMOS-FET power transistors performs high frequency on/off switching.

In the same way, the three-phase second amplified current signal (as the second three-phase current signal) to be supplied to the second terminal of the conduction control terminal side of each of the second power amplifying parts is varied smoothly at least in rising and falling slopes, thereby altering smoothly the three-phase drive current signals to the windings. In addition, a second auxiliary current signal is supplied to the second terminal of the conduction control terminal side of each of the second power amplifying parts, thereby reducing the on-resistance of each of the second NMOS-FET power transistors which dominantly supplies the largest drive current.

This embodiment can thus obtain similar advantages as those of the above-mentioned embodiments.

Figure 22:
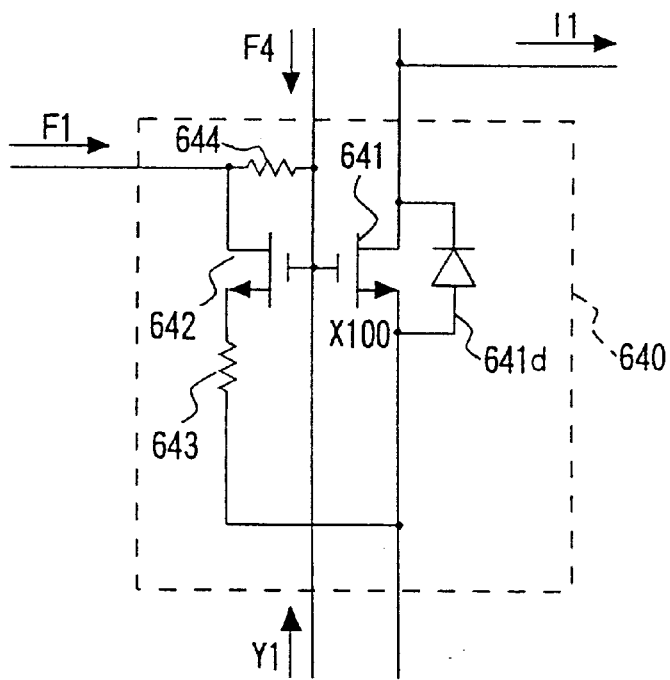
FIG. 22 is a circuit diagram showing another configuration of the power amplifying part in the embodiment of the present invention.

In this embodiment, the first power amplifying parts 611, 612 and 613, and the second power amplifying parts 615, 616 and 617 are not limited only to the power amplifying part 620 shown in FIG. 21. They can be modified freely. FIG. 22 illustrates another configuration of power amplifying part 640 usable as each of the first power amplifying parts 611, 612 and 613, and the second power amplifying parts 615, 616 and 617. In this embodiment, the power amplifying part 640 includes an FET power current-mirror circuit consisting of an NMOS-FET power transistor 641, a power diode 641*d*, an NMOS-FET transistor 642, and resistors 643 and 644. The current input terminal side of the power diode 641*d* is connected to the current output terminal side of the NMOS-FET power transistor 641 and the current output terminal side thereof is connected to the current input terminal side of the NMOS-FET power transistor 641.

The first terminal of the conduction control terminal side of the power amplifying part 640 is connected to one terminal of the current path terminal pair of the NMOS-FET transistor 642, a resistor 643 is connected between the other terminal of the current path terminal pair of the NMOS-FET transistor 642 and one terminal of the current path terminal pair of the NMOS-FET power transistor 641, and a resistor 644 is connected between the first and second terminals of the conduction control terminal side thereof. The third terminal of the conduction control terminal side thereof is connected to the control terminal side of the NMOS-FET power transistor 641. Consequently, when the power amplifying part 640 is used as the first power amplifying part 621, the FET power current-mirror circuit of the power amplifying part 640 can greatly amplify an input current such as the first amplified current signal F1 or the first auxiliary current signal F4. In addition, the first auxiliary current signal F4 to the second terminal of the conduction control terminal side is used to reduce the on-resistance of the NMOS-FET power transistor 641. In addition, the NMOS-FET power transistor 641 and the FET power current-mirror circuit of the power amplifying part 640 perform high frequency on/off switching by the control pulse signal Y1 supplied to the third terminal of the conduction control terminal side. TheNMOS-FETpowertransistor641is configured, for example, by an FET transistor with double diffused N-channel MOS structure, and a parasitic diode device of the NMOS-FET power transistor 641 is used as the power diode 641*d*. The resistor 643 or/and 644 of the power amplifying part 640 may be zero ohms without any adverse effect on operation problem.

<<Embodiment 4>>

Figure 23:
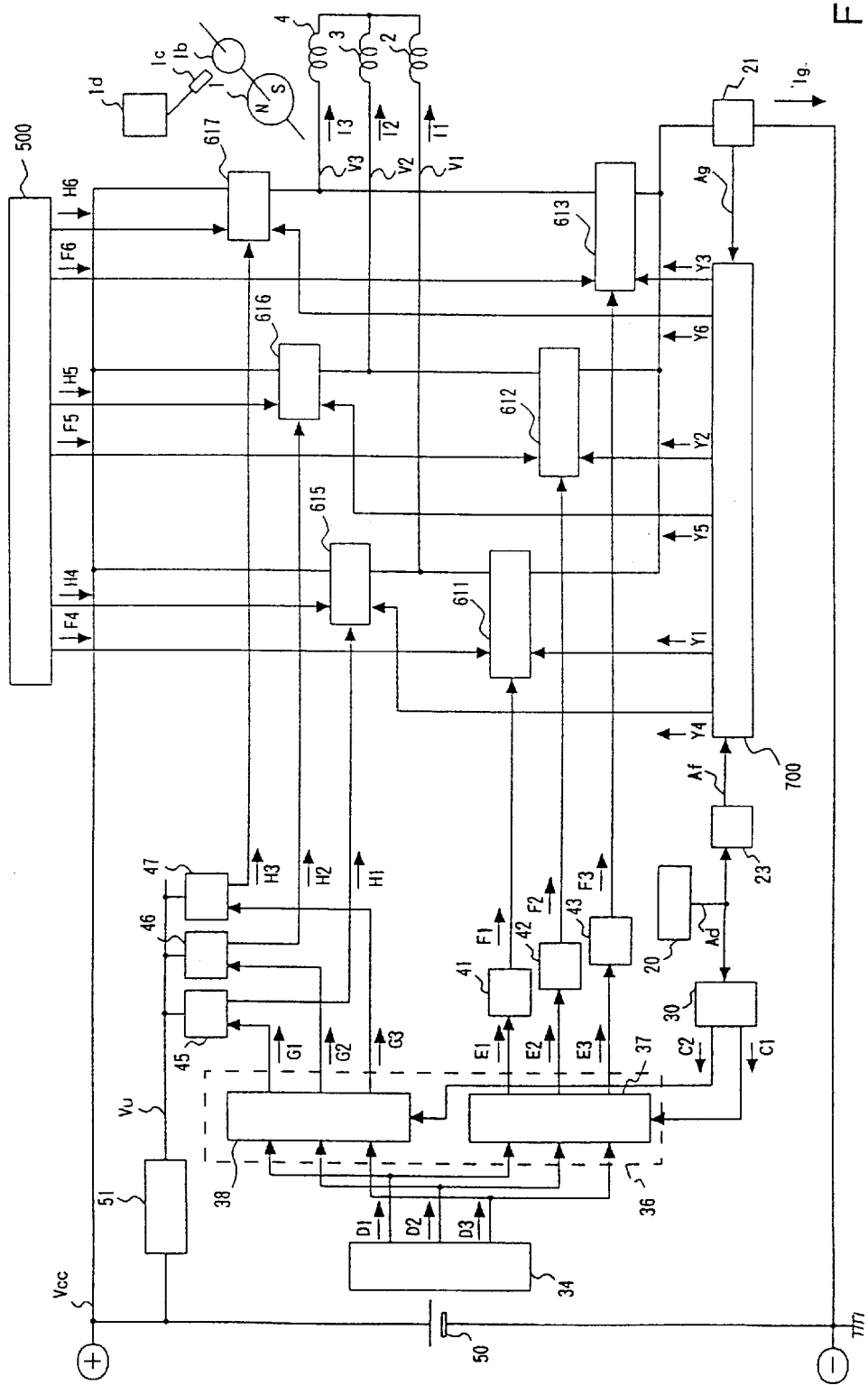
FIG. 23 is a diagram showing the configuration of the embodiment 4 of the present invention.
Figure 24:
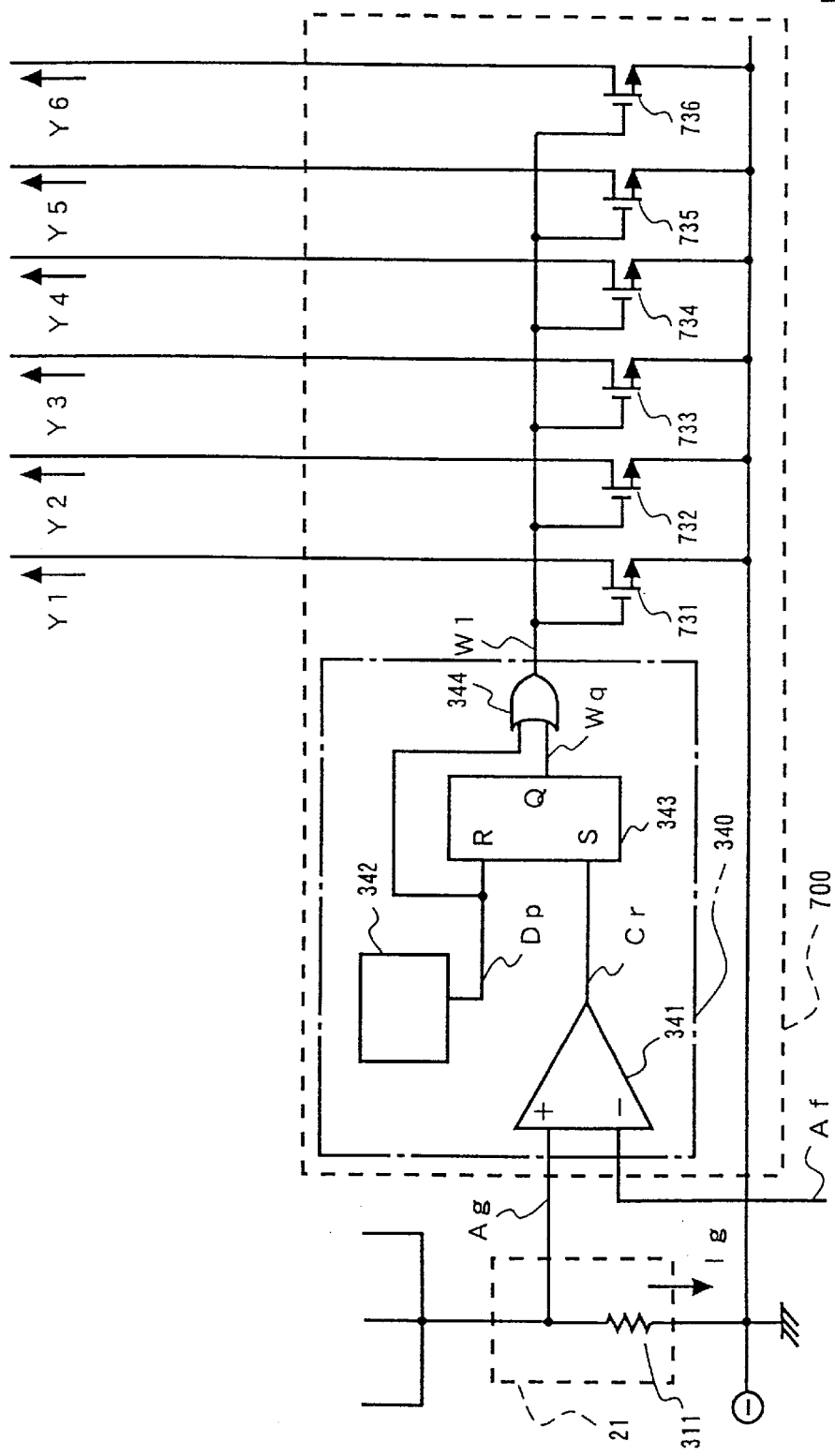
FIG. 24 is a circuit diagram of a switching control part 700 in the embodiment 4.

FIGS. 23 and 24 illustrate the disk drive apparatus and the motor in the embodiment 4 of the present invention. FIG. 23 shows a configuration of the disk drive apparatus and the motor. In the embodiment 4, a switching control part 700 supplies control pulse signals Y1 to Y6. The switching control part 700 can cause the first and second NMOS-FET power transistors of the first and second power amplifying parts to perform high frequency on/off switching. In the other configuration, components similar to the foregoing embodiments 1, 2 and 3 are designated by the same numerals, and detailed explanation thereof is omitted.

The switching control part 700 in FIG. 23 generates control pulse signals Y1, Y2, Y3, Y4, Y5 and Y6 responding with the result of comparing the modified command signal Af with the current detected signal Ag from the current detecting part 21 so as to cause the first power amplifying parts 611, 612 and 613, and the second power amplifying parts 615, 616 and 617 to perform high frequency on/off switching. The configuration of each of the first power amplifying parts 611, 612 and 613, and the second power amplifying parts 615, 616 and 617 is the same as that of the power amplifying part 620 illustrated in FIG. 21 or the power amplifying part 640 illustrated in FIG. 22. Thus, detailed explanation for them will be omitted here.

Figure 25:
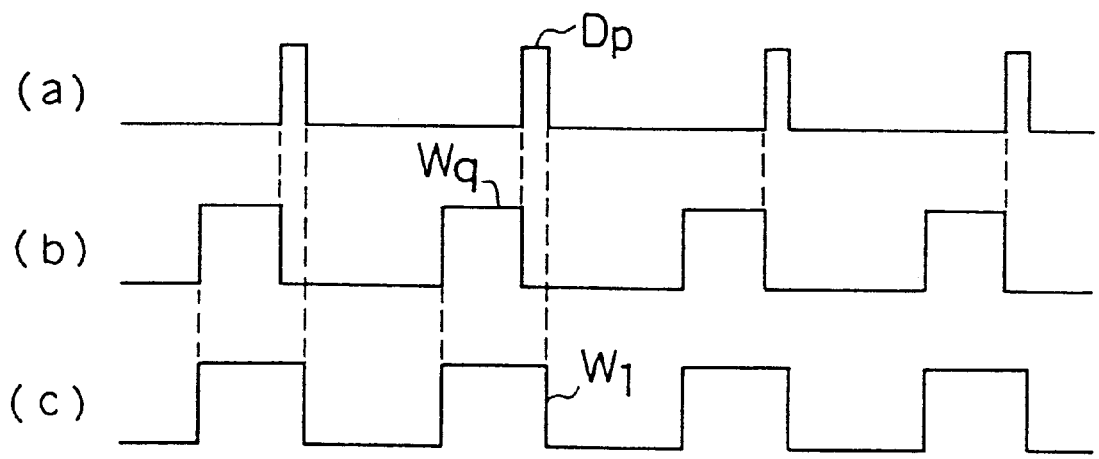
FIG. 25 is a waveform chart showing signals of the switching pulse circuit 340, for example.

FIG. 24 shows a configuration of the switching control part 700. A comparator circuit 341 of a switching pulse circuit 340 in the switching control part 700 obtains a compared output signal Cr by comparing the modified command signal Af with the current detected signal Ag. A trigger generating circuit 342 outputs a high frequency trigger pulse signal Dp of about 100 kHz. A state holding circuit 343 changes the state of a state holding signal Wq to "Lb" (low potential state) at a rising edge of the trigger pulse signal Dp, and changes the state of the state holding signal Wq to "Hb" (high potential state) at a rising edge of the compared output signal Cr. An OR circuit 344 logically mixes the state holding signal Wq and the trigger pulse signal Dp and produces the switching control signal W1. So, the switching control signal W1 of the switching pulse circuit 340 corresponds to both the state holding signal Wq and the trigger pulse signal Dp. FIG. 25 (a) to (c) show an example of the relationship among the trigger pulse signal Dp, the state holding signal Wq, and the switching control signal W1. The horizontal axes of FIG. 25 is graduated by time.

When the switching control signal W1 is turned to the "Lb" state, the control transistors 741, 742, 743, 744, 745 and 746 are turned off concurrently and the control pulse signals Y1, Y2, Y3, Y4, Y5 and Y6 are turned off (non-conducted state). At this time, the first power amplifying parts 611, 612 and 613 amplify the first amplified current signals F1, F2 and F3 so as to form current paths for supplying negative current parts of the drive current signals I1, I2 and I3 to the windings 2, 3 and 4. The second power amplifying parts 615, 616 and 617 amplify the second amplified current signals H1, H2 and H3 so as to form current paths for supplying positive current parts of the drive current signals I1, I2 and I3 to the windings 2, 3 and 4. When the switching control signal W1 is turned to the "Hb" state, the control transistors 741, 742, 743, 744, 745 and 746 are turned on concurrently and the control pulse signals Y1, Y2, Y3, Y4, Y5 and Y6 are turned on (conducted state). At this time, not only the first NMOS-FET power transistors of the first power amplifying parts 611, 612 and 613, but also the second NMOS-FET power transistors of the second power amplifying parts 615, 616 and 617 are all turned off simultaneously. The first power amplifying parts 611, 612 and 613 and the second power amplifying parts 615, 616 and 617 are controlled so as to be turned on/off at a high frequency according to a single switching control signal W1 so that the drive current signals to the windings are controlled corresponding to the modified command signal Af. Hereunder, this operation will be described.

The state holding signal Wq of the state holding circuit 343 is turned to "Lb" at the rising edge of the trigger pulse signal Dp, but the switching control signal W1 of the switching pulse circuit 340 is turned to "Lb" after the trigger pulse signal Dp turned to "Lb". When the switching control signal W1 is changed to "Lb", one or two of the first power amplifying parts are conducted responding with the first amplified current signals F1, F2 and F3, and one or two of the second power amplifying parts are also conducted at this time responding with the second amplified current signals H1, H2 and H3. For example, if only the first amplified current signal F1 and the second amplified current signal H2 are selected, the first NMOS-FET power transistor of the first power amplifying part 611 is conducted responding with the first amplified current signal F1, thereby forming a current path for supplying the negative current part of the drive current signal I1 to the winding 2. And, responding with the second amplified current signal H2, the second NMOS-FET power transistor of the second power amplifying part 616 is conducted, thereby forming a current path for supplying the positive current part of the drive current signal I2 to the winding 3. The first NMOS-FET power transistor of the first power amplifying part 611 and the second NMOS-FET power transistor of the second power amplifying part 616 are turned on fully at this time to supply the drive current signals enough to the windings 2 and 3. The values of the drive current signals I1 and I2 are increased gradually due to the inductances of the windings. Consequently, the conducted current signal Ig from the DC power source part 50 is increased, which means that the composed supply current to the windings is increased. When the value of the current detected signal Ag of the current detecting part 21 exceeds the value of the modified command signal Af, the compared output signal Cr of the comparing circuit 341 generates a rising edge, thereby changing the state holding signal Wq of the state holding circuit 340 and the switching control signal W1 of the switching pulse circuit 340 to "Hb". As a result, the control pulse signals Y1 to Y6 are turned on, thereby causing the first NMOS-FET power transistors of the first power amplifying parts 611, 612 and 613 and the second NMOS-FET power transistors of the second power amplifying parts 615, 616 and 617 to be turned off simultaneously. At this time, the inductance of the winding 2 increases the drive voltage V1 pulsively or abruptly, thereby forming a current path passing through the second power diode of the second power amplifying part 615. As a result, the negative current part of the drive current signal I1 to the winding 2 flows continuously. And the inductance of the winding 3 decreases the drive voltage V2 pulsively or abruptly, thereby forming a current path passing through the first power diode of the first power amplifying part 612. As a result, the positive current part of the drive current signal I2 to the winding 3 flows continuously. Therefore, the drive current signals I1 and I2 to the windings 2 and 3 are gradually decreased in magnitude due to the inductances of the windings. And soon, the next pulse of the trigger pulse signal Dp appears, thereby enabling the switching operation described above to be repeated. So the peak value of the conducted current signal Ig of the DC power source part 50 is controlled corresponding to the modified command signal Af, thereby controlling the drive current signals to the windings 2, 3 and 4. The first auxiliary current signal F4 to the conduction control terminal side of the first power amplifying part 611 can reduce the on-resistance of the first NMOS-FET power transistor of the first power amplifying part 611. The second auxiliary current signal H5 to the conduction control terminal side of the second power amplifying part 616 can reduce the on-resistance of the second NMOS-FET power transistor of the second power amplifying part 616.

Furthermore, since the first amplified current signals are altered smoothly as the movable member 1 is moved, the current paths by the first power amplifying parts 611, 612 and 613 can be altered smoothly. In this case, the first NMOS-FET power transistors of the first power amplifying parts 611, 612 and 613 are caused to perform the high frequency switching operations, as described above. And, since the second amplified current signals are altered smoothly as the movable member 1 is moved, the current paths by the second NMOS-FET power transistors of the second power amplifying parts 615, 616 and 617 can be altered smoothly. In this case, the second NMOSFET power transistors of the second power amplifying parts 615, 616 and 617 are caused to perform the high frequency switching operations, as described above. Consequently, the current paths to the windings are altered smoothly so as to reduce ripples in the drive current signals, thereby reducing the vibration and the acoustic noise of the embodiment significantly. Since the first amplified current signals F1, F2 and F3 and the second amplified current signals H1, H2 and H3 are set to minimum necessary values corresponding to the command signal Ad, the altering operation of the current paths to the windings can be achieved smoothly even when the command signal Ad is changed. And also, the power loss caused by the first and second amplified current signals can be reduced. Since the first and second power amplifying parts include the first and second FET power current-mirror circuits, respectively, it is possible to reduce the variation of the current amplifying rate and accordingly to obtain the above-mentioned effects stably. Besides, the first amplified current signals and/or the second amplified current signals can be varied corresponding to the modified command signal Af.

Figure 26:
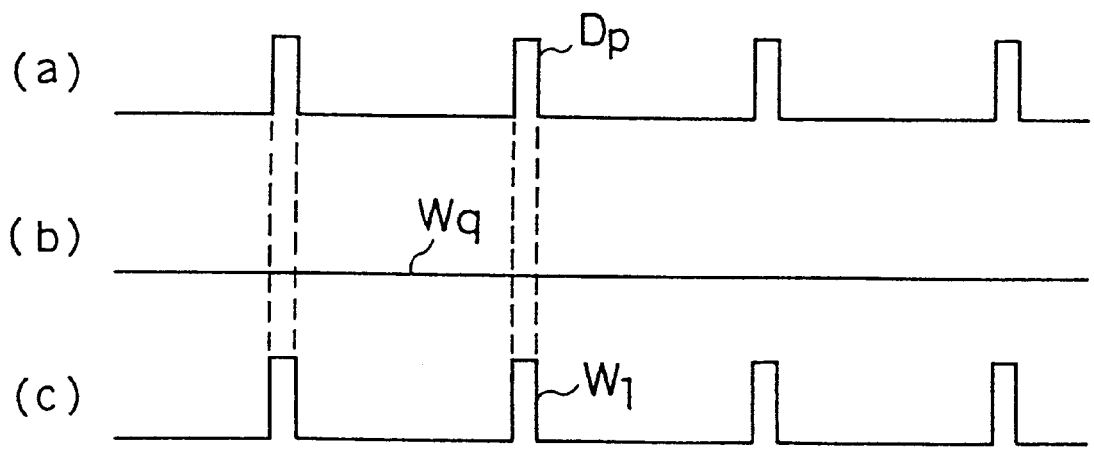
FIG. 26 is a waveform chart showing signals of the switching pulse circuit 340, for another example.

Next, the case that the compared output signal Cr of the comparing circuit 341 does not take place before the next pulse of the trigger pulse signal Dp being inputted will be explained. The state holding signal Wq keeps state of "Lb" before the rising edge of the compared output signal Cr comes. Since the OR circuit 344 outputs the switching control signal W1 by mixing the state holding signal Wq and the trigger pulse signal Dp, the switching control signal W1 becomes a signal similar to the trigger pulse signal Dp. That is, the switching control signal W1 does not omit a pulse of the trigger pulse signal Dp and has the same frequency as that of the trigger pulse signal Dp. Therefore, the first and second power amplifying parts execute a stable switching operation with a fixed switching frequency, thereby, an acoustic noise caused by the switching of those power amplifying parts can be reduced. FIG. 26 (a) to (c) show another example of the relationship among the trigger pulse signal Dp, the state holding signal Wq and the switching control signal W1. The horizontal axes of FIG. 26 corresponds to time.

Other configuration and operation are similar as those in the embodiment 1, 2 or 3, and so, detailed explanation thereof will be omitted here.

In this embodiment, the first and second NMOS-FET power transistors of the first and second power amplifying parts perform high frequency switching, and the power loss of these power transistors is reduced significantly. At this time, since the first and second power amplifying parts are turned on/off responding with the single switching control signal W1, the configuration of the embodiment for controlling high frequency switching operations can be simplified greatly.

Furthermore, the switching control part 700 certainly switches off the first power amplifying parts and the second power amplifying parts at an intervals of the trigger pulse signal Dp, thereby reducing the acoustic noise caused by the switching. Since the first power amplifying parts and the second power amplifying parts switch at predetermined intervals of the trigger pulse signal Dp, it is easy to detect correctly zero-crossing timings of the back-electromotive forces of the three-phase windings during the repetitive off periods of those power amplifying parts.

This embodiment can thus obtain similar advantages as those of the above-mentioned embodiments.

<<Embodiment 5>>

Figure 27:
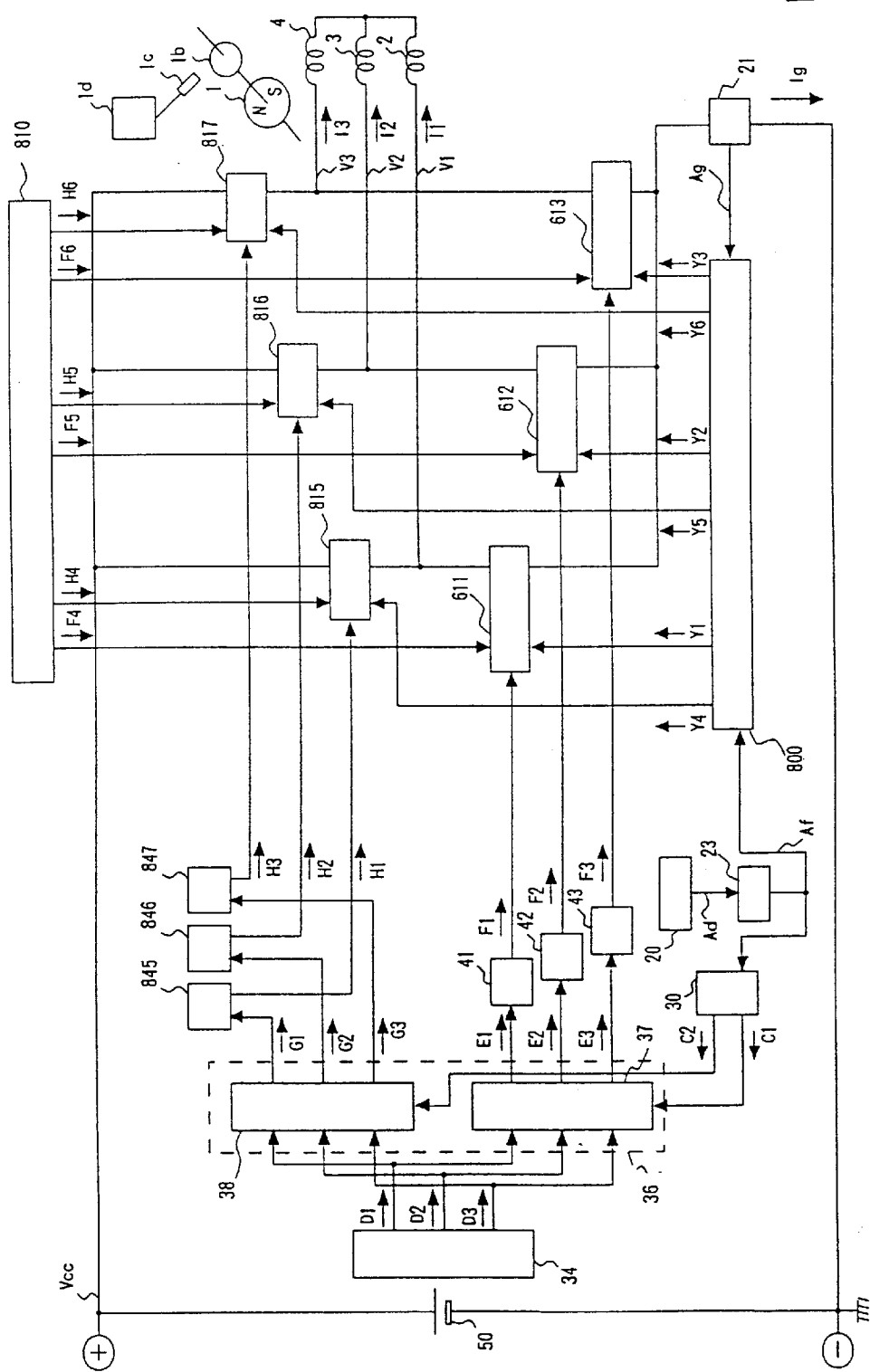
FIG. 27 is a diagram showing the configuration of the embodiment 5 of the present invention.

FIGS. 27 to 31 illustrate the disk drive apparatus and the motor in the embodiment 5 of the present invention. FIG. 27 shows a configuration of the disk drive apparatus and the motor. In the embodiment 5, each of the second power amplifying parts 815, 816 and 817 has a second PMOS-FET power transistor. In addition, the switching control part 800, the auxiliary supply part 810, the second current amplifying parts 845, 846 and 847 are changed. In the rest configurations, components similar to the foregoing embodiment 1, 2, 3 and 4 are designated by the same numerals, and detailed explanation thereof is omitted.

In FIG. 27, the first power amplifying part 611 receives the first amplified current signal F1 from the first current amplifying part 41 via the first terminal of its conduction control terminal side, the first auxiliary current signal F4 from the auxiliary supply part 810 via the second terminal of its conduction control terminal side, and the control pulse signal Y1 from the switching control part 800 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 810 via the second terminal of its conduction control terminal side, and the control pulse signal Y2 from the switching control part 800 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 810 via the second terminal of its conduction control terminal side, and the control pulse signal Y3 from the switching control part 800 via the third terminal of its conduction control terminal side, respectively.

The power amplifying part 620 shown in FIG. 21 is used as each of the first power amplifying parts 611, 612 and 613 in this embodiment. The power amplifying part 620 in FIG. 21 shows the example of the first power amplifying part 611, as described above.

In FIG. 27, the second power amplifying part 815 receives the second amplified current signal H1 from the second current amplifying part 845 via the first terminal of its conduction control terminal side, the second auxiliary current signal H4 from the auxiliary supply part 810 via the second terminal of its conduction control terminal side, and the control pulse signal Y4 from the switching control part 800 via the third terminal of its conduction control terminal side, respectively. In the same way, the second power amplifying part 816 receives the second amplified current signal H2 from the second current amplifying part 846 via the first terminal of its conduction control terminal side, the second auxiliary current signal H5 from the auxiliary supply part 810 via the second terminal of its conduction control terminal side, and the control pulse signal Y5 from the switching control part 800 via the third terminal of its conduction control terminal side, respectively. In the same way, the second power amplifying part 817 receives the second amplified current signal H3 from the second current amplifying part 847 via the first terminal of its conduction control terminal side, the second auxiliary current signal H6 from the auxiliary supply part 810 via the second terminal of its conduction control terminal side, and the control pulse signal Y6 from the switching control part 800 via the third terminal of its conduction control terminal side, respectively.

Figure 31:
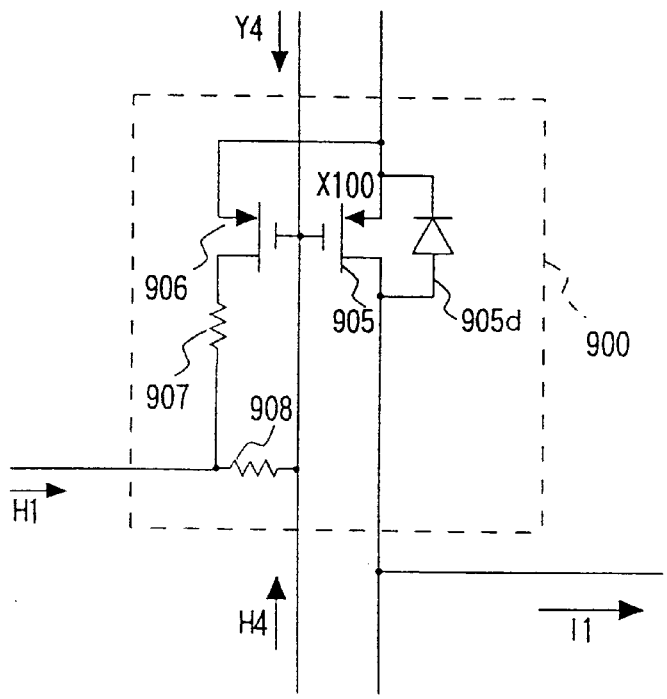
FIG. 31 is a circuit diagram of a second power amplifying part in the embodiment 5.

FIG. 31 illustrates a power amplifying part 900 equivalent to the configuration of each of the second power amplifying parts 815, 816 and 817. In this embodiment, the power amplifying part 900 is used as the second power amplifying part 815. The power amplifying part 900 includes an FET power current-mirror circuit consisting of a PMOS-FET power transistor 905, a power diode 905*d*, a PMOS-FET transistor 906 and resistors 907 and 908. The current input terminal side of the power diode 905*d* is connected to the current output terminal side of the PMOS-FET power transistor 905 and the current output terminal side thereof is connected to the current input terminal side of the PMOS-FET power transistor 905. A resistor 907 is connected between the first terminal of the conduction control side of the power amplifying part 900 and one terminal of the current path terminal pair of the PMOS-FET transistor 906, and a resistor 908 is connected between the first and second terminals of the conduction control terminal side thereof. The third terminal of the conduction control terminal side is connected to the control terminal side of the PMOS-FET power transistor 905. Consequently, the FET power current-mirror circuit of the power amplifying part 900 has a predetermined current amplifying rate while the value of the second amplified current signal H1 supplied to the first terminal of the conduction control terminal side is small. However, when the value of the second amplified current signal H1 is increased, the current amplifying rate is increased sharply. The second auxiliary current signal H4 supplied to the second terminal of the conduction control terminal side reduces the on-resistance of the PMOS-FET power transistor 905. The PMOS-FET power transistor 905 and the FET power current-mirror circuit of the power amplifying part 900 perform high frequency on/off switching in the case that the control pulse signal Y4 supplied to the third terminal of the conduction control terminal side is turned on/off at a high frequency. Besides, the resistors 907 or/and 908 of the power amplifying part 900 may be made zero ohms without any adverse effect on operation.

The second current amplifying parts 845, 846 and 847 in FIG. 27 produce the second amplified current signals H1, H2 and H3 by amplifying the second distributed current signals G1, G2 and G3, respectively. The second amplified current signals H1, H2 and H3 are supplied to the first terminals of the conduction control terminal sides of the second power amplifying parts 815, 816 and 817, respectively.

Figure 30:
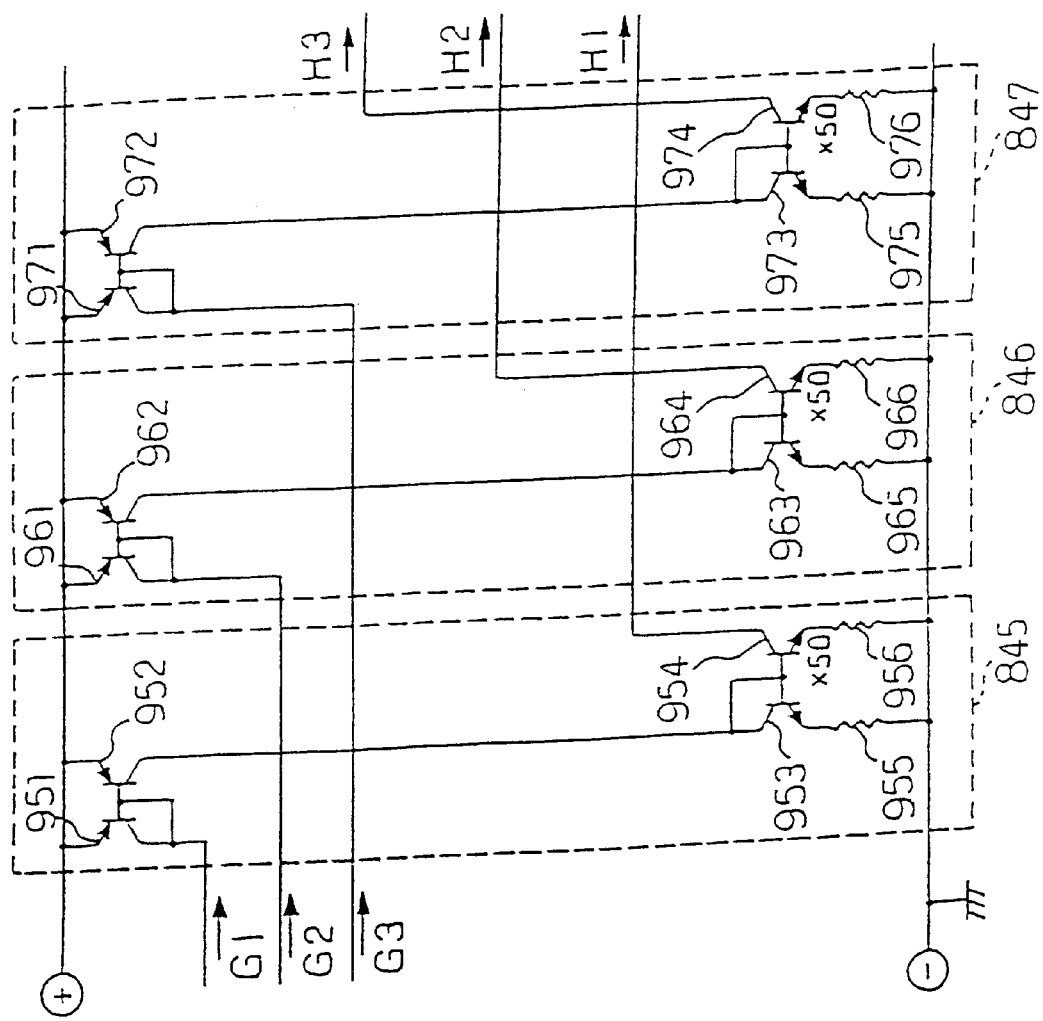
FIG. 30 is a circuit diagram of second current amplifying parts 845, 846, 847 in the embodiment 5.

FIG. 30 shows a configuration of the second current amplifying parts 845, 846 and 847. The second current amplifying part 845 is composed of a second amplifying part current-mirror circuit, which has first-step current-mirror circuit consisting of transistors 951 and 952 and the next-step current-mirror circuit consisting of transistors 953 and 954 and resistors 955 and 956. The second current amplifying part 845 amplifies the input current G1 at a predetermined current amplifying rate of 50 times. In the same way, the second current amplifying part 846 is composed of a second amplifying part current-mirror circuit consisting of transistors 961, 962, 963 and 964, and resistors 965 and 966. The second current amplifying part 846 amplifies the input current G2 at a predetermined current amplifying rate of 50 times. In the same way, the second current amplifying part 847 is composed of a second amplifying part current-mirror circuit consisting of transistors 971, 972, 973 and 974, and resistors 975 and 976. The second current amplifying part 847 amplifies the input current G3 at a predetermined current amplifying rate of 50 times. Consequently, the second current amplifying parts 845, 846 and 847 amplify the three-phase second distributed current signals G1, G2 and G3, respetively, thereby producing the three-phase second amplified current signals H1, H2 and H3.

Figure 28:
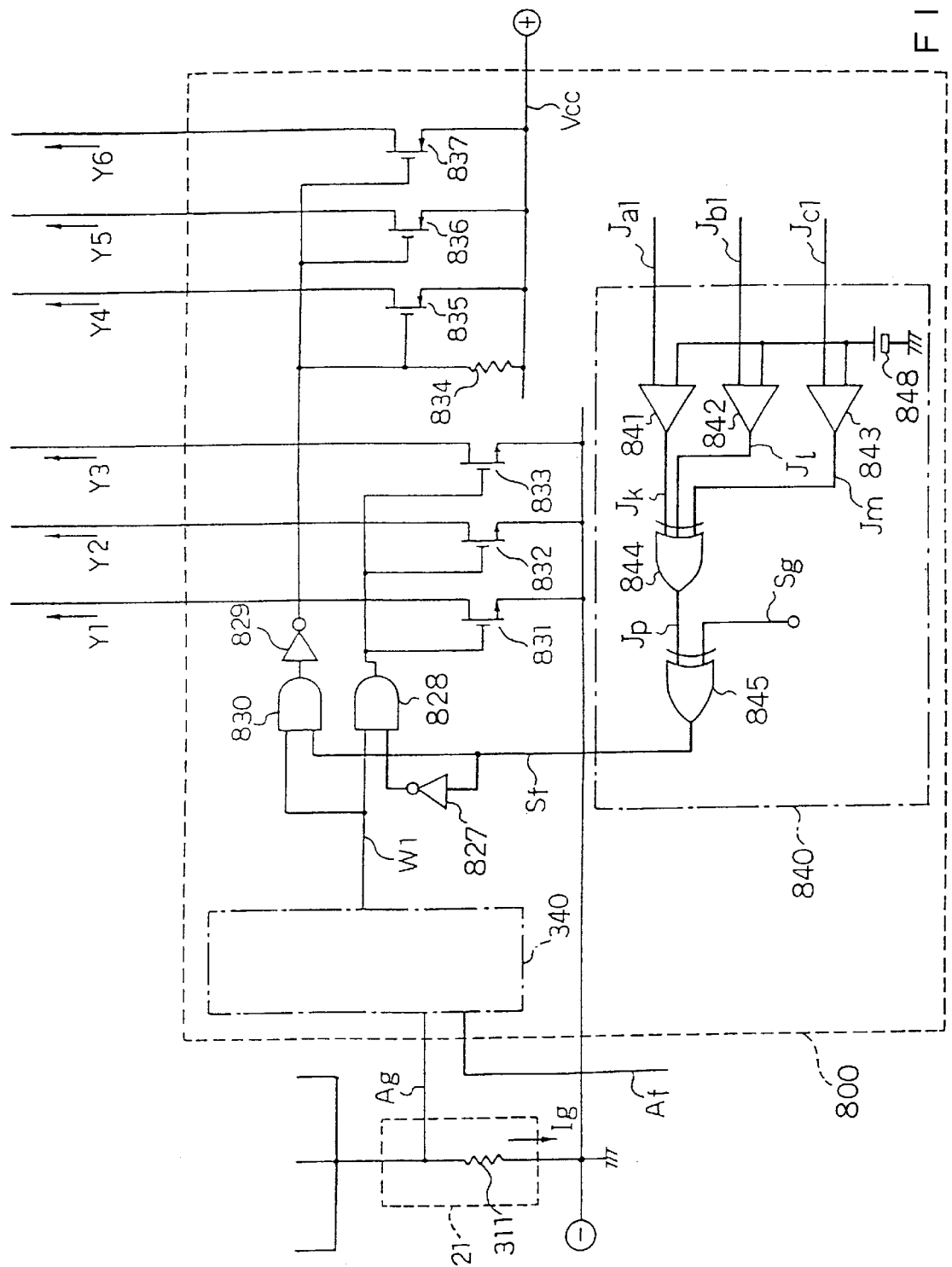
FIG. 28 is a circuit diagram of a switching control part 800 in the embodiment 5.

The switching control part 800 in FIG. 27 causes the first power amplifying parts 611, 612 and 613 and/or the second power amplifying parts 815, 816 and 817 to perform high frequency on/off switching. FIG. 28 shows a configuration of the switching control part 800. The configuration of the switching pulse circuit 340 of the switching control part 800 is the same as the configuration of the circuit shown in FIG. 24. The switching pulse circuit 340 outputs the switching control signal W1.

When the setup switch signal Sf of the setup switch circuit 840 is in the "Lb" state, the output of the AND circuit 830 enters the "Lb". state and the control transistors 835, 836 and 837 are remained off. Consequently, the control pulse signals Y4, Y5 and Y6 are also remained of f. In addition, the control transistors 831, 832 and 833 are turned on/off responding with the switching control signal W1. As a result, the first NMOS-FET power transistors of the first power amplifying parts 611, 612 and 613 perform high frequency on/of switching responding with the control pulse signals Y1, Y2 and Y3. Since the control pulse signals Y4, Y5 and Y6 are off at this time, the second power amplifying parts 815, 816 and 817 are controlled responding with the second amplified current signals H1, H2 and H3 of the second current amplifying parts 845, 846 and 847 (no high frequency switching is performed). Therefore, the first power amplifying parts 611, 612 and 613 perform high frequency switching, and the second power amplifying parts 815, 816 and 817 perform no high frequency switching.

When the setup switch signal Sf of the setup switch circuit 840 is in the "Hb" state, the output of the AND circuit 828 enters the "Lb" state and the control transistors 831, 832 and 833 are remained off. Consequently, the control pulse signals Y1, Y2 and Y3 are also remained off. In addition, the control transistors 835, 836 and 837 are turned on/off responding with the switching control signal W1. As a result, the second PMOS-FET power transistors of the first power amplifying parts 815, 816 and 817 perform high frequency on/off switching responding with the control pulse signals Y4, Y5 and Y6. Since the control pulse signals Y1, Y2 and Y3 are off at this time, the first power amplifying parts 611, 612 and 613 are controlled responding with the first amplified current signals F1, F2 and F3 of the first current amplifying parts 41, 42 and 43 (no high frequency switching is performed). Therefore, the first power amplifying parts 611, 612 and 613 perform no high frequency switching, and the second power amplifying parts 815, 816 and 817 perform high frequency switching.

The setup switch circuit 840 changes the setup switch signal Sf responding with the output signals of the altering signal producing part 34 or the movement of the movable member 1. The setup switch circuit 840 receives the three-phase position signals Ja1, Jb1 and Jc1 of the altering signal producing part 34. Shaping circuits 841, 842 and 843 output three-phase digital signals Jk, Jl and Jm by comparing the position signals Ja1, Jb1 and Jc1 with a predetermined level of a voltage source 848, respectively. A first Exclusive-OR circuit 844 mixes the three digital signals Jk, Jl and Jm and outputs a digital signal Jp. The digital signal Jp becomes "Hb" in the condition that only one or all of the three digital signals Jk, Jl and Jm is/are "Hb", and it becomes "Lb" in the condition that two of the three digital signals Jk, Jl and Jm are "Hb". A second Exclusive-OR circuit 845 mixes the digital signals Jp and a setup signal Sg, and outputs the setup switch signal Sf. The setup switch signal Sf is the non-inverted signal of the digital signal Jp in the case that the setup signal Sg is "Lb", and the setup switch signal Sf is the inverted signal of the digital signal Jp in the case that the setup signal Sg is "Hb".

Therefore, the setup switch circuit 840 changes the polarity of the setup switch signal Sf every 60 electrical degree or substantially every 60 electrical degree responding with the output signals of the altering signal producing part 34 or altering operation of the current paths. As a result, either the first power amplifying parts or the second power amplifying parts perform high frequency switching alternatively every 60 degree.

The setup signal Sg can be selected so that the power amplifying parts not altering the current paths to the windings perform high frequency switching. In this case, the switching power loss of the power transistors can be reduced because only one transistor perform high frequency switching in every 60 degree. The setup signal Sg can also be selected so that the power amplifying parts altering the current paths to the windings perform high frequency switching. In this case, a smooth alteration of the current paths is easily achieved in every 60 degree. Besides, the setup signal Sg may be changed over as needed.

Figure 29:
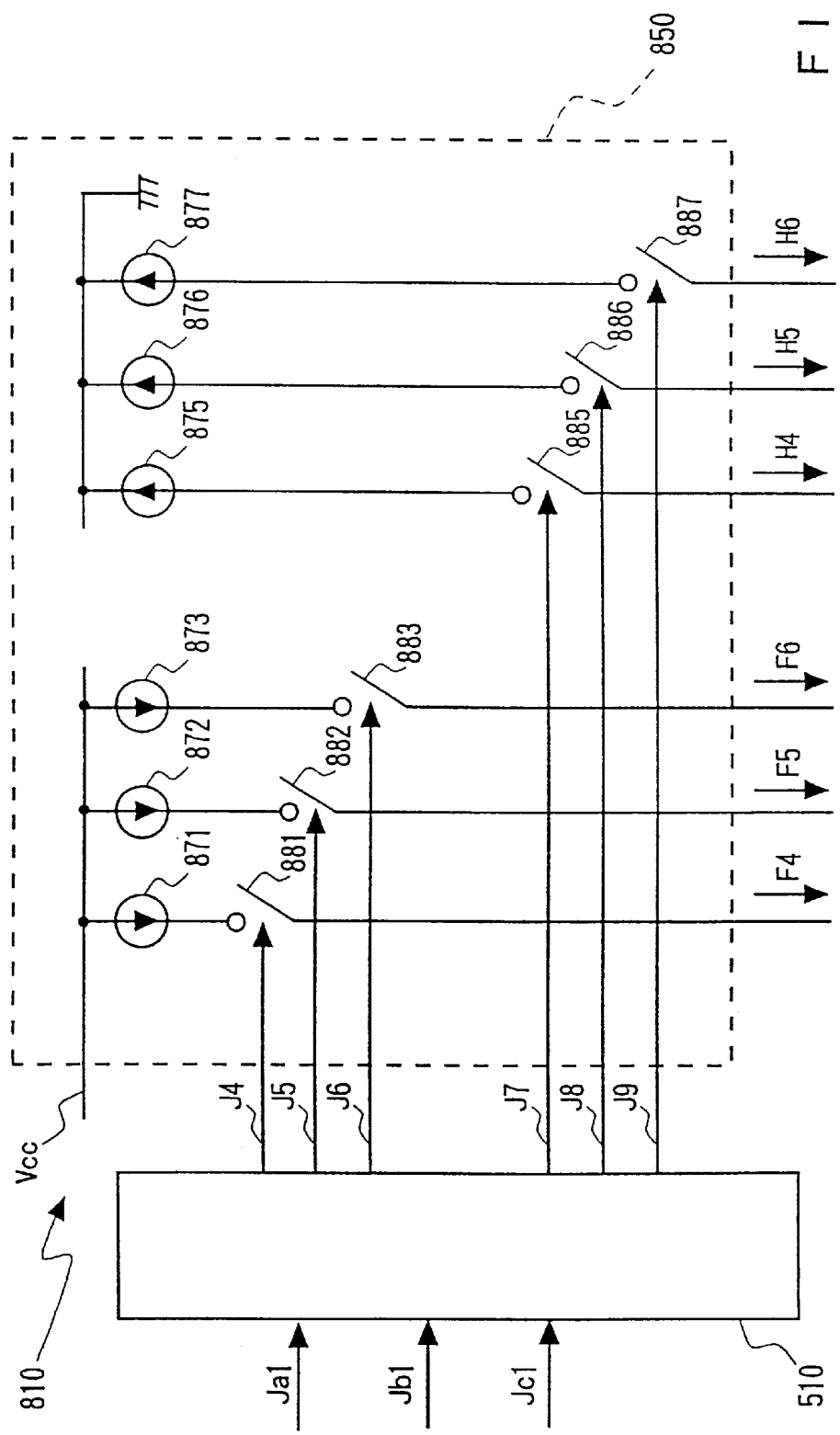
FIG. 29 is a circuit diagram of an auxiliary supply part 810 in the embodiment 5.

The auxiliary supply part 810 in FIG. 27 supplies the three-phase first auxiliary current signals F4, F5 and F6 to the conduction control terminal sides of the first power amplifying parts 611, 612 and 613 responding with output signals from the altering signal producing part 34 and supplies the three-phase second auxiliary current signals H4, H5 and H6 to the conduction control terminal sides of the second power amplifying parts 815, 816 and 817 responding with output signals from the altering signal producing part 34. FIG. 29 shows a configuration of the auxiliary supply part 810. The configuration of the auxiliary altering signal producing part 510 of the auxiliary supply part 810 is the same as that shown in FIG. 17. Thus, detailed explanation for the part 510 will be omitted here. The auxiliary current altering part 850 includes three first current sources 871, 872, 873, three second current sources 875, 876 and 877, three first switch circuits 881, 882 and 883, and three second switch circuits 885, 886 and 887. The first current sources 871, 872 and 873 are connected to the positive terminal side of the DC power source part 50 and the second current sources 875, 876 and 877 are connected to the negative terminal side of the DC power source part 50.

The first switch circuits 881, 882 and 883 are switched on responding with the "Hb" states of the auxiliary altering signals J4, J5 and J6 of the auxiliary altering signal producing part 510, respectively, thereby supplying current signals of the first current sources 871, 872, and 873 as the first auxiliary current signals F4, F5 and F6. The second switch circuits 885, 886 and 887 are switched on responding with the "Hb" states of the auxiliary altering signals J7, J8 and J9 of the auxiliary altering signal producing part 510, respectively, thereby supplying current signals of the second current sources 875, 876 and 877 as the second auxiliary current signals H4, H5 and H6.

The relationship of waveforms between the first amplified current signals F1, F2 and F3 and the first auxiliary current signals F4, F5 and F6 is the same as that illustrated in FIG. 19(*g*) and (*a*) to (*c*). The relationship of waveforms between the second amplified current signals H1, H2 and H3 and the second auxiliary current signals H4, H5 and H6 is the same as that illustrated in FIGS. 19(*h*) and (*d*) to (*f*).

In FIG. 27, the supply signal producing part 30 outputs the first supply current signal C1 and the second supply current signal C2 responding with the modified command signal Af of the command modifying part 23, thereby changing the first amplified current signals F1, F2 and F3 and the second amplified current signals H1, H2 and H3 responding with the modified command signal Af. Thus, the first power amplifying parts and the second power amplifying parts can smoothly alter current paths to the three-phase windings even when the command signal Ad of the command signal producing part 20 changes.

The remainder of the configuration and operation is similar as that in the embodiment 1, 2, 3, or 4. Therefore, detailed explanation thereof will be omitted here.

In this embodiment, since the first power amplifying parts or the second power amplifying parts perform high frequency on/off switching, the power loss of those power amplifying parts is small. Consequently, this embodiment can provide a disk drive apparatus and a motor with excellent power efficiency. In addition, the first and second amplified current signals are changed in magnitude responding with the modified command signal Af, thereby reducing the power loss caused by an input currents to the first and second power amplifying parts. Further, since the peak value of the conducted current signal Ig of the DC power source part 50 to the windings 2, 3 and 4 or the composed supply current of the negative or positive parts of the drive currents to the windings is changed corresponding to the movement of the movable member 1 or the alteration of the current paths to the windings, smooth sinusoidal drive currents can be supplied to the windings, thereby reducing the vibration and acoustic noise.

Furthermore, since the first NMOS-FET power transistors are used in the first power amplifying parts and the second PMOS-FET power transistors are used in the second power amplifying parts, no high-voltage outputting part is used and no voltage source part except the DC power source part 50 is used for controlling the power transistors. Thus, the configuration of the embodiment can be simplified very much.

Furthermore, since the first amplified current signals (as first three-phase current signals), and the second amplified signals (as second three-phase current signals) are changed in magnitude corresponding to the command signal Ad or the modified command signal Af, the altering operation of the current paths to the windings can be achieved smoothly even when the command signal Ad is changed.

This embodiment can thus have similar advantages as those of the above-mentioned embodiments.

Furthermore, in this embodiment, each of the first power amplifying parts 611, 612 and 613 can be modified freely. For example, the power amplifying part 640 shown in FIG. 22 can be used as each of the first power amplifying parts 611, 612 and 613.

Figure 32:
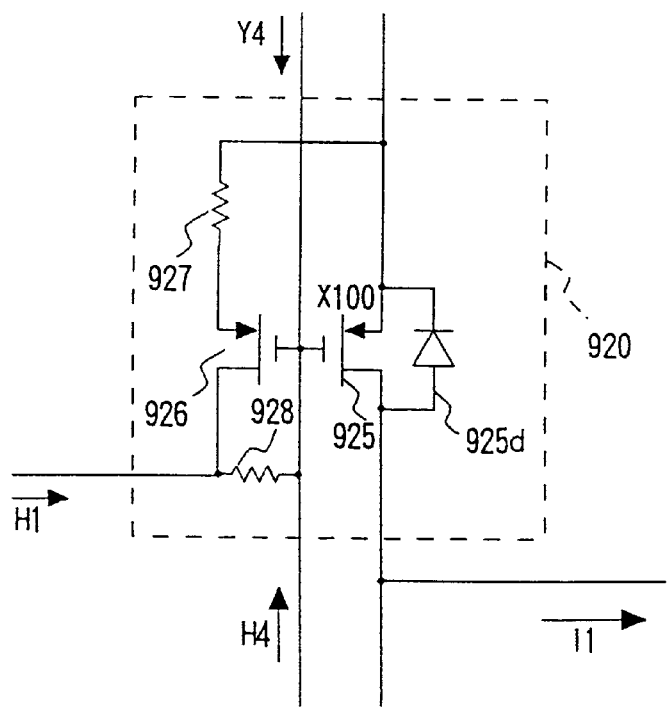
FIG. 32 is a circuit diagram showing another configuration of the second amplifying part in the embodiment of the present invention.

Furthermore, each of the second power amplifying parts 815, 816 and 817 can be modified freely. For example, FIG. 32 illustrates another configuration of the power amplifying part 920 usable as each of the second power amplifying parts 815, 816 and 817. In this example, the power amplifying part 920 is used as the second power amplifying part 815. The power amplifying part 920 includes an FET power current-mirror circuit consisting of a PMOS-FET power transistor 925, a power diode 925*d*, an PMOS-FET transistor 926, and resistors 927 and 928. The current input terminal side of the power diode 925*d* is connected to the current output terminal side of the PMOS-FET power transistor 925 and the current output terminal side thereof is connected to the current input terminal side of the PMOS-FET power transistor 925. The first terminal of the conduction control terminal side of the power amplifying part 920 is connected to one terminal of the current path terminal pair of the PMOS-FET transistor 926 and a resistor 927 is connected between the other terminal of the current path terminal pair of the PMOS-FET transistor 926 and said one terminal of the current path terminal pair of the PMOS-FET power transistor 925 and a resistor 928 is connected between the first and second terminals of the conduction control terminal side thereof. The third terminal of the conduction control terminal side is connected to the control terminal side of the PMOSFET power transistor 925. Consequently, the FET power current-mirror circuit of the power amplifying part 920 has a considerably large current amplifying rate. In addition, the second auxiliary current signal H4 supplied to the second terminal of the conduction control terminal side reduces the power loss caused by the on-resistance of the PMOS-FET power transistor 925. The PMOS-FET power transistor 925 and the FET power current-mirror circuit of the power amplifying part 920 perform high frequency on/off switching when the control pulse signal Y4 supplied to the third terminal of the conduction control terminal side is turned on/off. Besides, the resistors 927 or/and 928 of the power amplifying part 920 may be made zero ohm without any adverse effect on operation.

<<Embodiment 6>>

Figure 33:
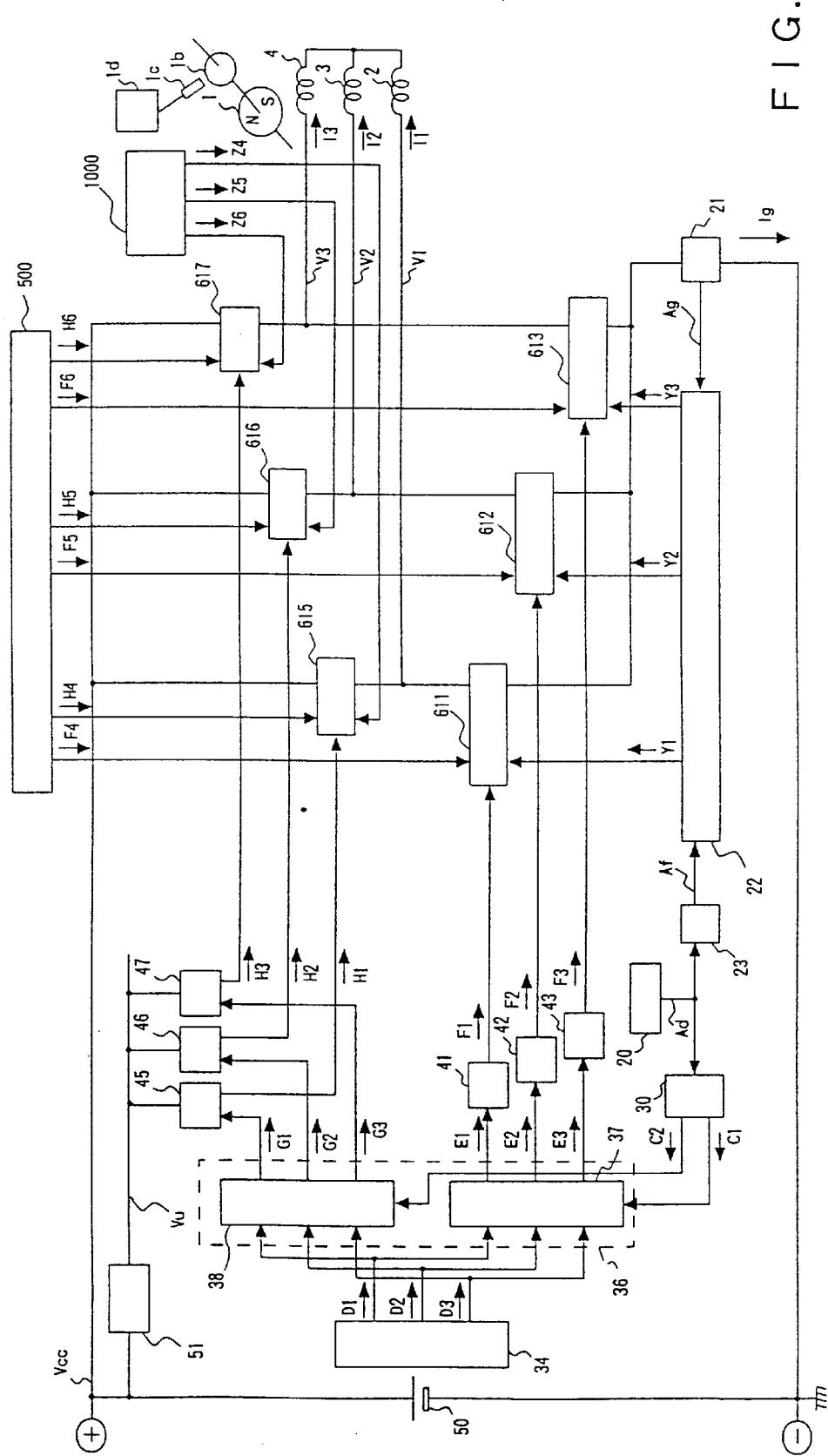
FIG. 33 is a diagram showing the configuration of the embodiment 6 of the present invention.
Figure 34:
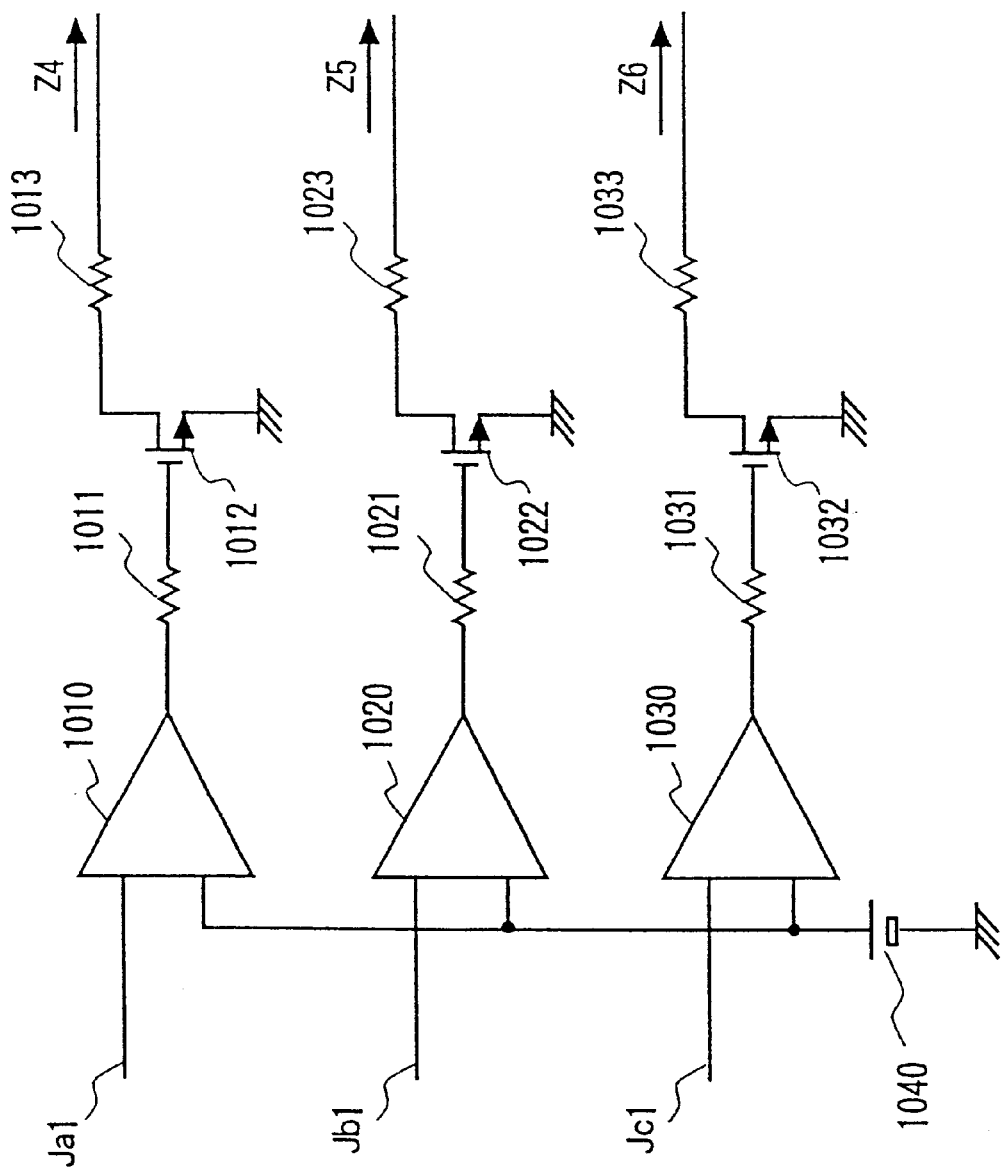
FIG. 34 is a circuit diagram of an off operation part 1000 in the embodiment 6.

FIGS. 33 and 34 illustrate the disk drive apparatus and the motor in the embodiment 6 of the present invention. FIG. 33 shows a configuration of the disk drive apparatus and the motor. In the embodiment 6, an off operation part 1000 is the newly provided part. In the rest configurations, components similar to the foregoing embodiment 1, 2, 3, 4 and 5 are designated by the same numerals, and detailed explanation thereof is omitted.

In FIG. 33, the first power amplifying part 611 receives the first amplified current signal F1 from the first current amplifying part 41 via the first terminal of its conduction control terminal side, the first auxiliary current signal F4 from the auxiliary supply part 500 via the second terminal of its conduction control terminal side, and the control pulse signal Y1 from the switching control part 22 via the third terminal of its conduction control terminal side, respectively. In the same way, the first power amplifying part 612 receives the first amplified current signal F2 from the first current amplifying part 42 via the first terminal of its conduction control terminal side, the first auxiliary current signal F5 from the auxiliary supply part 500 via the second terminal of its conduction control terminal side, and the control pulse signal Y2 from the switching control part 22 via the third terminal of its conduction control terminal side, respectively. In the same way, the first power amplifying part 613 receives the first amplified current signal F3 from the first current amplifying part 43 via the first terminal of its conduction control terminal side, the first auxiliary current signal F6 from the auxiliary supply part 500 via the second terminal of its conduction control terminal side, and the control pulse signal Y3 from the switching control part 22 via the third terminal of its conduction control terminal side, respectively.

The second power amplifying part 615 receives the second amplified current signal H1 from the second current amplifying part 45 via the first terminal of its conduction control terminal side, the second auxiliary current signal H4 from the auxiliary supply part 500 via the second terminal of its conduction control terminal side, and an off current signal Z4 from the off operation part 1000 via the third terminal of its conduction control terminal side, respectively. In the same way, the second power amplifying part 616 receives the second amplified current signal H2 from the second current amplifying part 46 via the first terminal of its conduction control terminal side, the second auxiliary current signal H5 from the auxiliary supply part 500 via the second terminal of its conduction control terminal side, and the off current signal Z5 from the off operation part 1000 via the third terminal of its conduction control terminal side, respectively. In the same way, the second power amplifying part 617 receives the second amplified current signal H3 from the second current amplifying part 47 via the first terminal of its conduction control terminal side, the second auxiliary current signal H6 from the auxiliary supply part 500 via the second terminal of its conduction control terminal side, and the off current signal Z6 from the off operation part 1000 via the third terminal of its conduction control terminal side, respectively.

The off current signal Z4 of the off operation part 1000 causes the second power amplifying part 615 to be turned off when the first power amplifying part 611 is performing high frequency switching. When the second power amplifying part 615 becomes to be conducted, the off current signal Z4 enters the no-signal state (zero current) so that the second power amplifying part 615 is controlled responding with the input current signal to the conduction control terminal side. In the same way, the off current signal Z5 of the off operation part 1000 causes the second power amplifying part 616 to be turned off when the first power amplifying part 612 is performing high frequency switching. When the second power amplifying part 616 becomes to be conducted, the off current signal Z5 enters the no-signal state (zero current) so that the second power amplifying part 616 is controlled responding with the input current signal to the conduction control terminal side. In the same way, the off current signal Z6 of the off operation part 1000 causes the second power amplifying part 617 to be turned off when the first power amplifying part 613 is performing high frequency switching. When the second power amplifying part 617 becomes to be conducted, the off current signal Z6 enters the no-signal state (zero current) so that the second power amplifying part 617 is controlled responding with the input current signal to the conduction control terminal side.

FIG. 34 illustrates a configuration of the off operation part 1000. A comparator 1010 of the off operation part 1000 compares an output signal Ja1 of the altering signal producing part 34 with a predetermined voltage of a voltage source 1040 so as to turn on/off the NMOS-FET transistor 1012 responding with the comparison result. As a result, the off current signal Z4 is output, thereby turning off the second power amplifying part 615 surely. In the same way, another comparator 1020 of the off operation part 1000 compares an output signal Jb1 of the altering signal producing part 34 with the predetermined voltage of the voltage source 1040 so as to turn on/off the NMOS-FET transistor 1022 responding with the comparison result. As a result, the off current signal Z5 is output, thereby turning off the second power amplifying part 616 surely. In the same way, another comparator 1030 of the off operation part 1000 compares an output signal Jc1 of the altering signal producing part 34 with the predetermined voltage of the voltage source 1040 so as to turn on/off the NMOS-FET transistor 1032 responding with the comparison result. As a result, the off current signal Z6 is output, thereby turning off the second power amplifying part 617 surely.

Other configuration and operation are similar as that in the embodiment 3, 2 and 1. Thus, detailed explanation thereof will be omitted here.

In this embodiment, when each of the conducted first power amplifying parts performs high frequency switching, each of the second power amplifying parts of the same phase is turned off by each of the off current signals from the off operation part 1000. Thus, even when each of the drive voltage signals is a high frequency pulse voltage with a large amplitude, it is possible to prevent unnecessary current through each of the second power amplifying parts which should be in the off state. Especially, when each of the second power amplifying parts includes an FET power current-mirror circuit, such an unnecessary current is apt to be flown through it. And the off operation part 1000 is very effective to prevent such the unnecessary current.

In the above-mentioned configuration, only the first power amplifying parts perform high frequency switching. However, both first and second power amplifying parts may perform high frequency switching. Alternatively, when a first power amplifying part remains off, the first power amplifying part can be maintained off forcibly by another off signal from the off operation part.

This embodiment can thus obtain similar advantages as those in the above-mentioned embodiments.

As described above, the disk drive apparatus according to the invention has many excellent advantages such as reduced vibration and/or reduced acoustic noise and/or reduced power loss. Because of small vibration of the disk, the disk drive apparatus can reduce the jitter of the rotational speed of the disk, thereby reducing the bit rate error in reproducing the disk or the recording position displacement in recording the disk. Because of small acoustic noise, the disk drive apparatus does not disturb to enjoy a movie reproduced from the disk. Because of small power loss, the disk drive apparatus can reduce its power consumption and a heat up of the disk, thereby performing a good recording operation or a good reproducing operation for a recordable disk. Therefore, an excellent disk drive apparatus such as a DVD drive apparatus, a CD drive apparatus, an HDD drive apparatus, an FDD drive apparatus, and so on, can be realized according to the invention.

Further, in the embodiment the rotational speed of the disk becomes slow continuously or stepwise in inversely proportional to the radial position of the head, which is called as CLV (Constant Line Velocity) or ZCLV (Zone Constant Line Velocity). As a result of this, the disk drive apparatus according to the invention has another advantage that a bit rate of the reproducing signal becomes constant or almost constant irrespective of the radial position of the head in reproducing the disk, or that a density of the recording signal on the disk becomes constant or almost constant irrespective of the radial position of the head in recording the disk. Furthermore, since the disk drive apparatus can rapidly accelerate or decelerate the rotational speed of the disk without making a large disk vibration, a large acoustic noise, and a large power dissipation, the disk drive apparatus has further another advantage that it can significantly reduce the search time in changing the radial position of the head. Besides, the disk drive apparatus can keep the rotational speed of the disk constant regardless of the position of the head.

Figure 35:
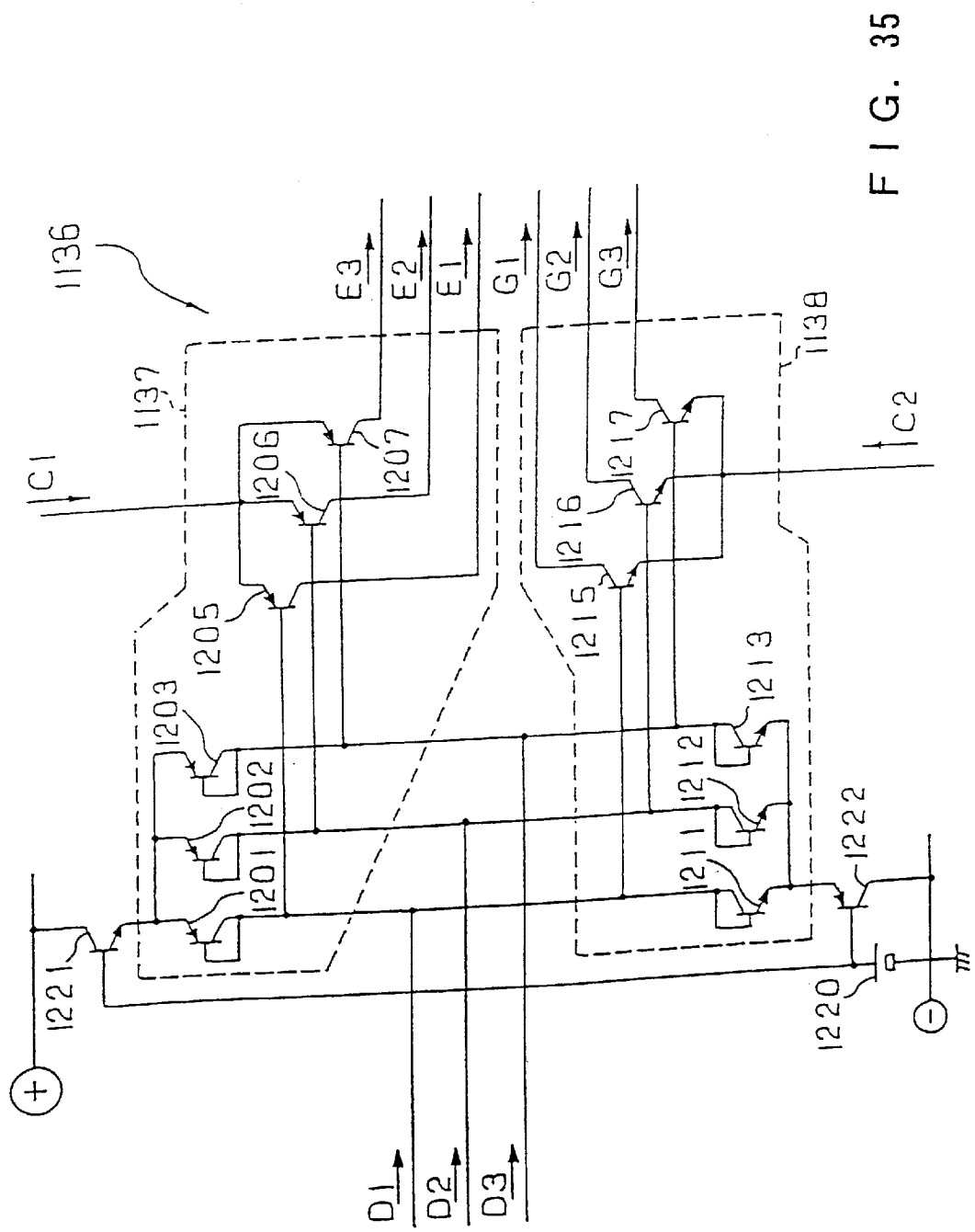
FIG. 35 is a circuit diagram showing another configuration of the distributed signal producing part in the embodiment of the present invention.

In the detailed configuration of each of the foregoing embodiments, various modifications are possible. For example, the distributed signal producing part is not limited to the one as described above. FIG. 35 illustrates the distributed signal producing part 1136 in another configuration, which will be described. The distributed signal producing part 1136 includes a first distributor 1137 and a second distributor 1138. The first distributor 1137 distributes the first supply current signal C1 of the supply signal producing part 30 responding with the three-phase altering current signals D1, D2 and D3 from the altering signal producing part 34, and produces first three-phase distributed current signals E1, E2 and E3, each varying smoothly. The second distributor 1138 distributes the second supply current signal C2 of the supply signal producing part 30 responding with the three-phase altering current signals D1, D2 and D3 from the altering signal producing part 34, and produces second three-phase distributed current signals G1, G2 and G3, each varying smoothly.

The first distributor 1137 is composed of three first input transistors 1201, 1202 and 1203, and three first distributing transistors 1205, 1206 and 1207. The conduction control terminal and the signal input terminal of the current path terminal pair of each of the first input transistors 1201, 1202 and 1203 are connected to the current input-output terminal side of the distributed signal producing part 1136, to which each of three-phase altering current signals D1, D2 and D3 is entered from the altering signal producing part 34. The signal output terminals of the current path terminal pairs of the first input transistors 1201, 1202 and 1203 are connected commonly. The current signal input terminal sides of the first distributing transistors 1205, 1206 and 1207 are connected commonly, so that the first supply current signal C1 of the supply signal producing part 30 is entered to the common-connected terminal side. The conduction control terminal sides of the first distributing transistors 1205, 1206 and 1207 are connected to the current input-output terminal sides of the distributed signal producing part 1136, to which three-phase altering current signals D1, D2 and D3 are entered, respectively. Consequently, the three first distributing transistors 1205, 1206 and 1207 output three-phase first distributed current signals E1, E2 and E3 from their current signal output terminal sides. The first input transistors 1201, 1202 and 1203 are identical in type to the first distributing transistors 1205, 1206 and 1207. In this embodiment, a PNP bipolar transistor is used for each of the first input transistors 1201, 1202 and 1203, as well as for each of the first distributing transistors 1205, 1206 and 1207. The conduction control terminal of each of the first input transistors is the base terminal, the signal input terminal of the current path terminal pair is the collector terminal, and the signal output terminal of the current path terminal pair is the emitter terminal. The conduction control terminal of each of the first distributing transistors is the base terminal, the current signal input terminal is the emitter terminal, and the current signal output terminal is the collector terminal.

The second distributor 1138 is composed of three second input transistors 1211, 1212 and 1213, and three second distributing transistors 1215, 1216 and 1217. The conduction control terminal and the signal input terminal of the current path terminal pair of each of the second input transistors 1211, 1212 and 1213 are connected to the current input-output terminal side of the distributed signal producing part 1136, to which each of three-phase altering current signals D1, D2 and D3 is entered from the altering signal producing part 34. The signal output terminals of the current path terminal pairs of the second input transistors 1211, 1212 and 1213 are connected commonly. The current signal input terminal sides of the second distributing transistors 1215, 1216 and 1217 are connected commonly, so that the second supply current signal C2 of the supply signal producing part 30 is entered to the common-connected terminal side. The conduction control terminal sides of the second distributing transistors 1215, 1216 and 1217 are connected to the current input-output terminal sides of the distributed signal producing part 1136, to which three-phase altering current signals D1, D2 and D3 are entered, respectively. Consequently, the three second distributing transistors 1215, 1216 and 1217 output three-phase second distributed current signals G1, G2 and G3 from their current signal output terminal sides, respectively. The second input transistors 1211, 1212 and 1213 are identical in type to the second distributing transistors 1215, 1216 and 1217. In addition, the type of the second input transistors 1211, 1212 and 1213 is different from the type of the first input transistors 1201, 1202 and 1203. In this embodiment, an NPN bipolar transistor is used for each of the second input transistors 1211, 1212 and 1213, as well as for each of the second distributing transistors 1215, 1216 and 1217. The conduction control terminal of each of the second input transistors is the base terminal, the signal input terminal of the current path terminal pair is the collector terminal, and the signal output terminal of the current path terminal pair is the emitter terminal. The conduction control terminal of each of the second distributing transistors is the base terminal, the current signal input terminal is the emitter terminal, and the current signal output terminal is the collector terminal. In addition, a reference voltage source 1220 and transistors 1221 and 1222 together form a supplying block of predetermined voltages. The supplying block of predetermined voltages supplies a first DC voltage to the common-connected terminal of the first input transistors 1201, 1202 and 1203 and a second DC voltage to the common-connected terminal of the second input transistors 1211, 1212 and 1213, respectively.

Consequently, when the altering current signal D1 is a negative current part, the first input transistor 1201 is conducted and the second input transistor 1211 is not conducted. When the altering current signal D1 is a positive current part, the second input transistor 1211 is conducted and the first input transistor 1201 is not conducted. In other words, according to the polarity of the altering current signal D1, a smooth current is supplied in a complementary manner to the first and second input transistors 1201 and 1211. Thus, a current is never flown concurrently into both the first and second input transistors 1201 and 1211. In the same way, when the altering current signal D2 is a negative current part, the first input transistor 1202 is conducted. When the altering current signal D2 is a positive current part, the second input transistor 1212 is conducted. In the same way, when the altering current signal D3 is negative current part, the first input transistor 1203 is conducted. When the altering current signal D3 is a positive current part, the second input transistor 1213 is conducted.

The first distributing transistors 1205, 1206 and 1207 of the first distributor 1137 distribute the first supply current signal C1 to the current signal output terminal sides according to the three-phase currents flowing in the first input transistors 1201, 1202 and 1203, thereby producing the three-phase first distributed current signals E1, E2 and E3. Consequently, the three-phase first distributed current signals E1, E2 and E3 are varied smoothly according to the negative current parts of the three-phase altering current signals D1, D2 and D3, so that the sum value of the distributed current signals E1, E2 and E3 becomes equal to the value of the first supply current signal C1. In the same way, the second distributing transistors 1215, 1216 and 1217 of the second distributor 1138 distribute the second supply current signal C2 to the current signal output terminal sides responding with the three-phase currents flowing in the second input transistors 1211, 1212 and 1213, thereby producing the three-phase second distributed current signals G1, G2 and G3. Consequently, the three-phase second distributed current signals G1, G2 and G3 are varied smoothly responding with the positive current parts of the three-phase altering current signals D1, D2 and D3, so that the sum value of the distributed current signals G1, G2 and G3 becomes equal to the value of the second supply current signal C2. The waveforms of the three-phase first distributed current signals E1, E2 and E3, and the three-phase second distributed current signals G1, G2 and G3 become the same as those shown in FIG. 10.

Furthermore, various types of single chip IC technologies using a well-known semiconductor process can be used for integrating the parts of the above-mentioned circuit into an IC. For example, there is a technology usable for various types of single chip ICs. The technology can use a single type or plural types of FET transistors with double diffused MOS structure and FET transistors with CMOS structure. Whether single type or plural types of transistors is used, the substraight of the IC can be connected to a potential (ground potential) of the negative terminal side of a DC power source, thereby integrating transistors, resistors, and some other components in a high density. The technology is not limited to the above-mentioned one, but a dielectric isolation technology can also be used for integrating transistors and resistors. The specific transistor layout within the chip is a design matter, and therefore, detailed explanation will be omitted here.

Power diodes of power amplifying parts can be disposed together with power transistors in an IC, but they can be disposed outside the IC as needed. For example, a Schottkey barrier power diode may be connected reversely in parallel to each of power transistors. The first amplifying part current-mirror circuit of each of the first current amplifying parts and the second amplifying part current-mirror circuit of each of the second current amplifying parts may be provided with nonlinear current amplifying characteristics so that when a current is increased, the current amplifying rate is also increased.

The switching control part has enabled highly accurate controlling of currents by controlling switching operations of each power amplifying part responding with the result of comparison between a current detected signal and a command signal. The present invention is not limited only to such a configuration, however. Various modifications are possible. For example, the switching control part may cause at least one of either or both first power amplifying parts and second power amplifying parts to perform switching responding with a single switching control signal. Furthermore, either or both first power amplifying parts and second power amplifying parts may perform switching responding with plural-phase switching control signals as needed. The current detecting part may be inserted into the positive terminal side of the DC power source part. The current detecting part is not limited only to a method for detecting a supply current from a DC power source directly; various well-known methods can apply to the current detecting method of the current detecting part. For example, the current detecting part may be composed to obtain a signal corresponding to a conducted current of each FET power transistor.

The configuration of the auxiliary supply part is not limited only to the one for outputting an auxiliary current signal. For example, it may be decided so as to supply an auxiliary voltage signal to the conduction control terminal side of each of the power amplifying parts. The auxiliary signal of the auxiliary supply part can reduce the on-resistance of each FET power transistor of each power amplifying part, thereby reducing the power loss caused by the on-resistance without disturbing the smooth altering operation of each current path.

Each of the windings may be composed to receive any of two-way and one-way currents. The current supplied to each winding may be changed over between two-way and one-way currents as needed.

Figure 36:
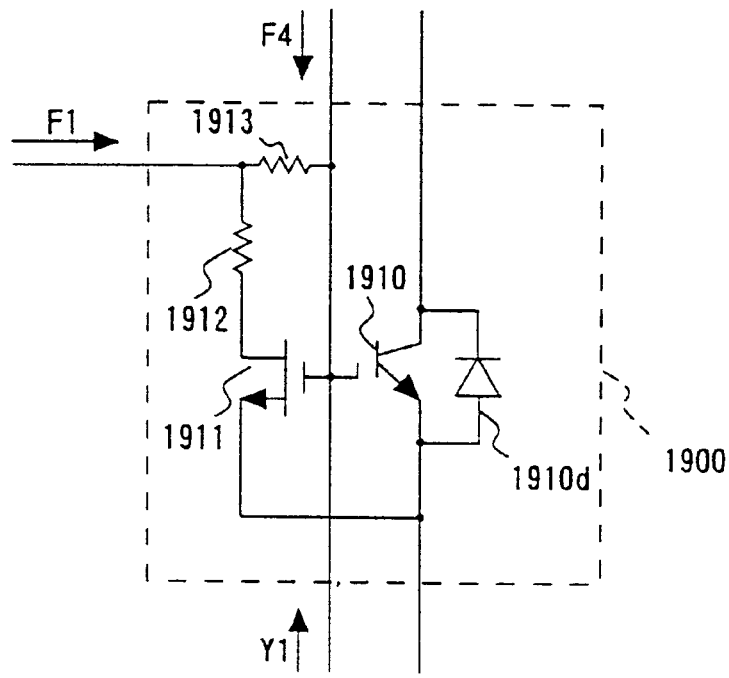
FIG. 36 is a circuit diagram showing another configuration of the power amplifying part in the embodiment of the present invention.

The first power amplifying parts and second power amplifying parts are not limited to the illustrated configuration, but various modifications are possible. In the foregoing embodiments, a power amplifying part having a power current-mirror circuit of FET power transistors is shown as a preferred example, but the invention is not limited to such a configuration. For example, an IGBT transistor (Insulated Gate Bipolar Transistor) or COMFET transistor (Conductivity Modulated Field Effect Transistor) is a composite FET power transistor having a nonlinear voltage amplification characteristic and is used as an on-off switching device, because of a large variation of the amplification characteristic. However, since the IGBT transistor is a composite FET transistor having an FET transistor at the input side, an FET power current-mirror circuit can be configured by using the IGBT transistor, thereby configuring a power amplifying part which includes an IGBT power transistor and has a current amplifying characteristic. By supplying a current signal, varying smoothly or substantially smoothly at least in the rising and/or falling slope portions, to the conduction control terminal side of such a power amplifying part, it becomes possible to alter the current paths smoothly. Though the composite FET transistor has many shortcomings (large ON voltage, large variation in amplification gain, etc.), the various effects shown in the present invention can be obtained. Accordingly, the FET transistors in the present invention include the IGBT transistor or composite FET transistor having an FET transistor at the input side. FIG. 36 shows an example of a power amplifying part 1900 having a composite FET power transistor 1910 such as the IGBT transistor. In this configuration, the power amplifying part 1900 is used as the first power amplifying part 611. With the connection of the composite FET power transistor 1910, an FET transistor 1911 and resistors 1912 and 1913, an FET power current-mirror circuit is formed equivalently. With this configuration, the input current to the conduction control terminal side of the power amplifying part 1900 is amplified, and the drive current is output through the current path terminal pair of the composite FET transistor 1910. A power diode 1910d is a parasitic diode connected equivalently and in reverse parallel to the current path terminal pair of the composite FET power transistor 1910. The composite FET power transistor 1910 performs a full-on operation with a voltage drop including a bias value of a voltage. The power amplifying part 1900 can perform high frequency switching by the switching control part, and can alter current paths smoothly responding with an input current signal varying smoothly at least in rising and/or falling slopes. The power amplifying part 1900 can be used instead of each of the first and second power amplifying parts. The resistors 1912 and 1913 may be made zero ohm or omissible without any adverse effect on operation.

Figure 37:
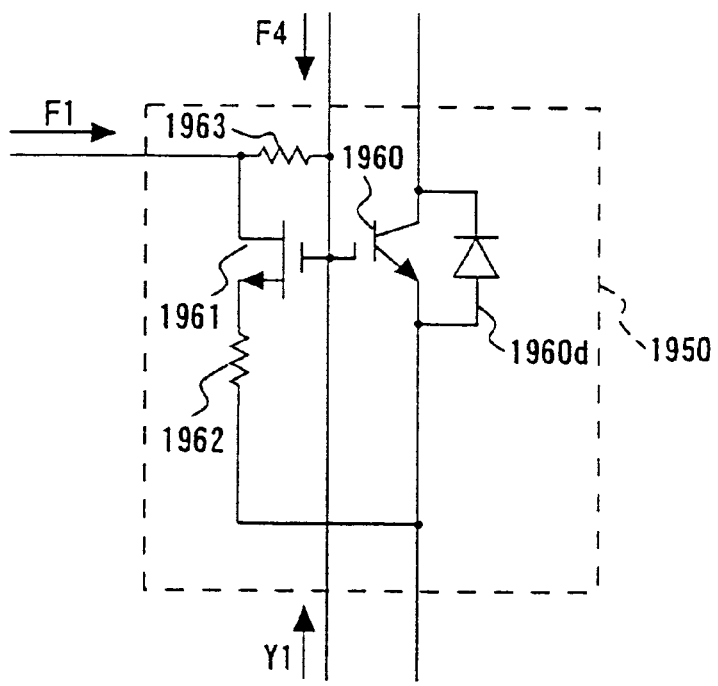
FIG. 37 is a circuit diagram showing another configuration of the power amplifying part in the embodiment of the present invention.
Figure 38:
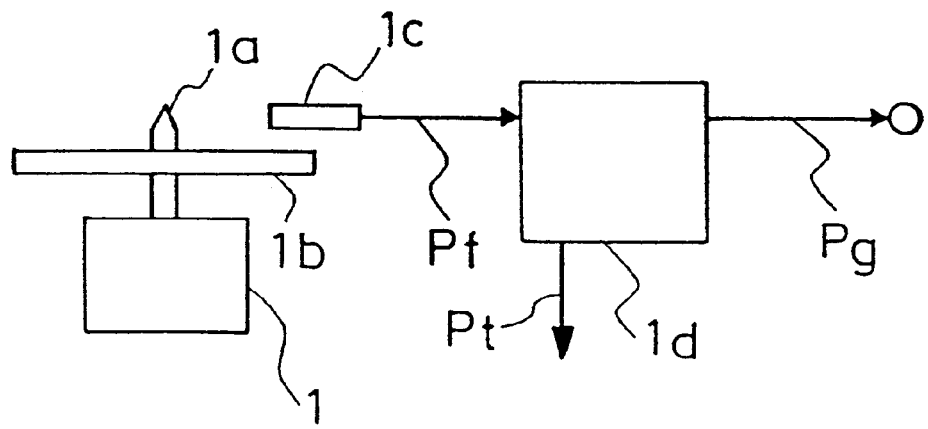
FIG. 38 is a diagram for explaining a reproducing operation and a recording operation of the disk drive apparatus in the embodiment of the present invention.
Figure 38:
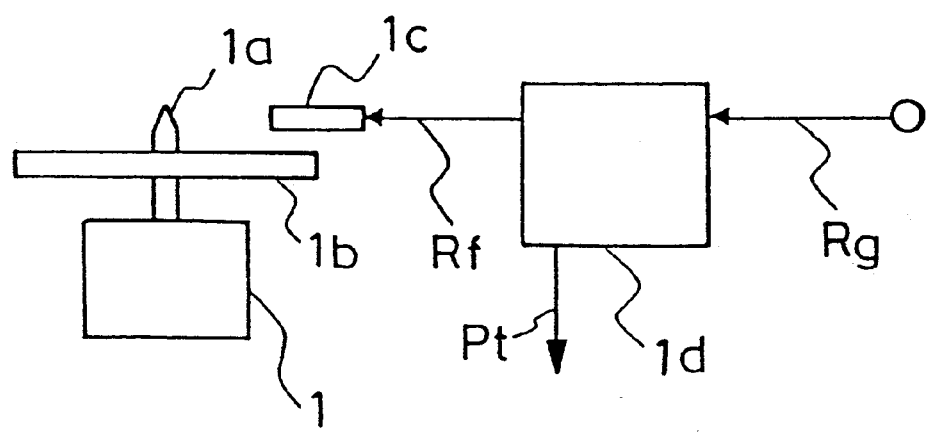

FIG. 37 shows another example of a power amplifying part 1950 having a composite FET power transistor 1960 such as the IGBT transistor. With the connection of the composite FET power transistor 1960, an FET transistor 1961, and resistors 1962 and 1963, an FET power current-mirror circuit is formed equivalently.

For the DC power source part 50 shown in the foregoing embodiments, various modifications are possible as long as a DC voltage and a DC current can be supplied. For example, a battery power supply, a diode rectified power supply of an AC line, etc. can be used.

The motor described in the above-mentioned embodiments can use not only in a disk drive apparatus but also in many other equipment, and various modifications are possible. The winding of each phase can be configured by a plurality of partial windings connected in series or in parallel. The three-phase windings are not limited to a star connection configuration, but a delta connection configuration can be employed. Generally, a motor having plural-phase windings can be realized, but further, the field part of the movable member is not limited to the illustrated one. Also, the number of magnetic poles is not limited to two; generally, a motor having a plurality of magnetic poles can be realized. Moreover, the field part is only required to supply the windings with the magnetic flux that varies responding with the movement of the movable member, and various known configurations are possible. Various motors, such as brushless motors, permanent magnet stepping motors, reluctance stepping motors, and hybrid stepping motors, and so on, can be configured according to the present invention, and therefore, these motors are also in the scope of the present invention. Furthermore, the movement of the movable member is not limited to a rotational motion, but a motor of a linear motion can be realized. The configurations of the switching control part, the current detecting part, the distributed signal producing part, each of the first current amplifying parts, and each of the second current amplifying parts are not limited only to the ones described above. All or part of the functions of the switching control part, as well as other predetermined functions can be executed digitally using a microprocessor.

It will also be appreciated that various other modifications are possible without departing from the scope of the present invention and such modifications are also included in the invention.

What is claimed is:

1. A disk drive apparatus comprising:

a head for at least one of reproducing an information signal from a disk and recording an information signal on a disk;

processing means for at least one of processing an output signal from said head and outputting a reproduced information signal, and processing an input signal and outputting a recording signal into said head;

a movable member, having a field part, for driving said disk;

Q phase windings, Q being an integer of three or more;

voltage supplying means, including first and second output terminals, for supplying a DC voltage;

Q first power amplifying means, each one of said Q first power amplifying means including a first FET power transistor for forming a current path between the first output terminal side of said voltage supplying means and one of said Q-phase windings;

Q second power amplifying means, each one of said Q second power amplifying means including a second FET power transistor for forming a current path between the second output terminal side of said voltage supplying means and one of said Q-phase windings;

altering signal producing means for producing altering signals;

first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;

second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said disk; and switching operation means for causing at least one FET power transistor among Q of said first FET power transistors and Q of said second FET power transistors to perform high-frequency switching corresponding to the command signal from said commanding means, said switching operation means including:

current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, one of Q of said first FET power transistors conducting in a half-on state while another of Q of said first FET power transistors conducts in a full-on state in a portion of a period when two of said Q first power amplifying means alter current paths to said Q-phase windings from said voltage supplying means.

2. The disk drive apparatus in accordance with the claim 1, wherein said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

3. The disk drive apparatus in accordance with claim 2, wherein said first distribution control means and said second distribution control means changes at least some part of said at least a current signal in response to an output signal of said commanding means.

4. The disk drive apparatus in accordance with claim 1, wherein said switching operation means includes command modifying means for producing a modified command signal which is varied from the command signal from said commanding means in response to at least an output signal from said altering signal producing means, and said switching control means compares said current detected signal with said modified command signal and causes said at least one FET power transistor to perform high-frequency switching in response to the comparison result.

5. A disk drive apparatus comprising:

a head for at least one of reproducing an information signal from a disk and recording an information signal on a disk;

processing means for at least one of processing an output signal from said head and outputting a reproduced information signal, and processing an input signal and outputting a recording signal into said head;

a movable member, having a field part, for driving said disk;

Q phase windings, Q being an integer of three or more;

voltage supplying means, including first and second output terminals, for supplying a DC voltage;

Q first power amplifying means, each one of said Q first power amplifying means including a first FET power transistor for forming a current path between the first output terminal side of said voltage supplying means and one of said Q-phase windings;

Q second power amplifying means, each one of said Q second power amplifying means including a second FET power transistor for forming a current path between the second output terminal side of said voltage supplying means and one of said Q-phase windings;

altering signal producing means for producing altering signals;

first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;

second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said disk; and switching operation means for causing at least one FET power transistor among Q of said first FET power transistors and Q of said second FET power transistors to perform high-frequency switching corresponding to the command signal from said commanding means, said switching operation means including:

current detecting means for providing a current detected signal in response to a supply current supplied to said Q-phase windings from said voltage supplying means, and switching control means for producing a switching control signal in response to a comparison result of said current detected signal with an output signal from said commanding means and switching said at least one FET power transistor in response to said switching control signal, at least two power amplifying means among said Q first power amplifying means and said Q second amplifying means altering current paths to said Q-phase windings from said voltage supplying means without a ON-OFF switching of said at least two power amplifying means.

6. The disk drive apparatus in accordance with claim 5, wherein said switching operation means includes command modifying means for producing a modified command signal which is varied from the command signal from said commanding means in response to at least an output signal from said altering signal producing means, and said switching control means compares said current detected signal with said modified command signal and causes said at least one FET power transistor to perform high-frequency switching in response to the comparison result.

7. The disk drive apparatus in accordance with claim 5, wherein at least one power amplifying means among said Q first power amplifying means and said Q second power amplifying means includes means for amplifying a current signal from said first distribution control means and said second distribution control means applied to a conduction control terminal side of said at least one power amplifying means with an FET power transistor among Q of said first FET power transistors and Q of said second power transistors.

8. The disk drive apparatus in accordance with claim 5 wherein
said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

9. The disk drive apparatus in accordance with claim 8, wherein said first distribution control means and said second distribution control means changes at least some part of said at least a current signal in response to an output signal of said commanding means.

10. A disk drive apparatus comprising:
a head for at least one of reproducing an information signal from a disk and recording an information signal on a disk;
processing means for at least one of processing an output signal from said head and outputting a reproduced information signal, and processing an input signal and outputting a recording signal into said head;
a movable member, having a field part, for driving said disk;
Q phase windings, Q being an integer of three or more;
voltage supplying means, including first and second output terminals, for supplying a DC voltage;
Q first power amplifying means, each one of said Q first power amplifying means including a first FET power transistor for forming a current path between the first output terminal side of said voltage supplying means and one of said Q-phase windings;
Q second power amplifying means, each one of said Q second power amplifying means including a second FET power transistor for forming a current path between the second output terminal side of said voltage supplying means and one of said Q-phase windings;
altering signal producing means for producing altering signals;
first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;
second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;
commanding means for outputting a command signal corresponding to a rotational speed of said disk; and
switching operation means for causing at least one FET power transistor among Q of said first FET power transistors and Q of said second FET power transistors to perform high-frequency switching corresponding to the command signal from said commanding means, said switching operation means including:
current detecting means for providing a current detected signal in response to a supply current supplied to said Q-phase windings from said voltage supplying means, and
switching control means for comparing said current detected signal with an output signal from said commanding means and causing said at least one FET power transistor to perform high-frequency switching in response to the comparison result, at least one of said Q first power amplifying means including means for amplifying a current signal from said first distribution control means applied to a conduction control terminal side of said at least one of said Q first power amplifying means with said first FET power transistor.

11. The disk drive apparatus in accordance with claim 10, wherein
said at least one of said Q first power amplifying means includes an FET power current-mirror circuit having an FET power transistor among Q of said first FET power transistors for amplifying said current signal to a conduction control terminal side of said FET power current-mirror circuit, and
said FET power current-mirror circuit includes said FET power transistor, an FET transistor and a resistor, a control terminal side of said FET power transistor being connected to a control terminal side of said FET transistor, a first terminal side of a current-path terminal pair of said FET transistor being connected to a conduction control terminal side of said at least one of said Q first power amplifying means via said resistor, a second terminal side of the current-path terminal pair of said FET transistor being connected to a terminal side of a current-path terminal pair of said FET power transistor, and the control terminal side of said FET power transistor being connected to the conduction control terminal side of said at least one of said Q first power amplifying means.

12. The disk drive apparatus in accordance with claim 10, wherein
said at least one of said Q first power amplifying means includes an FET power current-mirror circuit having an FET power transistor among Q of said first FET power transistors for amplifying said current signal to a conduction control terminal side of said FET power current-mirror circuit, and
said FET power current-mirror circuit includes said FET power transistor, an FET transistor and a resistor, a control terminal side of said FET power transistor being connected to a control terminal side of said FET transistor, a first terminal side of a current-path terminal pair of said FET transistor being connected to a terminal side of a current-path terminal pair of said FET power transistor via said resistor, a second terminal side of the current-path terminal pair of said FET transistor being connected to a conduction control terminal side of said at least one of said Q first power amplifying means, and the control terminal side of said FET power transistor being connected to the conduction control terminal side of said at least one of said Q first power amplifying means.

13. The disk drive apparatus in accordance with claim 10, wherein
said first distribution control means supplies said current signal, varying substantially smoothly in at least one of rising and falling slopes, and changes at least some part of said current signal in response to an output signal from said commanding means.

14. A disk drive apparatus comprising:
- a head for at least one of reproducing an information signal from a disk and recording an information signal on a disk;
- processing means for at least one of processing an output signal from said head and outputting a reproduced information signal, and processing an input signal and outputting a recording signal into said head;
- a movable member, having a field part, for driving said disk;
- Q phase windings, Q being an integer of three or more;
- voltage supplying means, including first and second output terminals, for supplying a DC voltage;
- Q first power amplifying means, each one of said Q first power amplifying means including a first power transistor for forming a current path between the first output terminal side of said voltage supplying means and one of said Q-phase windings;
- Q second power amplifying means, each one of said Q second power amplifying means including a second power transistor for forming a current path between the second output terminal side of said voltage supplying means and one of said Q-phase windings;
- altering signal producing means for producing altering signals;
- first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;
- second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;
- commanding means for outputting a command signal corresponding to a rotational speed of said disk; and
- switching operation means for causing at least one power transistor among Q of said first power transistors and Q of said second power transistors to perform high-frequency switching corresponding to the command signal from said commanding means, said switching operation means including:
- current detecting means for providing a current detected signal in response to a supply current supplied to said Q-phase windings from said voltage supplying means, and
- switching control means for producing a switching control signal in response to a comparison result of said current detected signal with an output signal from said commanding means and switching one or two of said first power transistors simultaneously in response to said switching control signal.

15. The disk drive apparatus in accordance with claim 14, wherein
said switching operation means produces said switching control signal with a fixed frequency.

16. The disk drive apparatus in accordance with claim 14, wherein
said switching operation means includes command modifying means for producing a modified command signal which is varied from the command signal from said commanding means in response to at least an output signal from said altering signal producing means, and
said switching control means compares said current detected signal with said modified command signal and causes said at least one power transistor to perform high-frequency switching in response to the comparison result.

17. The disk drive apparatus in accordance with claim 14, wherein at least one power amplifying means among said Q first power amplifying means and said Q second power amplifying means includes means for amplifying a current signal from said first distribution control means and said second distribution control means applied to a conduction control terminal side of said at least one power amplifying means with an FET power transistor among Q of said first power transistors and Q of said second power transistors.

18. The disk drive apparatus in accordance with claim 14, wherein
said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

19. The disk drive apparatus in accordance with claim 18, wherein
said first distribution control means and said second distribution control means changes at least some part of said at least a current signal in response to an output signal of said commanding means.

20. A motor comprising:
- a movable member, having a field part;
- Q phase windings, Q being an integer of three or more;
- voltage supplying means, including first and second output terminals, for supplying a DC voltage;
- Q first power amplifying means, each one of said Q first power amplifying means including a first FET power transistor for forming a current path between the first output terminal side of said voltage supplying means and one of said Q-phase windings;
- Q second power amplifying means, each one of said Q second power amplifying means including a second FET power transistor for forming a current path between the second output terminal side of said voltage supplying means and one of said Q-phase windings;
- altering signal producing means for producing altering signals;
- first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;
- second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including:

current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, one of Q of said first FET power transistors conducting in a half-on state while another of Q of said first FET power transistors conducts in a full-on state in a portion of a period when two of said Q first power amplifying means alter current paths to said Q-phase windings from said voltage supplying means.

21. The motor in accordance with the claim 20, wherein said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

22. The motor in accordance with claim 21, wherein said first distribution control means and said second distribution control means changes at least some part of said at least a current signal in response to an output signal of said commanding means.

23. The motor in accordance with claim 20, wherein said switching operation means includes command modifying means for producing a modified command signal which is varied from the command signal from said commanding means in response to at least an output signal from said altering signal producing means, and said switching control means compares said current detected signal with said modified command signal and causes said at least one FET power transistor to perform high-frequency switching in response to the comparison result.

24. A motor comprising:

a movable member, having a field part;

Q phase windings, Q being an integer of three or more;

voltage supplying means, including first and second output terminals, for supplying a DC voltage;

Q first power amplifying means, each one of said Q first power amplifying means including a first FET power transistor for forming a current path between the first output terminal side of said voltage supplying means and one of said Q-phase windings;

Q second power amplifying means, each one of said Q second power amplifying means including a second FET power transistor for forming a current path between the second output terminal side of said voltage supplying means and one of said Q-phase windings;

altering signal producing means for producing altering signals;

first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;

second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including:

current detecting means for providing a current detected signal in response to a supply current supplied to said Q-phase windings from said voltage supplying means, and switching control means for producing a switching control signal in response to a comparison result of said current detected signal with an output signal from said commanding means and switching said at least one FET power transistor in response to said switching control signal, at least two power amplifying means among said Q first power amplifying means and said Q second amplifying means altering current paths to said Q-phase windings from said voltage supplying means without a ON-OFF switching of said at least two power amplifying means.

25. The motor in accordance with claim 24, wherein said switching operation means includes command modifying means for producing a modified command signal which is varied from the command signal from said commanding means in response to at least an output signal from said altering signal producing means, and said switching control means compares said current detected signal with said modified command signal and causes said at least one FET power transistor to perform high-frequency switching in response to the comparison result.

26. The motor in accordance with claim 24, wherein at least one power amplifying means among said Q first power amplifying means and said Q second power amplifying means includes means for amplifying a current signal from said first distribution control means and said second distribution control means applied to a conduction control terminal side of said at least one power amplifying means with an FET power transistor among Q of said first FET power transistors and Q of said second power transistors.

27. The motor in accordance with claim 24, wherein said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

28. The motor in accordance with claim 27, wherein said first distribution control means and said second distribution control means changes at least some part of said at least a current signal in response to an output signal of said commanding means.

29. A motor comprising:

a movable member, having a field part;

Q phase windings, Q being an integer of three or more;

voltage supplying means, including first and second output terminals, for supplying a DC voltage;

Q first power amplifying means, each one of said Q first power amplifying means including a first FET power transistor for forming a current path between the first output terminal side of said voltage supplying means and one of said Q-phase windings;

Q second power amplifying means, each one of said Q second power amplifying means including a second FET power transistor for forming a current path between the second output terminal side of said voltage supplying means and one of said Q-phase windings;

altering signal producing means for producing altering signals;

first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;

second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said movable member; and switching operation means for causing at least one FET power transistor among Q of said first FET power transistors and Q of said second FET power transistors to perform high-frequency switching corresponding to the command signal from said commanding means, said switching operation means including:

current detecting means for providing a current detected signal in response to a supply current supplied to said Q-phase windings from said voltage supplying means, and switching control means for comparing said current detected signal with an output signal from said commanding means and causing said at least one FET power transistor to perform high-frequency switching in response to the comparison result, at least one of said Q first power amplifying means including means for amplifying a current signal from said first distribution control means applied to a conduction control terminal side of said at least one of said Q first power amplifying means with said first FET power transistor.

30. The motor in accordance with claim 29, wherein said at least one of said Q first power amplifying means includes an FET power current-mirror circuit having an FET power transistor among Q of said first FET power transistors for amplifying said current signal to a conduction control terminal side of said FET power current-mirror circuit, and said FET power current-mirror circuit includes said FET power transistor, an FET transistor and a resistor, a control terminal side of said FET power transistor being connected to a control terminal side of said FET transistor, a first terminal side of a current-path terminal pair of said FET transistor being connected to a conduction control terminal side of said at least one of said Q first power amplifying means via said resistor, a second terminal side of the current-path terminal pair of said FET transistor being connected to a terminal side of a current-path terminal pair of said FET power transistor, and the control terminal side of said FET power transistor being connected to the conduction control terminal side of said at least one of said Q first power amplifying means.

31. The motor in accordance with claim 29, wherein said at least one of said Q first power amplifying means includes an FET power current-mirror circuit having an FET power transistor among Q of said first FET power transistors for amplifying said current signal to a conduction control terminal side of said FET power current-mirror circuit, and said FET power current-mirror circuit includes said FET power transistor, an FET transistor and a resistor, a control terminal side of said FET power transistor being connected to a control terminal side of said FET transistor, a first terminal side of a current-path terminal pair of said FET transistor being connected to a terminal side of a current-path terminal pair of said FET power transistor via said resistor, a second terminal side of the current-path terminal pair of said FET transistor being connected to a conduction control terminal side of said at least one of said Q first power amplifying means, and the control terminal side of said FET power transistor being connected to the conduction control terminal side of said at least one of said Q first power amplifying means.

32. The motor in accordance with claim 29, wherein said first distribution control means supplies said current signal, varying substantially smoothly in at least one of rising and falling slopes, and changes at least some part of said current signal in response to an output signal from said commanding means.

33. A motor comprising:

a movable member, having a field part;

Q phase windings, Q being an integer of three or more;

voltage supplying means, including first and second output terminals, for supplying a DC voltage;

Q first power amplifying means, each one of said Q first power amplifying means including a first power transistor for forming a current path between the first output terminal side of said voltage supplying means and one of said Q-phase windings;

Q second power amplifying means, each one of said Q second power amplifying means including a second power transistor for forming a current path between the second output terminal side of said voltage supplying means and one of said Q-phase windings;

altering signal producing means for producing altering signals;

first distribution control means for producing first Q-phase signals in response to the altering signals from said altering signal producing means to determine active periods of said Q first power amplifying means, each of the active periods being an active electrical angle larger than 360/Q degrees, thereby causing at least one of said Q first power amplifying means to be in the active period;

second distribution control means for producing second Q-phase signals in response to the altering signals from said altering signal producing means to determine active periods of said Q second power amplifying means, each of the active periods being an active electrical angle larger than 360/Q degrees, thereby causing at least one of said Q second power amplifying means to be in the active period;

commanding means for outputting a command signal corresponding to a rotational speed of said movable member; and switching operation means for causing at least one power transistor among Q of said first power transistors and Q of said second power transistors to perform high-frequency switching corresponding to the command signal from said commanding means, said switching operation means including:

current detecting means for providing a current detected signal in response to a supply current supplied to said Q-phase windings from said voltage supplying means, and switching control means for producing a switching control signal in response to a comparison result of said current detected signal with an output signal from said commanding means and switching one or two of said first power transistors simultaneously in response to said switching control signal.

34. The motor in accordance with claim 33, wherein said switching operation means produces said switching control signal with a fixed frequency.

35. The motor in accordance with claim 33, wherein said switching operation means includes command modifying means for producing a modified command signal which is varied from the command signal from said commanding means in response to at least an output signal from said altering signal producing means, and said switching control means compares said current detected signal with said modified command signal and causes said at least one power transistor to perform high-frequency switching in response to the comparison result.

36. The motor in accordance with claim 33, wherein at least one power amplifying means among said Q first power amplifying means and said Q second power amplifying means includes means for amplifying a current signal from said first distribution control means and said second distribution control means applied to a conduction control terminal side of said at least one power amplifying means with an FET power transistor among Q of said first power transistors and Q of said second power transistors.

37. The motor in accordance with claim 33, wherein said first distribution control means and said second distribution control means supplies at least a current signal, varying substantially smoothly in at least one of rising and falling slopes, to a conduction control terminal side of at least one power amplifying means among said Q first power amplifying means and said Q second power amplifying means.

38. The motor in accordance with claim 37, wherein said first distribution control means and said second distribution control means changes at least some part of said at least a current signal in response to an output signal of said commanding means.

* * * * *